(12) United States Patent
Carrigan et al.

(10) Patent No.: US 12,381,880 B2
(45) Date of Patent: Aug. 5, 2025

(54) MEDIA SERVICE CONFIGURATION

(71) Applicant: Apple Inc., Cupertino, CA (US)

(72) Inventors: Taylor G. Carrigan, San Francisco, CA (US); Corey J. Peterson, Cupertino, CA (US); Jeffrey D. Tanner, Walnut Creek, CA (US)

(73) Assignee: Apple Inc., Cupertino, CA (US)

( * ) Notice: Subject to any disclaimer, the term of this patent is extended or adjusted under 35 U.S.C. 154(b) by 289 days.

(21) Appl. No.: 17/481,030

(22) Filed: Sep. 21, 2021

(65) Prior Publication Data

US 2022/0116399 A1 Apr. 14, 2022

Related U.S. Application Data

(60) Provisional application No. 63/090,598, filed on Oct. 12, 2020.

(51) Int. Cl.
*H04L 9/40* (2022.01)
*G10L 17/22* (2013.01)
*H04L 12/28* (2006.01)

(52) U.S. Cl.
CPC ............ *H04L 63/102* (2013.01); *G10L 17/22* (2013.01); *H04L 12/2816* (2013.01)

(58) Field of Classification Search
CPC .... H04L 12/2816; H04L 63/102; G10L 17/22
See application file for complete search history.

(56) References Cited

U.S. PATENT DOCUMENTS

| | | | |
|---|---|---|---|
| 5,202,961 A | 4/1993 | Mills et al. | |
| 8,060,571 B2 | 11/2011 | Rao | |
| 8,533,066 B2 | 9/2013 | Wei et al. | |
| 8,924,735 B2 | 12/2014 | Forbes et al. | |
| 9,247,363 B2 | 1/2016 | Triplett et al. | |
| 9,407,624 B1 | 8/2016 | Myers et al. | |
| 9,451,144 B2 | 9/2016 | Dye | |
| 9,588,661 B1 | 3/2017 | Jauhal et al. | |
| 9,602,545 B2 | 3/2017 | Pitre | |
| 9,710,639 B1 | 7/2017 | Saini | |
| 9,721,239 B1 | 8/2017 | Ho | |
| 9,727,749 B2 | 8/2017 | Tzeng et al. | |
| 9,812,128 B2 | 11/2017 | Mixter et al. | |
| 9,820,323 B1 | 11/2017 | Young et al. | |

(Continued)

FOREIGN PATENT DOCUMENTS

| | | | |
|---|---|---|---|
| AU | 2007100826 A4 | 9/2007 | |
| AU | 2008100011 A4 | 2/2008 | |

(Continued)

OTHER PUBLICATIONS

Notice of Allowance received for Chinese Patent Application No. 202111646465.0, mailed on Feb. 6, 2023, 3 pages (1 page of English Translation and 2 pages of Official Copy).

(Continued)

*Primary Examiner* — Gary S Gracia

(74) *Attorney, Agent, or Firm* — DLA Piper LLP (US)

(57) ABSTRACT

The present disclosure generally relates to media request handling by electronic devices having multiple users. In some embodiments, a computer system receives a user request to play media and, based on a determination of user identity, plays the requested media using a media service according to user-selected settings.

51 Claims, 29 Drawing Sheets

(56) References Cited

U.S. PATENT DOCUMENTS

| | | |
|---|---|---|
| 9,826,083 B2 | 11/2017 | Kanevsky et al. |
| 9,847,999 B2 | 12/2017 | Van Os et al. |
| 9,954,989 B2 | 4/2018 | Zhou |
| 10,089,983 B1 | 10/2018 | Gella et al. |
| 10,104,089 B2 | 10/2018 | Kim et al. |
| 10,129,044 B2 | 11/2018 | Kangshang et al. |
| 10,198,563 B2 | 2/2019 | Wang et al. |
| 10,284,812 B1 | 5/2019 | Van Os et al. |
| 10,304,463 B2 | 5/2019 | Mixter et al. |
| 10,374,804 B2 | 8/2019 | Lee et al. |
| 10,412,206 B1 | 9/2019 | Liang et al. |
| 10,490,195 B1 | 11/2019 | Krishnamoorthy et al. |
| 10,558,546 B2 | 2/2020 | Cranfill et al. |
| 10,567,515 B1 | 2/2020 | Bao |
| 10,581,771 B2 | 3/2020 | Rosenberg et al. |
| 10,616,726 B1 | 4/2020 | Freeman et al. |
| 10,715,604 B1* | 7/2020 | Bao ................. H04L 67/306 |
| 10,732,819 B2 | 8/2020 | Wang et al. |
| 10,742,645 B2 | 8/2020 | Hevizi et al. |
| 10,742,648 B2 | 8/2020 | Magyar et al. |
| 10,802,843 B1 | 10/2020 | Carrigan et al. |
| 10,824,299 B2 | 11/2020 | Bai |
| 10,833,887 B2 | 11/2020 | Wu |
| 10,885,091 B1* | 1/2021 | Meng ............. G06F 16/24578 |
| 11,070,644 B1 | 7/2021 | Teng et al. |
| 11,157,143 B2 | 10/2021 | Yang et al. |
| 11,200,894 B2* | 12/2021 | Smith ................. G06F 3/167 |
| 11,343,370 B1 | 5/2022 | Gordon et al. |
| 11,431,834 B1 | 8/2022 | Gordon et al. |
| 11,463,576 B1 | 10/2022 | Gordon et al. |
| 11,544,366 B2 | 1/2023 | Shinkawa et al. |
| 11,838,344 B2* | 12/2023 | Jacobson ............. G11B 27/11 |
| 2002/0162005 A1 | 10/2002 | Ueda et al. |
| 2003/0098776 A1 | 5/2003 | Friedli |
| 2003/0220835 A1 | 11/2003 | Barnes |
| 2004/0261010 A1 | 12/2004 | Matsuishi |
| 2005/0172319 A1 | 8/2005 | Reichardt et al. |
| 2005/0233780 A1 | 10/2005 | Jani et al. |
| 2005/0268237 A1 | 12/2005 | Crane et al. |
| 2006/0143716 A1 | 6/2006 | Ikemoto |
| 2007/0157097 A1 | 7/2007 | Peters et al. |
| 2008/0081558 A1 | 4/2008 | Dunko et al. |
| 2009/0125571 A1 | 5/2009 | Kiilerich et al. |
| 2009/0133051 A1 | 5/2009 | Hildreth |
| 2010/0017474 A1 | 1/2010 | Kandekar et al. |
| 2010/0082374 A1 | 4/2010 | Charania et al. |
| 2010/0178873 A1 | 7/2010 | Lee et al. |
| 2010/0178956 A1 | 7/2010 | Safadi |
| 2011/0054647 A1 | 3/2011 | Chipchase |
| 2011/0163972 A1 | 7/2011 | Anzures et al. |
| 2011/0185048 A1 | 7/2011 | Yew et al. |
| 2012/0050185 A1 | 3/2012 | Davydov et al. |
| 2012/0272230 A1 | 10/2012 | Lee |
| 2013/0094666 A1 | 4/2013 | Haaff et al. |
| 2013/0094770 A1 | 4/2013 | Lee et al. |
| 2013/0124207 A1 | 5/2013 | Sarin et al. |
| 2013/0272511 A1 | 10/2013 | Mateer et al. |
| 2013/0305354 A1 | 11/2013 | King et al. |
| 2013/0329924 A1 | 12/2013 | Fleizach et al. |
| 2014/0047020 A1 | 2/2014 | Matus et al. |
| 2014/0122471 A1 | 5/2014 | Houston et al. |
| 2014/0176298 A1 | 6/2014 | Kumar et al. |
| 2014/0181104 A1 | 6/2014 | Chin et al. |
| 2014/0181654 A1 | 6/2014 | Kumar et al. |
| 2014/0267002 A1 | 9/2014 | Luna |
| 2014/0315163 A1 | 10/2014 | Ingrassia et al. |
| 2014/0333414 A1 | 11/2014 | Kursun |
| 2014/0351339 A1 | 11/2014 | Kaneoka et al. |
| 2014/0351346 A1 | 11/2014 | Barton |
| 2014/0365904 A1 | 12/2014 | Kim et al. |
| 2015/0029089 A1 | 1/2015 | Kim |
| 2015/0033361 A1 | 1/2015 | Choi et al. |
| 2015/0085057 A1 | 3/2015 | Ouyang et al. |
| 2015/0089359 A1 | 3/2015 | Brisebois |
| 2015/0095979 A1 | 4/2015 | Windust |
| 2015/0113407 A1 | 4/2015 | Hoffert et al. |
| 2015/0176998 A1 | 6/2015 | Huang et al. |
| 2015/0189426 A1 | 7/2015 | Pang |
| 2015/0242837 A1 | 8/2015 | Yarbrough et al. |
| 2015/0286360 A1 | 10/2015 | Wachter |
| 2015/0317977 A1 | 11/2015 | Manjunath et al. |
| 2015/0347738 A1 | 12/2015 | Ulrich et al. |
| 2015/0350031 A1 | 12/2015 | Burks et al. |
| 2015/0382047 A1 | 12/2015 | Van Os et al. |
| 2016/0004417 A1 | 1/2016 | Bates |
| 2016/0026429 A1 | 1/2016 | Triplett |
| 2016/0026779 A1 | 1/2016 | Grigg et al. |
| 2016/0048705 A1 | 2/2016 | Yang |
| 2016/0062487 A1 | 3/2016 | Foss et al. |
| 2016/0062606 A1 | 3/2016 | Vega et al. |
| 2016/0085565 A1 | 3/2016 | Arcese et al. |
| 2016/0094678 A1 | 3/2016 | Kumar et al. |
| 2016/0156992 A1 | 6/2016 | Kuper |
| 2016/0212138 A1 | 7/2016 | Lehane |
| 2016/0226674 A1 | 8/2016 | Kangshang et al. |
| 2016/0241983 A1 | 8/2016 | Lambourne et al. |
| 2016/0299669 A1 | 10/2016 | Bates |
| 2016/0299736 A1 | 10/2016 | Bates et al. |
| 2016/0350839 A1 | 12/2016 | Avidor et al. |
| 2016/0358134 A1 | 12/2016 | Van Os et al. |
| 2016/0358162 A1 | 12/2016 | Park et al. |
| 2016/0360344 A1 | 12/2016 | Shim et al. |
| 2016/0364600 A1 | 12/2016 | Shah et al. |
| 2017/0010794 A1 | 1/2017 | Cho et al. |
| 2017/0013562 A1 | 1/2017 | Lim et al. |
| 2017/0025124 A1 | 1/2017 | Mixter et al. |
| 2017/0060402 A1 | 3/2017 | Bates |
| 2017/0061965 A1 | 3/2017 | Penilla et al. |
| 2017/0068507 A1 | 3/2017 | Kim et al. |
| 2017/0094049 A1 | 3/2017 | Kanevsky et al. |
| 2017/0115940 A1 | 4/2017 | Byeon |
| 2017/0134567 A1 | 5/2017 | Jeon et al. |
| 2017/0185375 A1 | 6/2017 | Martel et al. |
| 2017/0188065 A1* | 6/2017 | Major ............. H04N 21/26258 |
| 2017/0195772 A1 | 7/2017 | Han et al. |
| 2017/0242653 A1 | 8/2017 | Lang et al. |
| 2017/0242657 A1* | 8/2017 | Jarvis ................. G10L 17/22 |
| 2017/0263249 A1 | 9/2017 | Akbacak et al. |
| 2017/0280223 A1 | 9/2017 | Cavarra et al. |
| 2017/0293610 A1 | 10/2017 | Tran |
| 2017/0331869 A1 | 11/2017 | Bendahan et al. |
| 2017/0339151 A1 | 11/2017 | Van Os et al. |
| 2017/0339272 A1 | 11/2017 | Obaidi et al. |
| 2017/0357420 A1 | 12/2017 | Dye et al. |
| 2017/0357434 A1 | 12/2017 | Coffman et al. |
| 2017/0357439 A1 | 12/2017 | Lemay et al. |
| 2017/0357478 A1 | 12/2017 | Piersol et al. |
| 2017/0359555 A1 | 12/2017 | Irani et al. |
| 2017/0374004 A1 | 12/2017 | Holmes et al. |
| 2018/0019973 A1 | 1/2018 | Mikhailov et al. |
| 2018/0032997 A1 | 2/2018 | Gordon et al. |
| 2018/0039916 A1 | 2/2018 | Ravindra |
| 2018/0040322 A1 | 2/2018 | Mixter et al. |
| 2018/0061421 A1 | 3/2018 | Sarikaya |
| 2018/0067528 A1 | 3/2018 | Wang et al. |
| 2018/0067712 A1 | 3/2018 | Behzadi et al. |
| 2018/0082682 A1 | 3/2018 | Erickson et al. |
| 2018/0096690 A1 | 4/2018 | Mixter et al. |
| 2018/0096696 A1 | 4/2018 | Mixter |
| 2018/0103239 A1 | 4/2018 | Siminoff et al. |
| 2018/0144590 A1 | 5/2018 | Mixter et al. |
| 2018/0182389 A1 | 6/2018 | Devaraj et al. |
| 2018/0190264 A1 | 7/2018 | Mixter et al. |
| 2018/0206122 A1 | 7/2018 | Bradley et al. |
| 2018/0218201 A1 | 8/2018 | Siminoff |
| 2018/0253281 A1 | 9/2018 | Jarvis et al. |
| 2018/0268072 A1 | 9/2018 | Rathod |
| 2018/0288115 A1 | 10/2018 | Asnis et al. |
| 2018/0330589 A1 | 11/2018 | Horling |
| 2018/0335903 A1 | 11/2018 | Coffman et al. |
| 2018/0336275 A1 | 11/2018 | Graham et al. |
| 2018/0336904 A1 | 11/2018 | Piercy et al. |
| 2018/0336905 A1 | 11/2018 | Kim et al. |
| 2018/0341448 A1 | 11/2018 | Behzadi et al. |

(56) References Cited

U.S. PATENT DOCUMENTS

| | | | |
|---|---|---|---|
| 2018/0351762 A1 | 12/2018 | Iyengar et al. | |
| 2019/0012069 A1 | 1/2019 | Bates | |
| 2019/0012966 A1 | 1/2019 | Shi | |
| 2019/0028867 A1 | 1/2019 | Naqvi | |
| 2019/0043508 A1 | 2/2019 | Sak et al. | |
| 2019/0080698 A1 | 3/2019 | Miller | |
| 2019/0102145 A1 | 4/2019 | Wilberding et al. | |
| 2019/0124049 A1 | 4/2019 | Bradley et al. | |
| 2019/0172467 A1 | 6/2019 | Kim et al. | |
| 2019/0221227 A1 | 7/2019 | Mixter | |
| 2019/0251975 A1 | 8/2019 | Choi et al. | |
| 2019/0288867 A1 | 9/2019 | Mese et al. | |
| 2019/0310820 A1* | 10/2019 | Bates | G06F 9/44505 |
| 2019/0311721 A1* | 10/2019 | Edwards | G10L 17/06 |
| 2019/0318069 A1* | 10/2019 | Mitic | H04W 12/04 |
| 2019/0327225 A1* | 10/2019 | Wahlberg | H04L 9/3228 |
| 2019/0347181 A1 | 11/2019 | Cranfill et al. | |
| 2019/0361982 A1* | 11/2019 | Jacobson | G06F 16/686 |
| 2019/0370781 A1 | 12/2019 | Van Os et al. | |
| 2019/0370805 A1 | 12/2019 | Van Os et al. | |
| 2019/0371313 A1 | 12/2019 | Naughton et al. | |
| 2019/0378500 A1 | 12/2019 | Miller et al. | |
| 2020/0075026 A1 | 3/2020 | Peeler et al. | |
| 2020/0076939 A1 | 3/2020 | Lambourne et al. | |
| 2020/0126560 A1 | 4/2020 | Ho et al. | |
| 2020/0143017 A1* | 5/2020 | Yoon | G06F 3/167 |
| 2020/0151601 A1 | 5/2020 | Niewczas | |
| 2020/0177593 A1 | 6/2020 | Bender et al. | |
| 2020/0184964 A1 | 6/2020 | Myers et al. | |
| 2020/0186378 A1 | 6/2020 | Six et al. | |
| 2020/0218486 A1 | 7/2020 | Behzadi et al. | |
| 2020/0275144 A1 | 8/2020 | Major | |
| 2020/0294499 A1 | 9/2020 | Deluca et al. | |
| 2020/0336909 A1 | 10/2020 | Seel et al. | |
| 2020/0379711 A1 | 12/2020 | Graham et al. | |
| 2020/0379714 A1 | 12/2020 | Graham et al. | |
| 2020/0379729 A1 | 12/2020 | Graham et al. | |
| 2020/0379730 A1 | 12/2020 | Graham et al. | |
| 2020/0380972 A1 | 12/2020 | Carrigan et al. | |
| 2020/0380983 A1 | 12/2020 | Sundaram et al. | |
| 2020/0382513 A1 | 12/2020 | Biswas et al. | |
| 2020/0382647 A1 | 12/2020 | Krochmal et al. | |
| 2020/0410584 A1 | 12/2020 | Frost et al. | |
| 2020/0412679 A1 | 12/2020 | Han et al. | |
| 2021/0090578 A1* | 3/2021 | Trapp | G06F 21/32 |
| 2021/0255816 A1 | 8/2021 | Behzadi et al. | |
| 2021/0255819 A1 | 8/2021 | Graham et al. | |
| 2021/0266723 A1 | 8/2021 | Gray | |
| 2021/0312464 A1 | 10/2021 | Peng et al. | |
| 2021/0352172 A1 | 11/2021 | Kim et al. | |
| 2022/0062704 A1 | 3/2022 | D'auria et al. | |
| 2022/0078552 A1 | 3/2022 | Delhoume et al. | |
| 2022/0129144 A1 | 4/2022 | Carrigan et al. | |
| 2022/0172187 A1 | 6/2022 | Kanehana et al. | |
| 2022/0191162 A1 | 6/2022 | Hegarty et al. | |
| 2022/0254120 A1 | 8/2022 | Berliner et al. | |
| 2022/0351733 A1* | 11/2022 | Bates | H04L 67/306 |
| 2022/0357964 A1 | 11/2022 | Carrigan et al. | |
| 2022/0391520 A1 | 12/2022 | Ma et al. | |
| 2022/0392455 A1 | 12/2022 | Ma et al. | |
| 2023/0315495 A1 | 10/2023 | Carrigan et al. | |
| 2023/0393809 A1 | 12/2023 | Carrigan et al. | |

FOREIGN PATENT DOCUMENTS

| | | |
|---|---|---|
| CN | 102523213 A | 6/2012 |
| CN | 104503688 A | 4/2015 |
| CN | 106170783 A | 11/2016 |
| CN | 106254625 A | 12/2016 |
| CN | 106415630 A | 2/2017 |
| CN | 106416142 A | 2/2017 |
| CN | 107210033 A | 9/2017 |
| CN | 107250949 A | 10/2017 |
| CN | 104012150 B | 5/2018 |
| CN | 108292203 A | 7/2018 |
| CN | 108604180 A | 9/2018 |
| CN | 108924038 A | 11/2018 |
| CN | 109219793 A | 1/2019 |
| CN | 109302531 A | 2/2019 |
| CN | 109314795 A | 2/2019 |
| CN | 109688442 A | 4/2019 |
| EP | 2650808 A1 | 10/2013 |
| EP | 3163495 A1 | 5/2017 |
| EP | 3420441 A1 | 1/2019 |
| FR | 3069679 A1 | 2/2019 |
| GB | 2341698 A | 3/2000 |
| JP | 2006-185154 A | 7/2006 |
| JP | 2006-288027 A | 10/2006 |
| JP | 2007-334301 A | 12/2007 |
| JP | 2011-60281 A | 3/2011 |
| JP | 2014-502454 A | 1/2014 |
| JP | 2015-533441 A | 11/2015 |
| KR | 10-2010-0036351 A | 4/2010 |
| KR | 10-2015-0031010 A | 3/2015 |
| KR | 10-2015-0121177 A | 10/2015 |
| KR | 10-2016-0012008 A | 2/2016 |
| KR | 10-2016-0141847 A | 12/2016 |
| KR | 10-2017-0027999 A | 3/2017 |
| KR | 10-2011177 B1 | 8/2019 |
| KR | 10-2022-0004223 A | 1/2022 |
| WO | 2009/005563 A1 | 1/2009 |
| WO | 2009/010827 A2 | 1/2009 |
| WO | 2014/151089 A1 | 9/2014 |
| WO | 2016/057117 A1 | 4/2016 |
| WO | 2016/122902 A2 | 8/2016 |
| WO | 2017/173155 A1 | 10/2017 |
| WO | 2017/197184 A1 | 11/2017 |
| WO | 2017/218192 A1 | 12/2017 |
| WO | 2017/218199 A1 | 12/2017 |
| WO | 2018/025030 A2 | 2/2018 |
| WO | 2018/067531 A1 | 4/2018 |
| WO | 2018/085671 A1 | 5/2018 |
| WO | 2018/089700 A1 | 5/2018 |
| WO | 2018/213401 A1 | 11/2018 |
| WO | 2018/213415 A1 | 11/2018 |
| WO | 2020/076365 A1 | 4/2020 |
| WO | 2020/242577 A1 | 12/2020 |

OTHER PUBLICATIONS

Notice of Allowance received for U.S. Appl. No. 16/888,775, mailed on Feb. 21, 2023, 5 pages.
Applicant-Initiated Interview Summary received for U.S. Appl. No. 17/306,354, mailed on Jun. 28, 2023, 3 pages.
Applicant-Initiated Interview Summary received for U.S. Appl. No. 17/489,508, mailed on Aug. 7, 2023, 5 pages.
Applicant-Initiated Interview Summary received for U.S. Appl. No. 17/489,508, mailed on Jun. 2, 2023, 4 pages.
Applicant-Initiated Interview Summary received for U.S. Appl. No. 17/489,508, mailed on Oct. 12, 2023, 5 pages.
Corrected Notice of Allowance received for U.S. Appl. No. 17/871,627, mailed on May 3, 2023, 2 pages.
Extended European Search Report received for European Patent Application No. 23168537.1, mailed on Jul. 25, 2023, 13 pages.
Final Office Action received for U.S. Appl. No. 17/489,508, mailed on Aug. 25, 2023, 29 pages.
Intention to Grant received for European Patent Application No. 20720675.6, mailed on Oct. 5, 2023, 9 pages.
International Preliminary Report on Patentability received for PCT Patent Application No. PCT/US2021/054470, mailed on Apr. 27, 2023, 9 pages.
International Preliminary Report on Patentability received for PCT Patent Application No. PCT/US2021/056674, mailed on May 11, 2023, 7 pages.
Non-Final Office Action received for U.S. Appl. No. 17/306,354, mailed on Jun. 2, 2023, 21 pages.
Non-Final Office Action received for U.S. Appl. No. 17/468,286, mailed on Oct. 5, 2023, 15 pages.
Non-Final Office Action received for U.S. Appl. No. 17/489,508, mailed on Jun. 21, 2023, 26 pages.

(56) References Cited

OTHER PUBLICATIONS

Notice of Acceptance received for Australian Patent Application No. 2022218540, mailed on Oct. 16, 2023, 3 pages.
Notice of Allowance received for Chinese Patent Application No. 202111483033.2, mailed on Oct. 7, 2023, 4 pages (1 page of English Translation and 3 pages of Official Copy).
Notice of Allowance received for Japanese Patent Application No. 2022-201453, mailed on Jun. 5, 2023, 4 pages (1 page of English Translation and 3 pages of Official Copy).
Notice of Allowance received for U.S. Appl. No. 16/922,675, mailed on Jul. 19, 2023, 13 pages.
Notice of Allowance received for U.S. Appl. No. 17/306,354, mailed on Jul. 24, 2023, 7 pages.
Office Action received for Australian Patent Application No. 2022218540, mailed on Aug. 3, 2023, 5 pages.
Office Action received for Australian Patent Application No. 2023201189, mailed on Sep. 8, 2023, 2 pages.
Cohn Emily, "Sonos Just Fixed the Most Annoying Thing About Its iPhone App", online available at <https://www.businessinsider.com/sonos-mobile-app-works-on-lock-screen-2016-6>, Jun. 27, 2016, 2 pages.
Fingas Jon, "Sonos Puts Speaker Controls on Your iPhone's Lock Screen", online available at <https://www.engadget.com/2016-06-21-sonos-ios-lock-screen-controls.html>, Jun. 21, 2016, 3 pages.
Invitation to Pay Additional Fees and Partial International Search Report received for PCT Patent Application No. PCT/US2022/032340, mailed on Nov. 21, 2022, 14 pages.
Kazmucha Allyson, "Sonos Controller App for iPhone and iPad Review", online available at https://www.imore.com/sonos-controller-app-iphone-and-ipad-review, Mar. 1, 2018, 4 pages.
Notice of Allowance received for U.S. Appl. No. 16/922,675, mailed on Dec. 8, 2022, 9 pages.
Corrected Notice of Allowance received for U.S. Appl. No. 16/922,675, mailed on Apr. 14, 2023, 6 pages.
Corrected Notice of Allowance received for U.S. Appl. No. 16/922,675, mailed on Jan. 9, 2023, 3 pages.
Corrected Notice of Allowance received for U.S. Appl. No. 16/922,675, mailed on Jan. 20, 2023, 3 pages.
Corrected Notice of Allowance received for U.S. Appl. No. 17/871,627, mailed on Apr. 11, 2023, 3 pages.
Corrected Notice of Allowance received for U.S. Appl. No. 17/871,627, mailed on Feb. 8, 2023, 2 pages.
Corrected Notice of Allowance received for U.S. Appl. No. 17/871,627, mailed on Mar. 7, 2023, 2 pages.
Extended European Search Report received for European Patent Application No. 22195584.2, mailed on Jan. 5, 2023, 13 pages.
Final Office Action received for U.S. Appl. No. 17/489,508, mailed on Mar. 10, 2023, 25 pages.
Intention to Grant received for European Patent Application No. 20720675.6, mailed on Mar. 24, 2023, 9 pages.
International Search Report and Written Opinion received for PCT Patent Application No. PCT/US2022/032340, mailed on Jan. 12, 2023, 18 pages.
Notice of Acceptance received for Australian Patent Application No. 2022203561, mailed on Feb. 27, 2023, 3 pages.
Notice of Allowance received for Korean Patent Application No. 10-2022-7006175, mailed on Jan. 12, 2023, 7 pages (2 pages of English Translation and 5 pages of Official Copy).
Notice of Allowance received for U.S. Appl. No. 16/922,675, mailed on Mar. 22, 2023, 8 pages.
Notice of Allowance received for U.S. Appl. No. 17/871,627, mailed on Jan. 20, 2023, 11 pages.
Office Action received for European Patent Application No. 20760624.5, mailed on Mar. 7, 2023, 13 pages.
Office Action received for Japanese Patent Application No. 2022-201453, mailed on Mar. 6, 2023, 8 pages (5 pages of English Translation and 3 pages of Official Copy).
Supplemental Notice of Allowance received for U.S. Appl. No. 16/888,775, mailed on Mar. 1, 2023, 2 pages.
Applicant-Initiated Interview Summary received for U.S. Appl. No. 17/062,891, mailed on Apr. 5, 2022, 4 pages.
Applicant-Initiated Interview Summary received for U.S. Appl. No. 17/062,891, mailed on Nov. 22, 2021, 4 pages.
Corrected Notice of Allowance received for U.S. Appl. No. 16/922,675, mailed on Mar. 4, 2022, 6 pages.
Corrected Notice of Allowance received for U.S. Appl. No. 17/062,891, mailed on Aug. 2, 2022, 2 pages.
Final Office Action received for U.S. Appl. No. 17/062,891, mailed on Jan. 3, 2022, 13 pages.
International Preliminary Report on Patentability received for PCT Patent Application No. PCT/US2020/025526, mailed on Dec. 9, 2021, 13 pages.
International Preliminary Report on Patentability received for PCT Patent Application No. PCT/US2020/035488, mailed on Dec. 9, 2021, 16 pages.
International Search Report and Written Opinion received for PCT Patent Application No. PCT/US2021/054470, mailed on Feb. 2, 2022, 12 pages.
International Search Report and Written Opinion received for PCT Patent Application No. PCT/US2021/056674, mailed on Jan. 26, 2022, 10 pages.
Non-Final Office Action received for U.S. Appl. No. 16/922,675, mailed on Jun. 8, 2022, 21 pages.
Notice of Acceptance received for Australian Patent Application No. 2020282362, mailed on Jan. 4, 2022, 3 pages.
Notice of Acceptance received for Australian Patent Application No. 2020285521, mailed on Mar. 15, 2022, 3 pages.
Notice of Acceptance received for Australian Patent Application No. 2022202458, mailed on May 6, 2022, 3 pages.
Notice of Allowance received for Japanese Patent Application No. 2021-563716, mailed on Mar. 14, 2022, 4 pages (1 page of English Translation and 3 pages of Official Copy).
Notice of Allowance received for Japanese Patent Application No. 2021-569562, mailed on Jul. 29, 2022, 4 pages (1 page of English Translation and 3 pages of Official Copy).
Notice of Allowance received for Japanese Patent Application No. 2022-079682, mailed on Jul. 15, 2022, 4 pages (1 page of English Translation and 3 pages of Official Copy).
Notice of Allowance received for Korean Patent Application No. 10-2021-7035472, mailed on Nov. 23, 2021, 4 pages (2 pages of English Translation and 2 pages of Official Copy).
Notice of Allowance received for Korean Patent Application No. 10-2021-7041874, mailed on Mar. 24, 2022, 4 pages (1 page of English Translation and 3 pages of Official Copy).
Notice of Allowance received for U.S. Appl. No. 16/888,775, mailed on Jan. 12, 2022, 5 pages.
Notice of Allowance received for U.S. Appl. No. 16/922,675, mailed on Feb. 10, 2022, 8 pages.
Notice of Allowance received for U.S. Appl. No. 17/062,891, mailed on Apr. 25, 2022, 9 pages.
Office Action received for Australian Patent Application No. 2020282362, mailed on Nov. 25, 2021, 3 pages.
Office Action received for Australian Patent Application No. 2020285521, mailed on Dec. 20, 2021, 3 pages.
Office Action received for European Patent Application No. 20720675.6, mailed on Sep. 8, 2022, 6 pages.
Office Action received for Indian Patent Application No. 202118054338, mailed on Jun. 21, 2022, 5 pages.
Office Action received for Japanese Patent Application No. 2021-569562, mailed on May 13, 2022, 6 pages (3 pages of English Translation and 3 pages of Official Copy).
Office Action received for Korean Patent Application No. 10-2021-7041874, mailed on Jan. 19, 2022, 5 pages (2 pages of English Translation and 3 pages of Official Copy).
Office Action received for Korean Patent Application No. 10-2022-7006175, mailed on May 27, 2022, 7 pages (3 pages of English Translation and 4 pages of Official Copy).
Applicant-Initiated Interview Summary received for U.S. Appl. No. 16/922,675, mailed on Nov. 15, 2022, 2 pages.
Applicant-Initiated Interview Summary received for U.S. Appl. No. 17/489,508, mailed on Nov. 17, 2022, 6 pages.

(56) References Cited

OTHER PUBLICATIONS

Office Action received for Chinese Patent Application No. 202111646465.0, mailed on Oct. 21, 2022, 11 pages (6 pages of English Translation and 5 pages of Official Copy).

Invitation to Pay Search Fees received for European Patent Application No. 20760624.5, mailed on Jan. 2, 2023, 3 pages.

Office Action received for Australian Patent Application No. 2022203561, mailed on Dec. 16, 2022, 2 pages.

Non-Final Office Action received for U.S. Appl. No. 17/489,508, mailed on Oct. 19, 2022, 20 pages.

Notice of Allowance received for U.S. Appl. No. 16/888,775, mailed on Oct. 19, 2022, 6 pages.

Hoffman, Chris, "How to Ungroup Notifications on iPhone or iPad", Retrieved from the internet <URL: https://www.howtogeek.com/366566/how-to-ungroup-notifications-on-iphone-or-ipad/>, Sep. 17, 2018, 3 pages.

Notice of Allowance received for Japanese Patent Application No. 2022-135126, mailed on Nov. 18, 2022, 4 pages (1 page of English Translation and 3 pages of Official Copy).

Advisory Action received for U.S. Appl. No. 16/584,347, mailed on Sep. 22, 2020, 5 pages.

Advisory Action received for U.S. Appl. No. 16/584,347, mailed on Aug. 28, 2020, 2 pages.

Applicant Initiated Interview Summary received for U.S. Appl. No. 16/583,989, mailed on Aug. 3, 2020, 6 pages.

Applicant Initiated Interview Summary received for U.S. Appl. No. 16/583,989, mailed on Mar. 25, 2020, 4 pages.

Applicant Initiated Interview Summary received for U.S. Appl. No. 16/584,490, mailed on Jul. 28, 2020, 4 pages.

Applicant-Initiated Interview Summary received for U.S. Appl. No. 16/584,321, mailed on Apr. 8, 2020, 5 pages.

Applicant-Initiated Interview Summary received for U.S. Appl. No. 16/584,347, mailed on Sep. 1, 2020, 3 pages.

Applicant-Initiated Interview Summary received for U.S. Appl. No. 16/584,490, mailed on Jan. 31, 2020, 4 pages.

Applicant-Initiated Interview Summary received for U.S. Appl. No. 16/922,675, mailed on Dec. 16, 2020, 3 pages.

Applicant-Initiated Interview Summary received for U.S. Appl. No. 16/922,675, mailed on Nov. 2, 2020, 3 pages.

Applicant-Initiated Interview Summary received for U.S. Appl. No. 16/922,675, mailed on Sep. 3, 2021, 2 pages.

Corrected Notice of Allowance received for U.S. Appl. No. 16/584,347, mailed on Nov. 9, 2020, 2 pages.

Corrected Notice of Allowance received for U.S. Appl. No. 16/584,347, mailed on Sep. 23, 2020, 5 pages.

Customize Notifications and Content on Your Galaxy Phone's Lock Screen, Online Available at: https://www.samsung.com/us/support/answer/ANS00062636, Oct. 4, 2017, 5 pages.

Final Office Action received for U.S. Appl. No. 16/583,989, mailed on Jul. 10, 2020, 23 pages.

Final Office Action received for U.S. Appl. No. 16/584,321, mailed on May 22, 2020, 12 pages.

Final Office Action received for U.S. Appl. No. 16/584,347, mailed on Jun. 10, 2020, 20 pages.

Final Office Action received for U.S. Appl. No. 16/584,490, mailed on May 1, 2020, 48 pages.

Final Office Action received for U.S. Appl. No. 16/922,675, mailed on Dec. 3, 2020, 21 pages.

Final Office Action received for U.S. Appl. No. 16/922,675, mailed on Nov. 30, 2020, 12 pages.

International Search Report and Written Opinion received for PCT Patent Application No. PCT/US2020/025526, mailed on Aug. 11, 2020, 18 pages.

International Search Report and Written Opinion received for PCT Patent Application No. PCT/US2020/035488, mailed on Nov. 17, 2020, 21 pages.

Invitation to Pay Additional Fees received for PCT Patent Application No. PCT/US2020/025526, mailed on Jun. 15, 2020, 12 pages.

Invitation to Pay Additional Fees received for PCT Patent Application No. PCT/US2020/035488, mailed on Sep. 23, 2020, 15 pages.

Non-Final Office Action received for U.S. Appl. No. 16/583,989, mailed on Jan. 24, 2020, 20 pages.

Non-Final Office Action received for U.S. Appl. No. 16/584,321, mailed on Jan. 7, 2020, 19 pages.

Non-Final Office Action received for U.S. Appl. No. 16/584,347, mailed on Dec. 20, 2019, 16 pages.

Non-Final Office Action received for U.S. Appl. No. 16/584,490, mailed on Dec. 10, 2019, 27 pages.

Non-Final Office Action received for U.S. Appl. No. 16/922,675, mailed on Aug. 13, 2020, 17 pages.

Non-Final Office Action received for U.S. Appl. No. 16/922,675, mailed on May 4, 2021, 23 pages.

Non-Final Office Action received for U.S. Appl. No. 17/062,891, mailed on Jul. 13, 2021, 12 pages.

Notice of Allowance received for U.S. Appl. No. 16/583,989, mailed on Apr. 1, 2021, 5 pages.

Notice of Allowance received for U.S. Appl. No. 16/583,989, mailed on Dec. 24, 2020, 7 pages.

Notice of Allowance received for U.S. Appl. No. 16/584,321, mailed on Aug. 25, 2020, 9 pages.

Notice of Allowance received for U.S. Appl. No. 16/584,347, mailed on Sep. 15, 2020, 9 pages.

Notice of Allowance received for U.S. Appl. No. 16/584,490, mailed on Aug. 27, 2020, 13 pages.

Notice of Allowance received for U.S. Appl. No. 16/584,490, mailed on Mar. 26, 2021, 13 pages.

Notice of Allowance received for U.S. Appl. No. 16/888,775, mailed on Jul. 26, 2021, 5 pages.

Notice of Allowance received for U.S. Appl. No. 16/888,775, mailed on Jun. 3, 2021, 11 pages.

Notice of Allowance received for U.S. Appl. No. 16/922,675, mailed on Jan. 21, 2021, 7 pages.

Notice of Allowance received for U.S. Appl. No. 16/922,675, mailed on Sep. 27, 2021, 10 pages.

Smart Home App—What is the Widget, Online Available at: https://support.vivint.com/s/article/Vivint-Smart-Home-App-What-is-the-Widget, Jan. 26, 2019, 4 pages.

Supplemental Notice of Allowance received for U.S. Appl. No. 16/584,490, mailed on Apr. 13, 2021, 2 pages.

Akshay, "Control your SmartThings compatible devices on the Gear S2 and S3 with the Smarter Things app", Online available at: https://iotgadgets.com/2017/09/control-smartthings-compatible-devices-gear-s2-s3-smarter-things-app/, Sep. 7, 2017, 4 pages.

Gookin Dan, "Lock Screen Settings on Your Android Phone", Online Available at: https://www.dummies.com/consumer-electronics/smartphones/droid/lock-screen-settings-on-your-android-phone/, Sep. 23, 2015, 6 pages.

Locklear Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.

Low Cherlynn, "So you bought a smartwatch. Now what?", Online available at: https://www.engadget.com/2018-02-06-how-to-set-up-your-smartwatch.html, Feb. 6, 2018, 19 pages.

Samsung, "Control an individual smart device on your watch", Online Available at: https://www.samsung.com/us/support/troubleshooting/TSG01003208/, Nov. 9, 2018, 1 page.

Samsung, "Problems with SmartThings on your Samsung Smartwatch", Online Available at: https://www.samsung.com/us/support/troubleshooting/TSG01003169/#smartthings-error-on-samsung-smartwatch, Nov. 9, 2018, 10 pages.

Samsung, "Samsung—User manual—Galaxy Watch", Online available at: https://content.abt.com/documents/90234/SM-R810NZDAXAR-use.pdf, Aug. 24, 2018, 102 pages.

Stroud Forrest, "Screen Lock Meaning & Definition", Online Available at: https://www.webopedia.com/definitions/screen-lock, Jan. 30, 2014, 3 pages.

Extended European Search Report received for European Patent Application No. 23213039.3, mailed on Jan. 31, 2024, 10 pages.

(56) References Cited

OTHER PUBLICATIONS

Non-Final Office Action received for U.S. Appl. No. 17/489,508, mailed on Jan. 31, 2024, 29 pages.
Notice of Allowance received for Chinese Patent Application No. 202310465764.7, mailed on Jan. 18, 2024, 5 pages (1 page of English Translation and 4 pages of Official Copy).
Office Action received for Indian Patent Application No. 202117048581, mailed on Feb. 1, 2024, 6 pages.
Decision to Grant received for European Patent Application No. 20720675.6, mailed on Jan. 18, 2024, 3 pages.
Notice of Allowance received for Japanese Patent Application No. 2023-109549, mailed on Jan. 9, 2024, 4 pages (1 page of English Translation and 3 pages of Official Copy).
Applicant-Initiated Interview Summary received for U.S. Appl. No. 17/468,286, mailed on Nov. 24, 2023, 4 pages.
Notice of Allowance received for Korean Patent Application No. 10-2022-7018896, mailed on Nov. 24, 2023, 7 pages (2 pages of English Translation and 5 pages of Official Copy).
Office Action received for Japanese Patent Application No. 2023-109549, mailed on Sep. 8, 2023, 6 pages (3 pages of English Translation and 3 pages of Official Copy).
Office Action received for Korean Patent Application No. 10-2023-7008877, mailed on Nov. 29, 2023, 7 pages (3 pages of English Translation and 4 pages of Official Copy).
Notice of Acceptance received for Australian Patent Application No. 2023201189, mailed on Nov. 2, 2023, 3 pages.
Office Action received for Japanese Patent Application No. 2022-129377, mailed on Nov. 10, 2023, 6 pages (3 pages of English Translation and 3 pages of Official Copy).
International Preliminary Report on Patentability received for PCT Patent Application No. PCT/US2022/032340, mailed on Dec. 21, 2023, 13 pages.
Notice of Allowance received for U.S. Appl. No. 17/468,286, mailed on Jan. 4, 2024, 18 pages.
Applicant-Initiated Interview Summary received for U.S. Appl. No. 17/489,508, mailed on Mar. 6, 2024, 5 pages.
Corrected Notice of Allowance received for U.S. Appl. No. 17/468,286, mailed on Feb. 8, 2024, 7 pages.
Corrected Notice of Allowance received for U.S. Appl. No. 18/207,053, mailed on Apr. 4, 2024, 4 pages.
Corrected Notice of Allowance received for U.S. Appl. No. 18/207,053, mailed on Mar. 22, 2024, 2 pages.
Final Office Action received for U.S. Appl. No. 17/489,508, mailed on May 22, 2024, 29 pages.
Non-Final Office Action received for U.S. Appl. No. 17/832,657, mailed on Apr. 24, 2024, 38 pages.
Notice of Allowance received for Japanese Patent Application No. 2022-129377, mailed on Apr. 26, 2024, 4 pages (1 page of English Translation and 3 pages of Official Copy).
Notice of Allowance received for Korean Patent Application No. 10-2023-7008877, mailed on Feb. 20, 2024, 7 pages (2 pages of English Translation and 5 pages of Official Copy).
Notice of Allowance received for U.S. Appl. No. 18/207,053, mailed on Mar. 13, 2024, 10 pages.
Office Action received for Chinese Patent Application No. 202311321231.8, mailed on Mar. 10, 2024, 15 pages (9 pages of English Translation and 6 pages of Official Copy).
Office Action received for Indian Patent Application No. 202117053967, mailed on May 31, 2024, 7 pages.
Office Action received for Indian Patent Application No. 202118049678, mailed on Apr. 18, 2024, 8 pages.
Office Action received for Korean Patent Application No. 10-2024-7000828, mailed on May 21, 2024, 6 pages (2 pages of English Translation and 4 pages of Official Copy).
"Create Confirmation Dialog Box—Matlab Ulconfirm", Online available at: https://www.mathworks.com/help/matlab/ref/uiconfirm.html, 2017, 19 pages.
Non-Final Office Action received for U.S. Appl. No. 18/234,613, mailed on Jul. 1, 2024, 19 pages.
Office Action received for Australian Patent Application No. 2023274186, mailed on Jul. 8, 2024, 2 pages.
"Window confirm()", Online available at: https://www.w3schools.com/jsref/met_win_confirm.asp, 2014, 5 pages.
Applicant-Initiated Interview Summary received for U.S. Appl. No. 17/489,508. mailed on Aug. 20, 2024, 2 pages.
Notice of Acceptance received for Australian Patent Application No. 2023274186, mailed on Aug. 22, 2024, 3 pages.
Notice of Allowance received for Korean Patent Application No. 10-2024-7000828, mailed on Aug. 7, 2024, 7 pages (2 pages of English Translation and 5 pages of Official Copy).
Office Action received for Chinese Patent Application No. 202311321231.8, mailed on Jul. 28, 2024, 9 pages (5 pages of English Translation and 4 pages of Official Copy).
Office Action received for Australian Patent Application No. 2023266353, mailed on Sep. 19, 2024, 2 pages.
Applicant-Initiated Interview Summary received for U.S. Appl. No. 17/489,508, mailed on Jul. 31, 2024, 6 pages.
Applicant-Initiated Interview Summary received for U.S. Appl. No. 17/832,657, mailed on Aug. 1, 2024, 3 pages.
Examiner-Initiated Interview Summary received for U.S. Appl. No. 18/234,613, mailed on Aug. 9, 2024, 2 pages.
Intention to Grant received for European Patent Application No. 23168537.1, mailed on Jul. 25, 2024, 8 pages.
Non-Final Office Action received for U.S. Appl. No. 17/489,508, mailed on Sep. 10, 2024, 28 pages.
Applicant-Initiated Interview Summary received for U.S. Appl. No. 17/489,508, mailed on Nov. 25, 2024, 6 pages.
Corrected Notice of Allowance received for U.S. Appl. No. 18/234,613, mailed on Jan. 10, 2025, 5 pages.
Corrected Notice of Allowance received for U.S. Appl. No. 18/234,613, mailed on Nov. 20, 2024, 2 pages.
Corrected Notice of Allowance received for U.S. Appl. No. 18/234,613, mailed on Oct. 28, 2024, 2 pages.
Final Office Action received for U.S. Appl. No. 17/489,508, mailed on Jan. 28, 2025, 27 pages.
Final Office Action received for U.S. Appl. No. 17/832,657, mailed on Oct. 18, 2024, 46 pages.
Intention to Grant received for European Patent Application No. 23168537.1, mailed on Dec. 2, 2024, 8 pages.
Notice of Acceptance received for Australian Patent Application No. 2023266353, mailed on Oct. 1, 2024, 3 pages.
Notice of Allowance received for Chinese Patent Application No. 202410271615.1, mailed on Oct. 24, 2024, 5 pages (1 page of English Translation and 4 pages of Official Copy).
Notice of Allowance received for Chinese Patent Application No. 202410272195.9, mailed on Oct. 25, 2024, 5 pages (1 page of English Translation and 4 pages of Official Copy).
Notice of Allowance received for U.S. Appl. No. 18/234,613, mailed on Dec. 12, 2024, 7 pages.
Notice of Allowance received for U.S. Appl. No. 18/234,613, mailed on Oct. 11, 2024, 10 pages.
Office Action received for Australian Patent Application No. 2024278098, mailed on Jan. 22, 2025, 3 pages.
Szogyenyi Zina, "Improving the usability of multi-selecting from a long list", Available online at: https://medium.com/tripaneer-techblog/improving-the-usability-of-multi-selecting-from-a-long-list-63e1a67aab35, Jun. 13, 2018, 12 pages.
Office Action received for European Patent Application No. 21802516.1, mailed on Mar. 31, 2025, 4 pages.

* cited by examiner

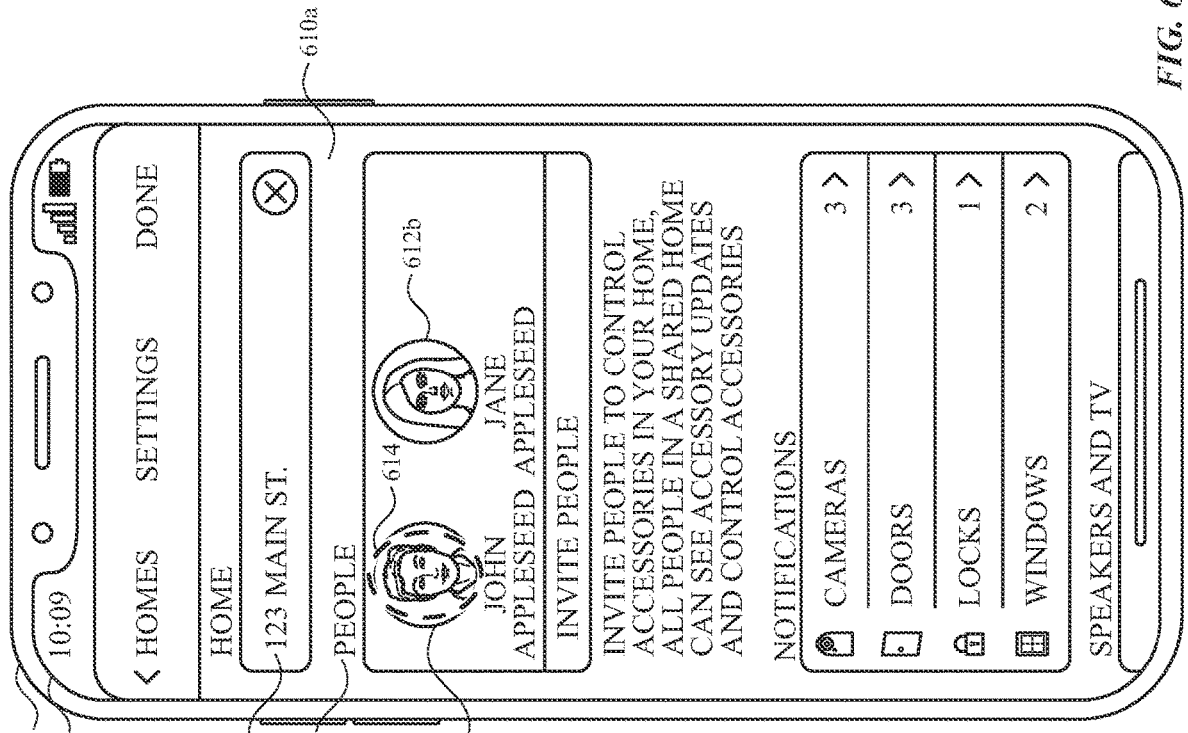
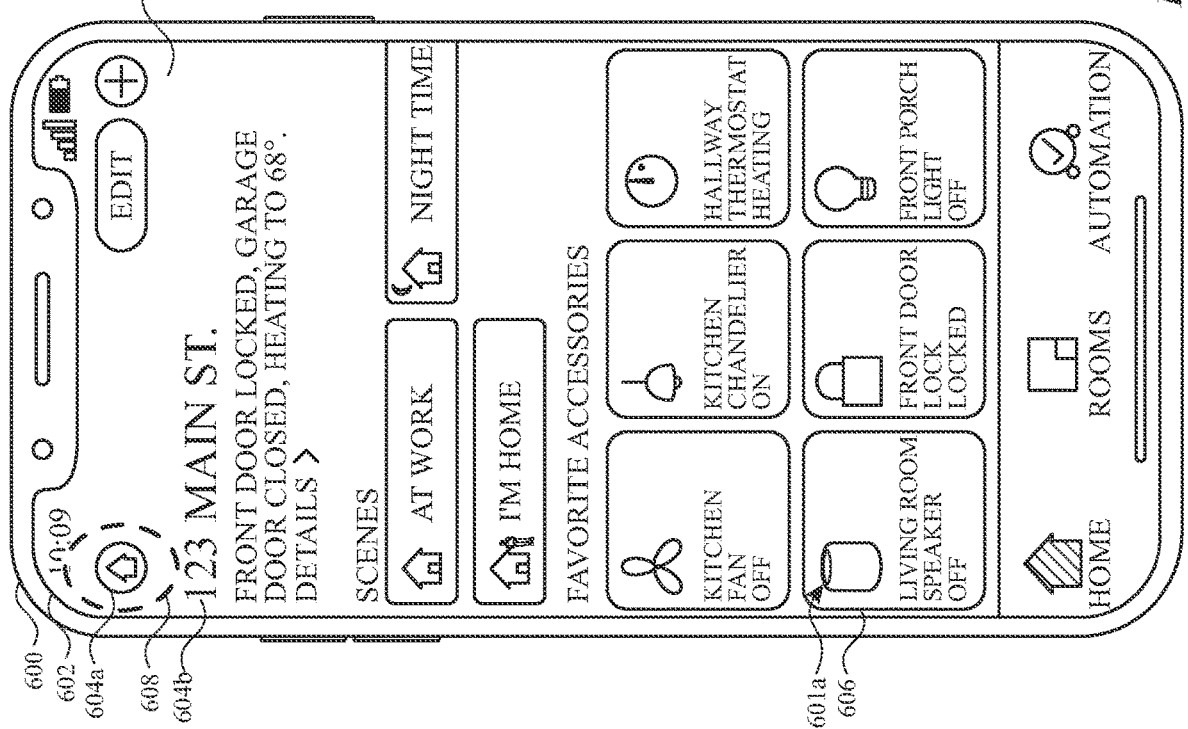
FIG. 6B
FIG. 6A

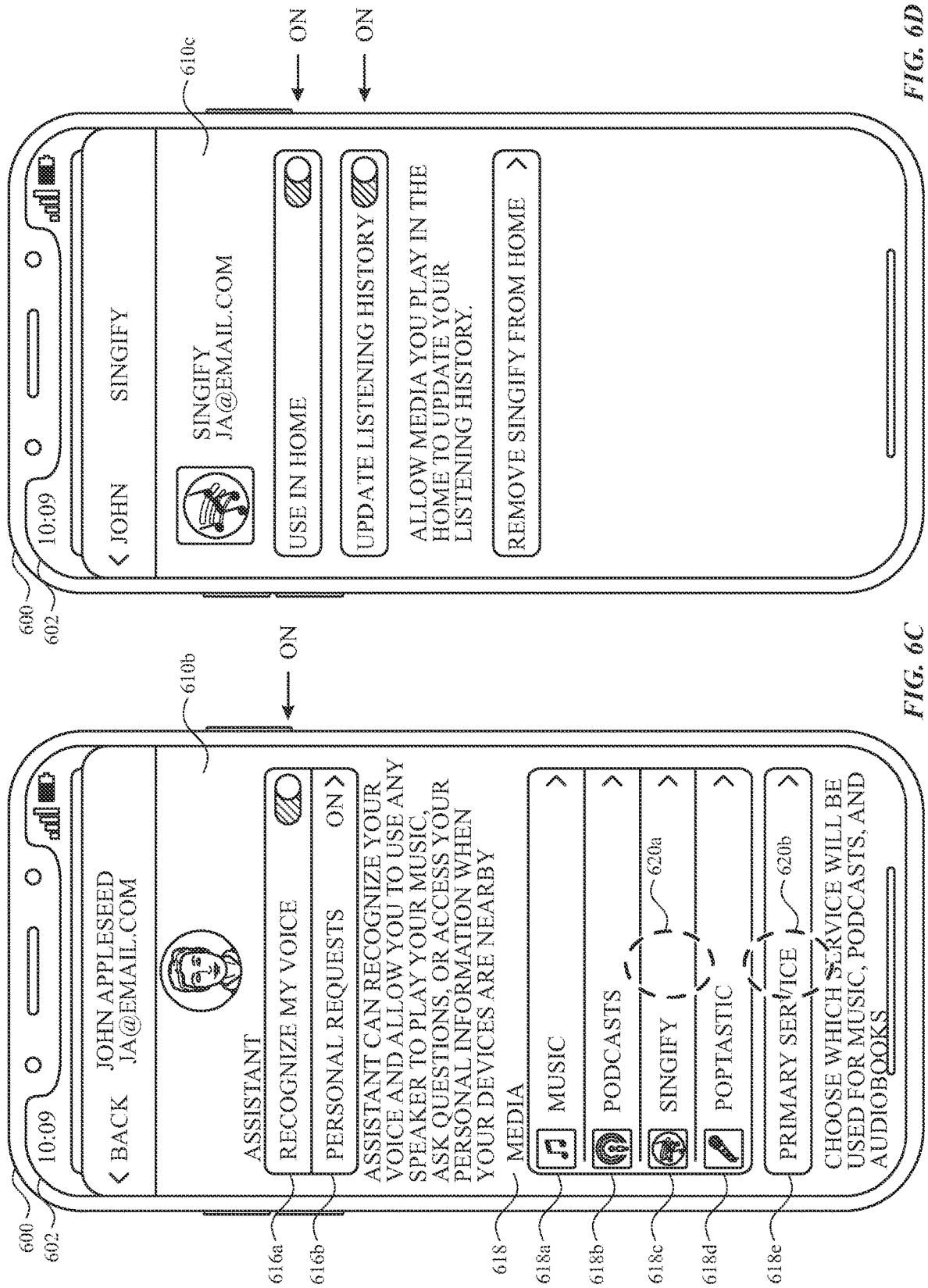

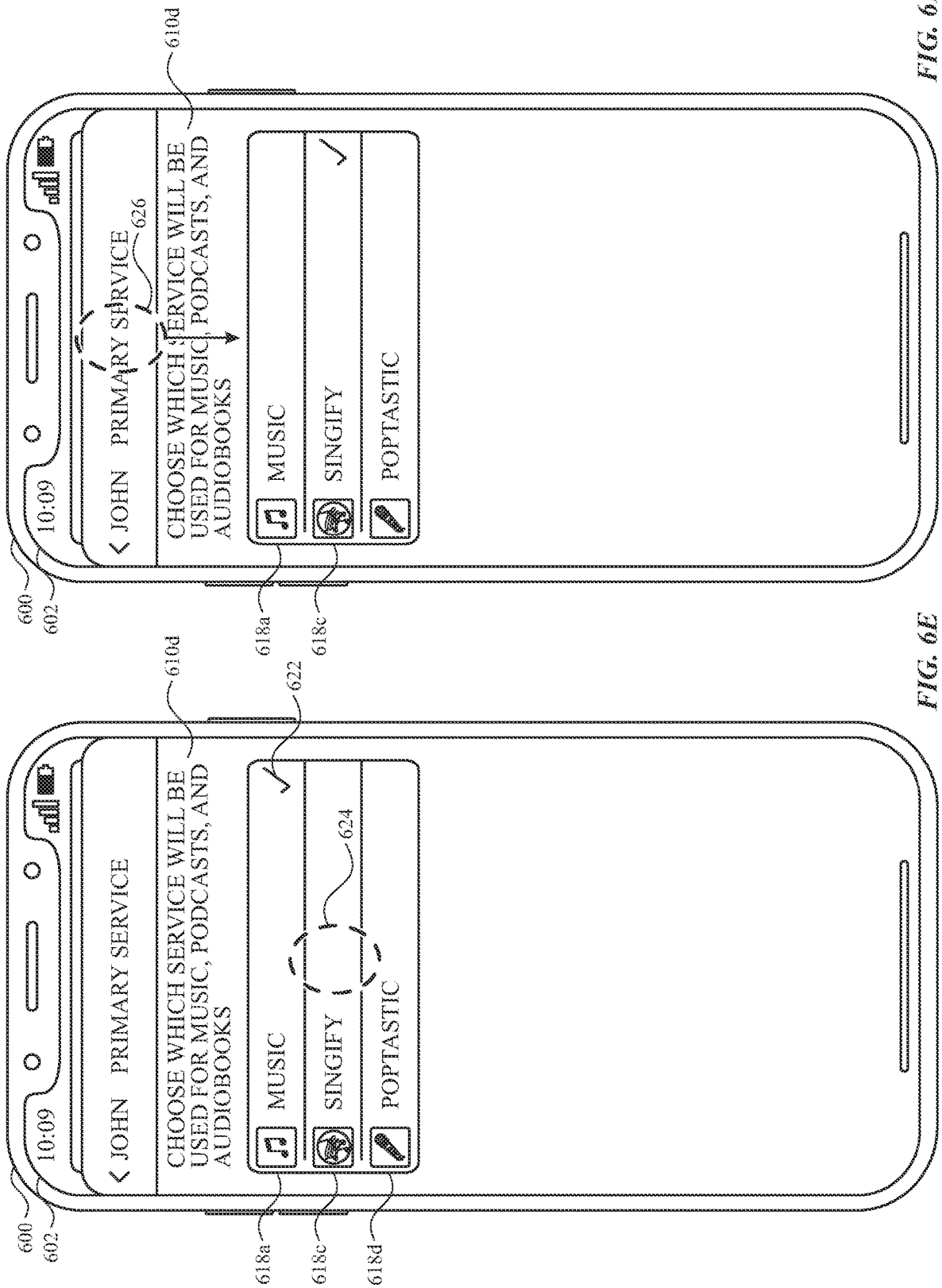

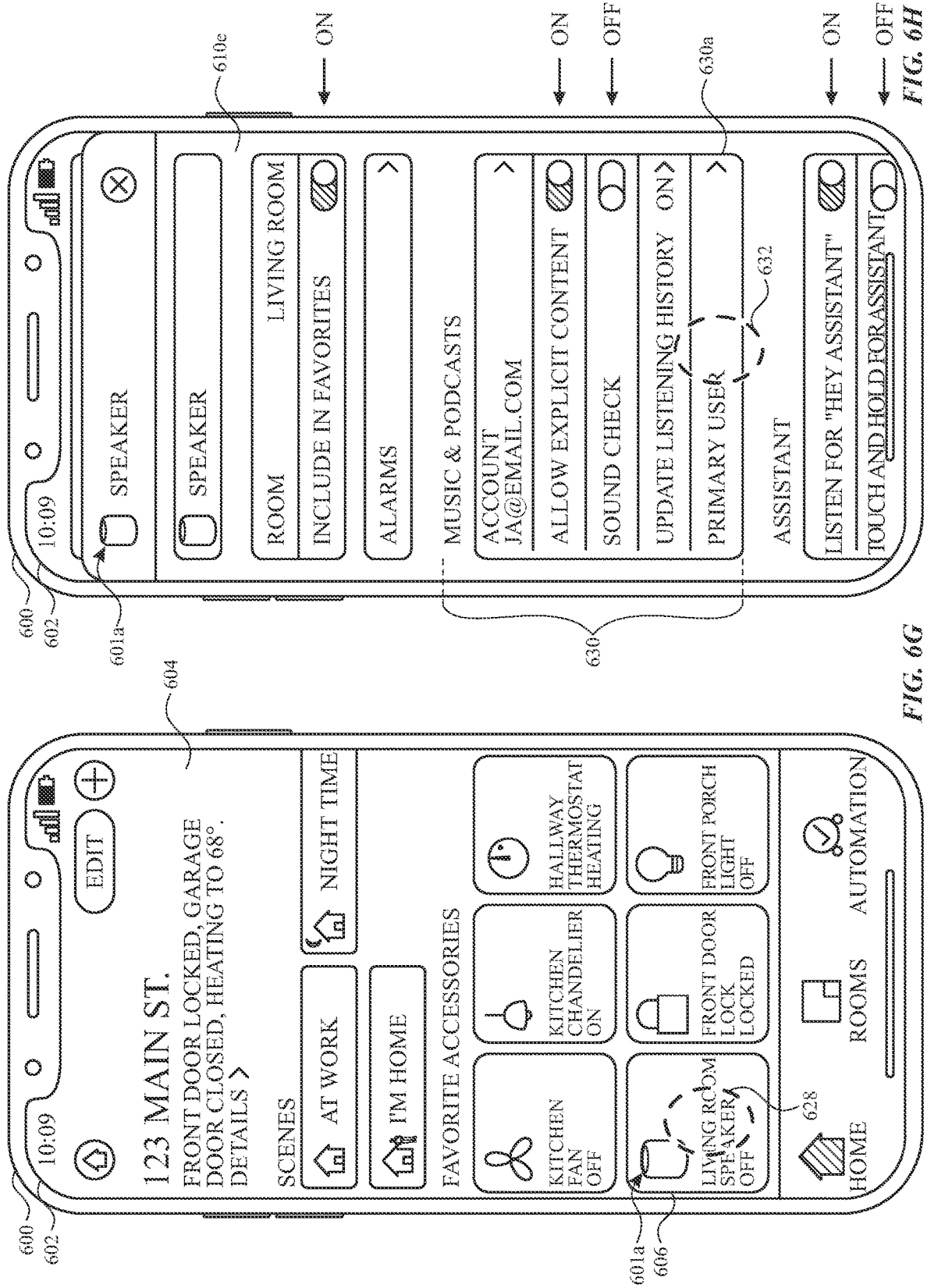

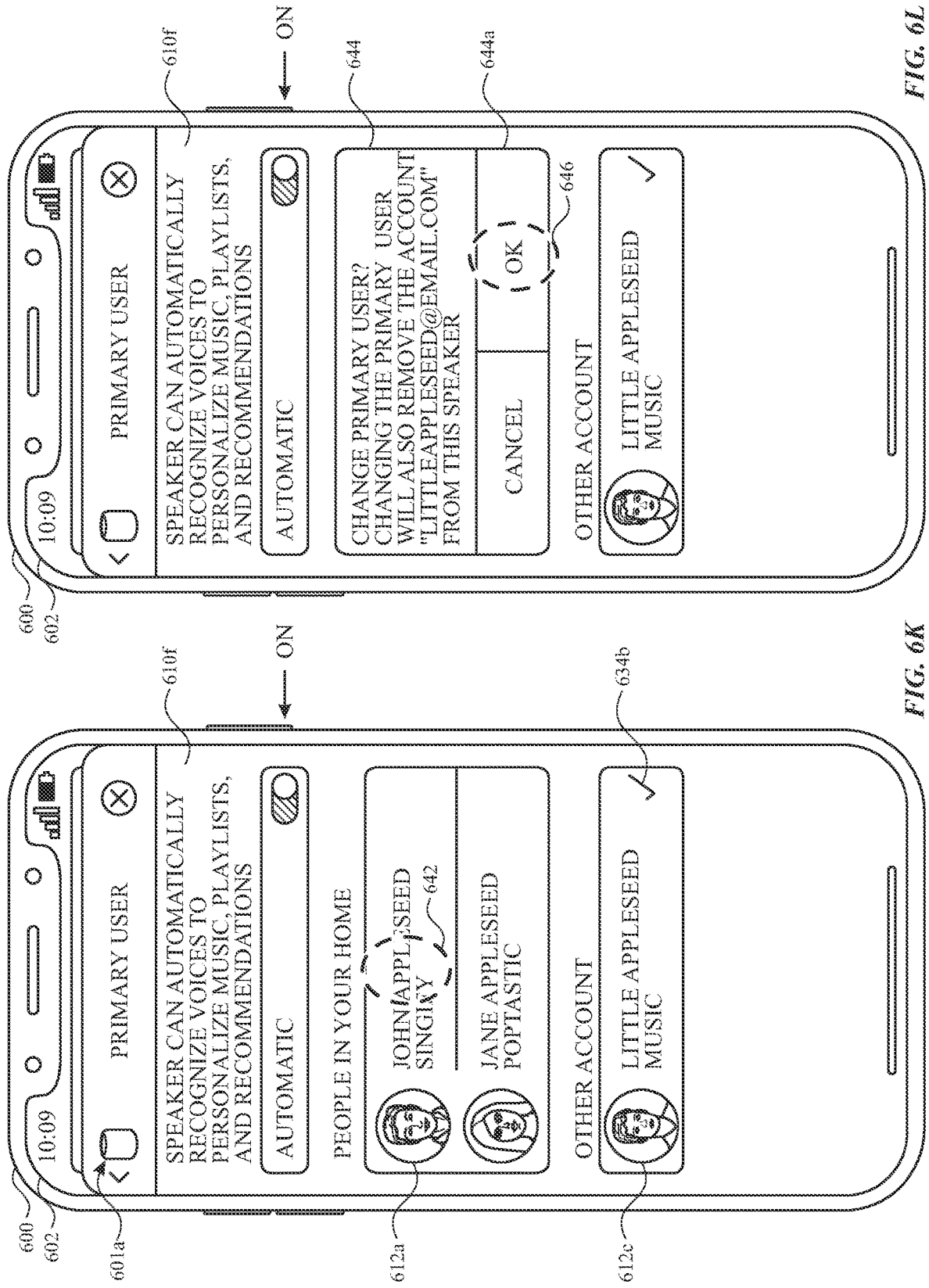

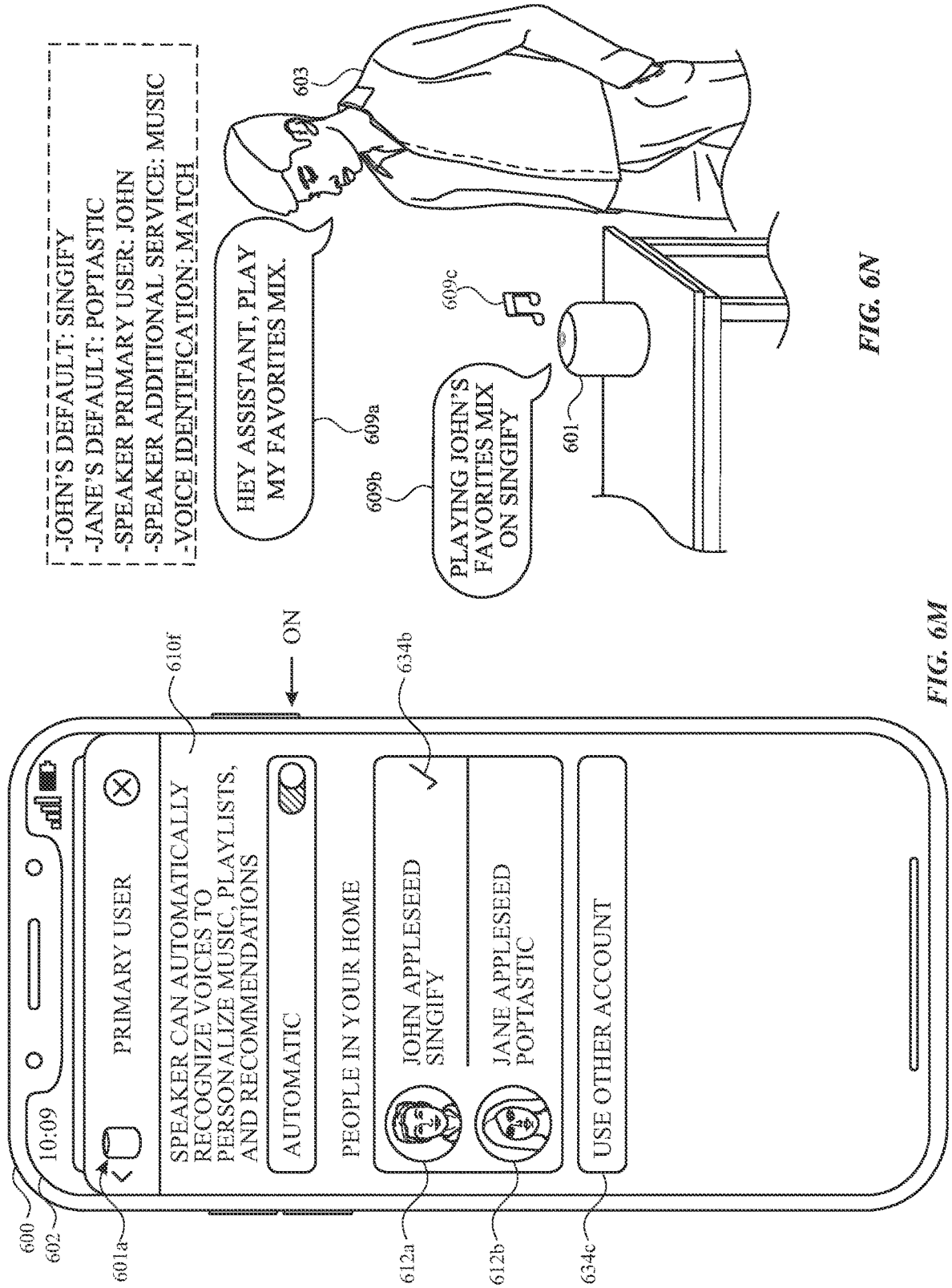

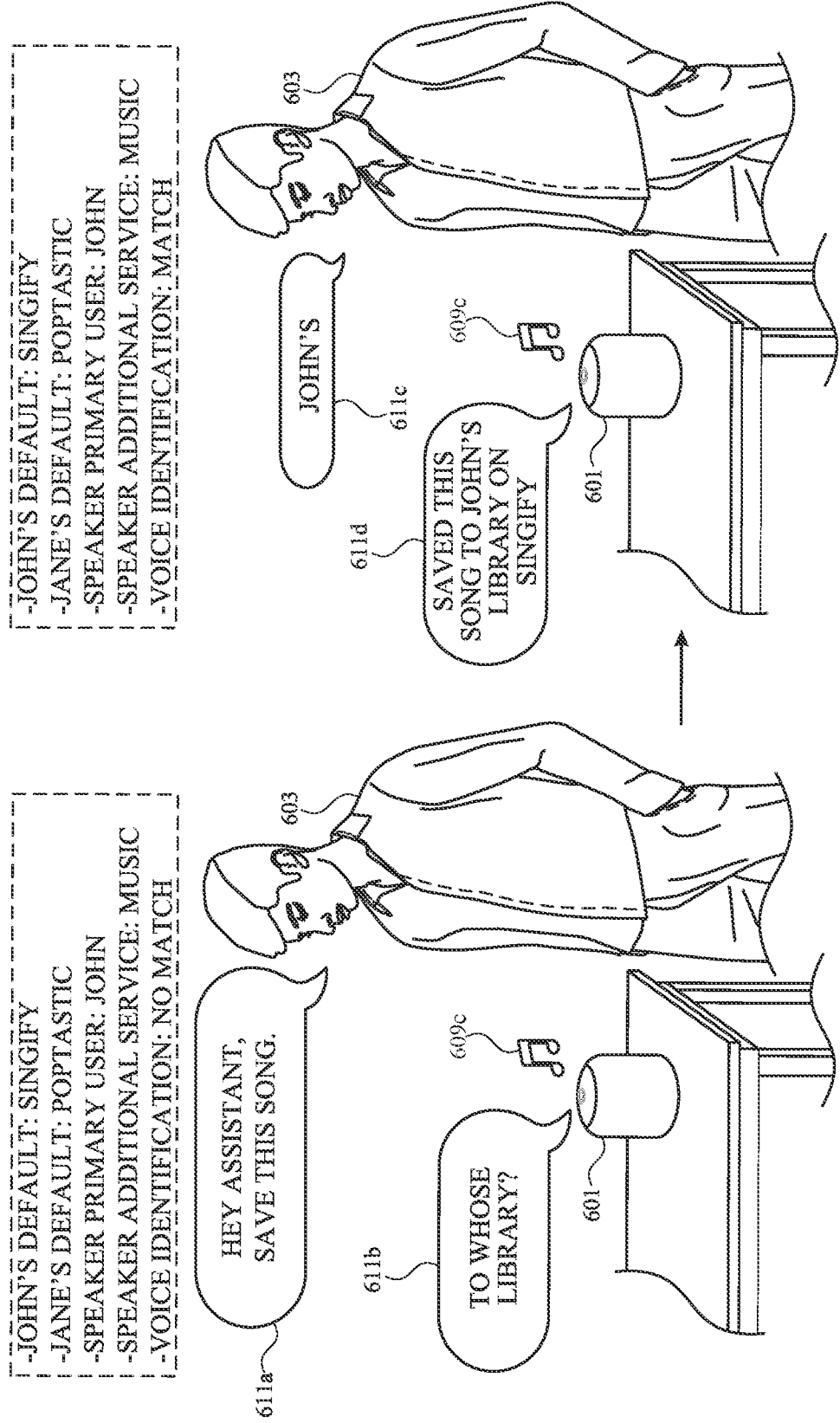

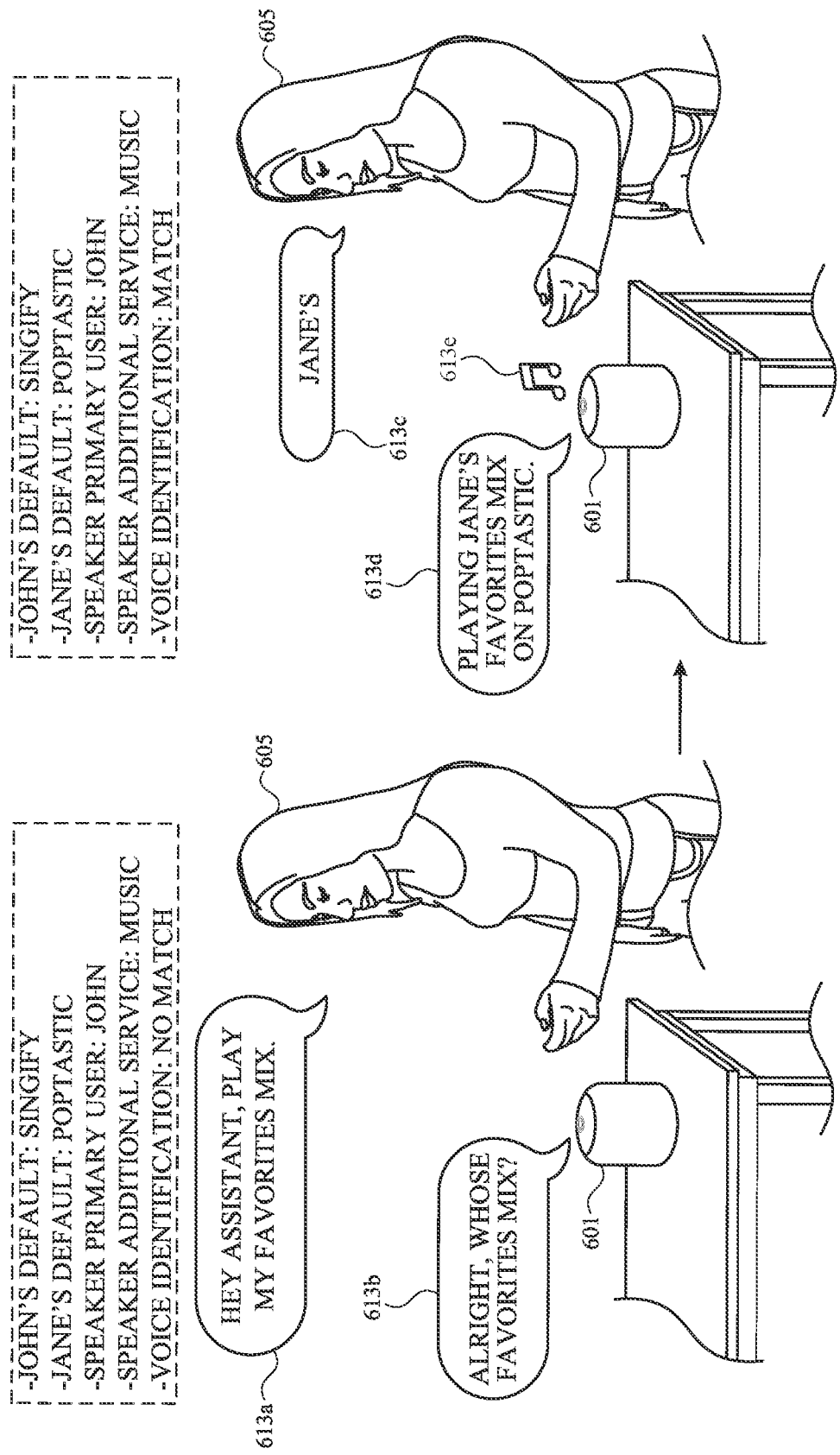

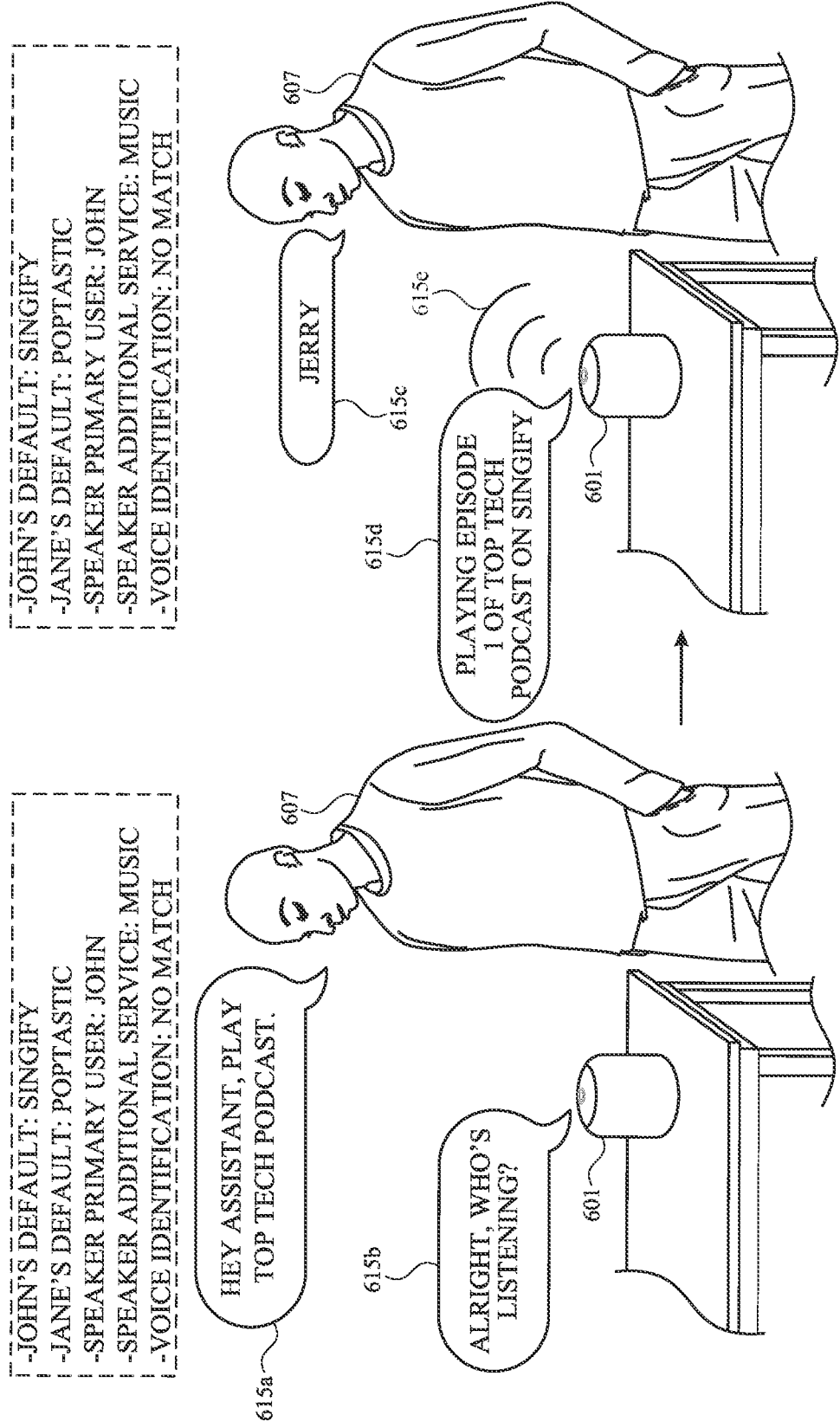

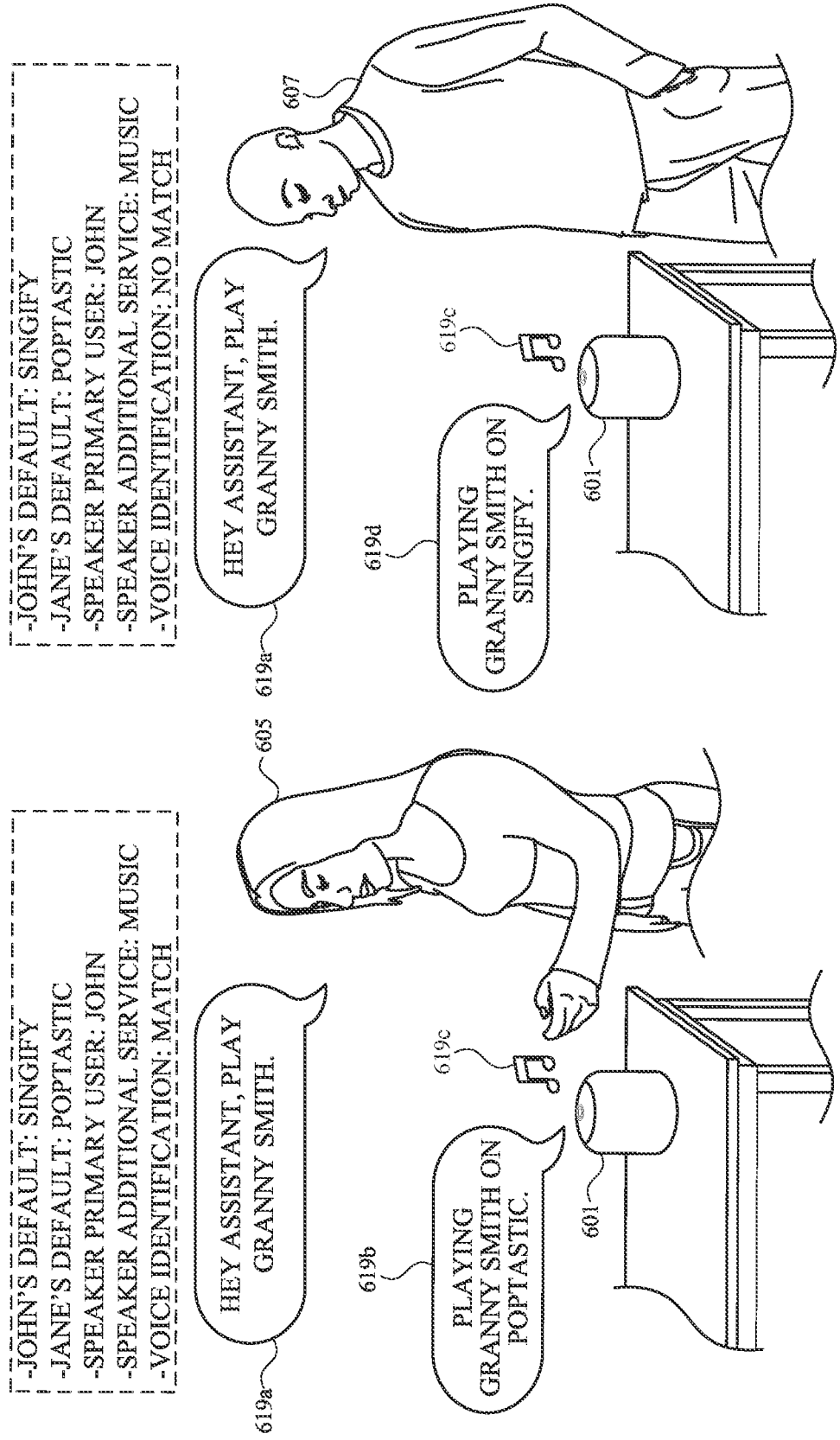

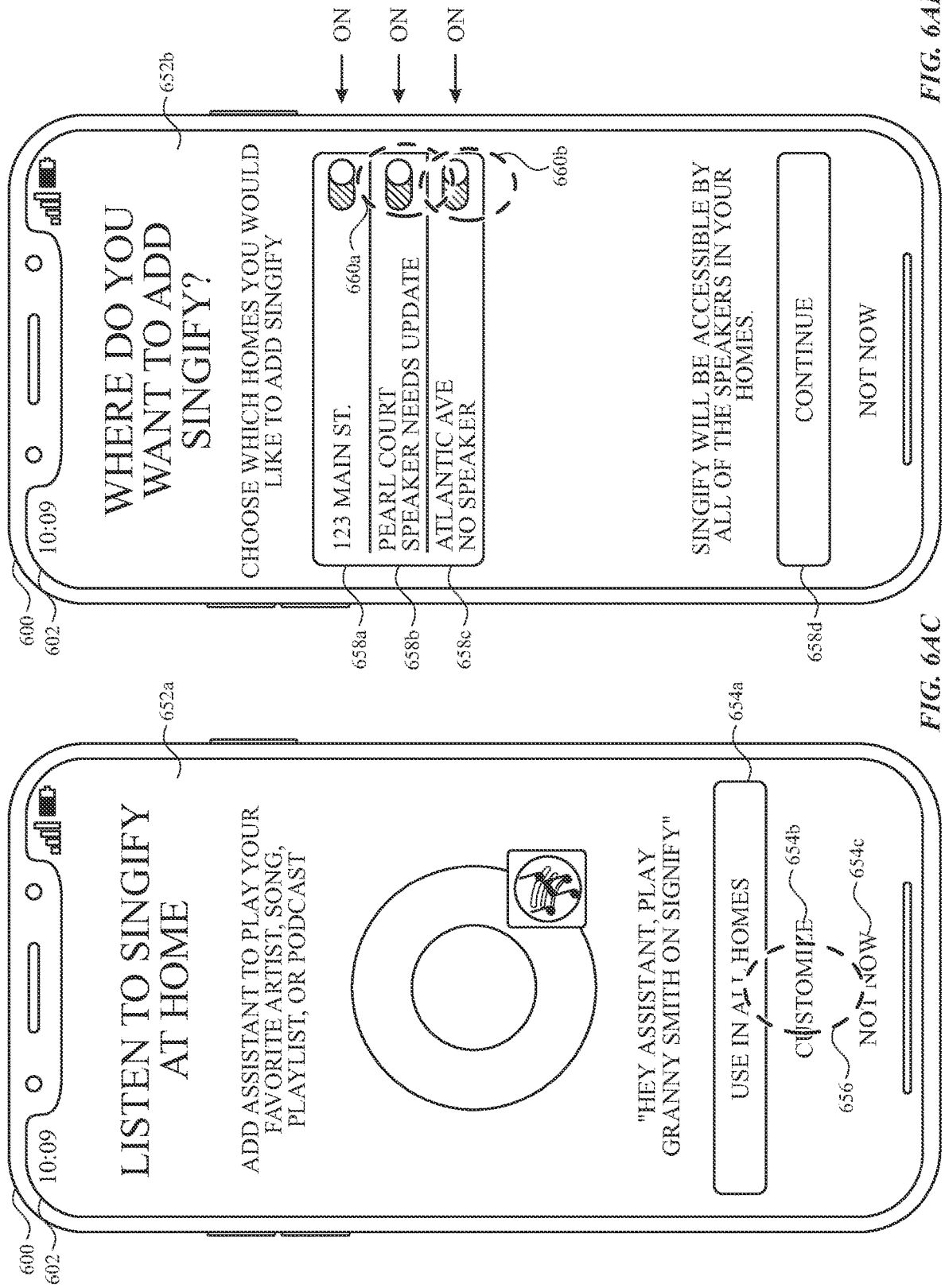

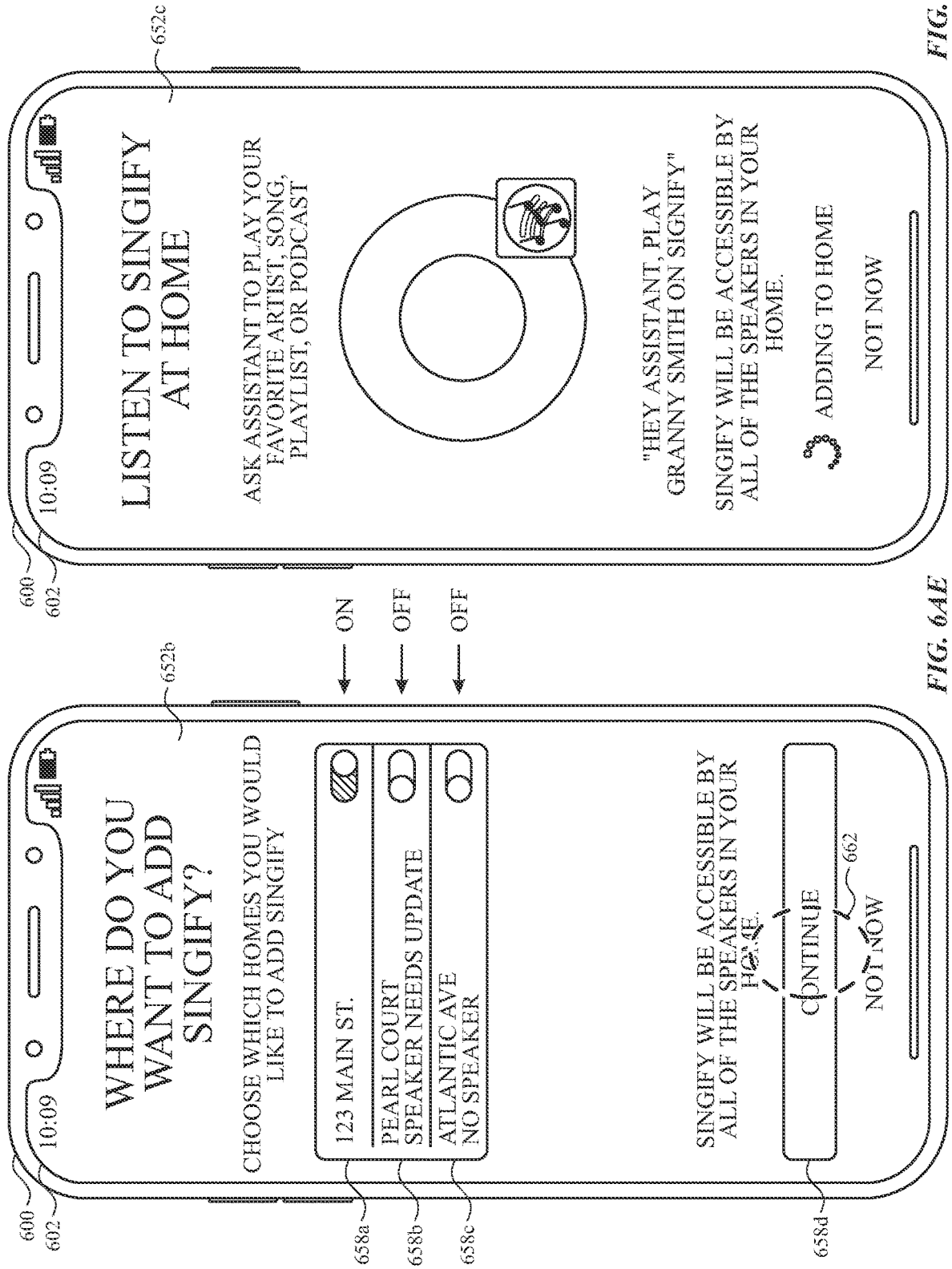

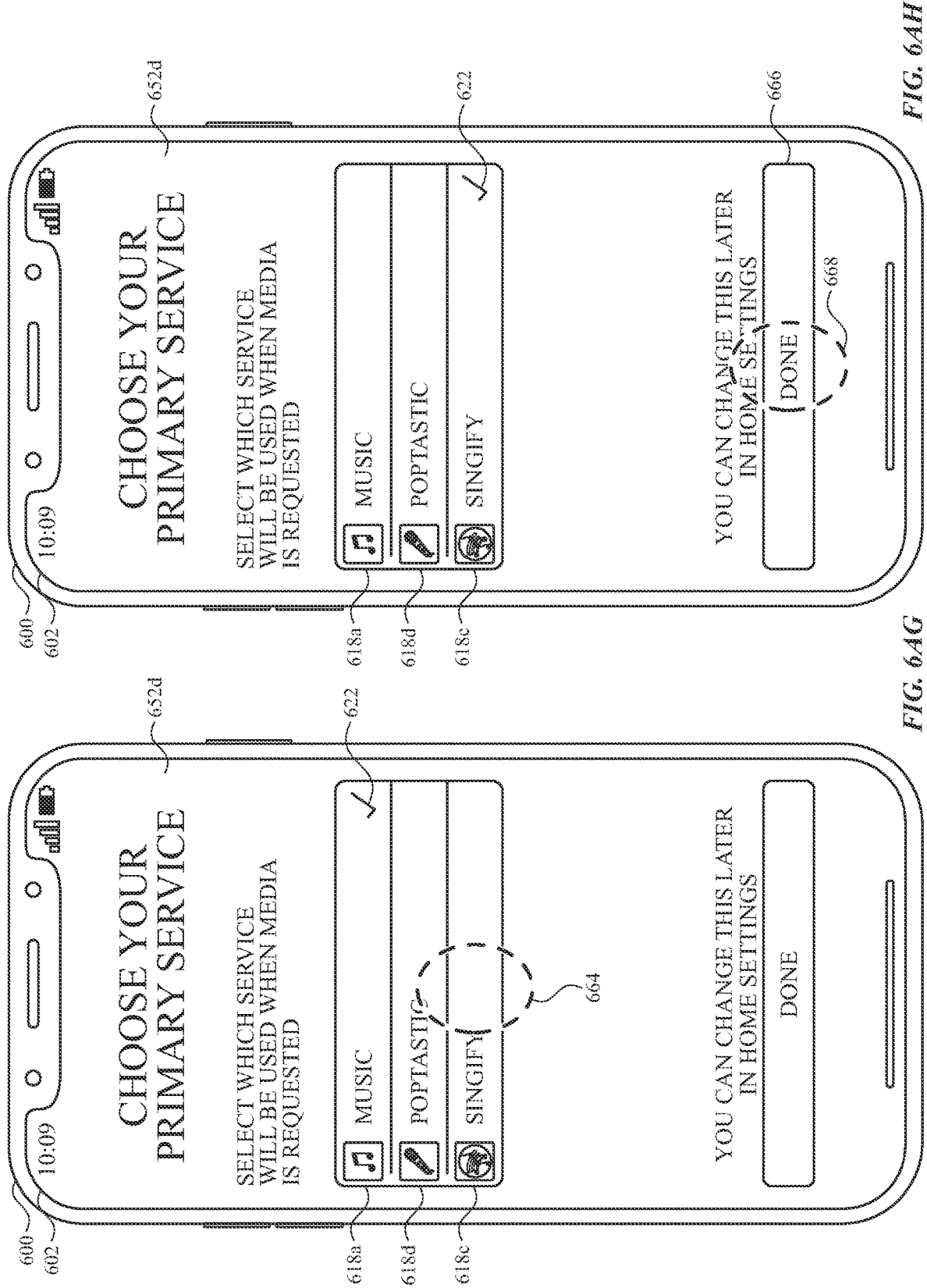

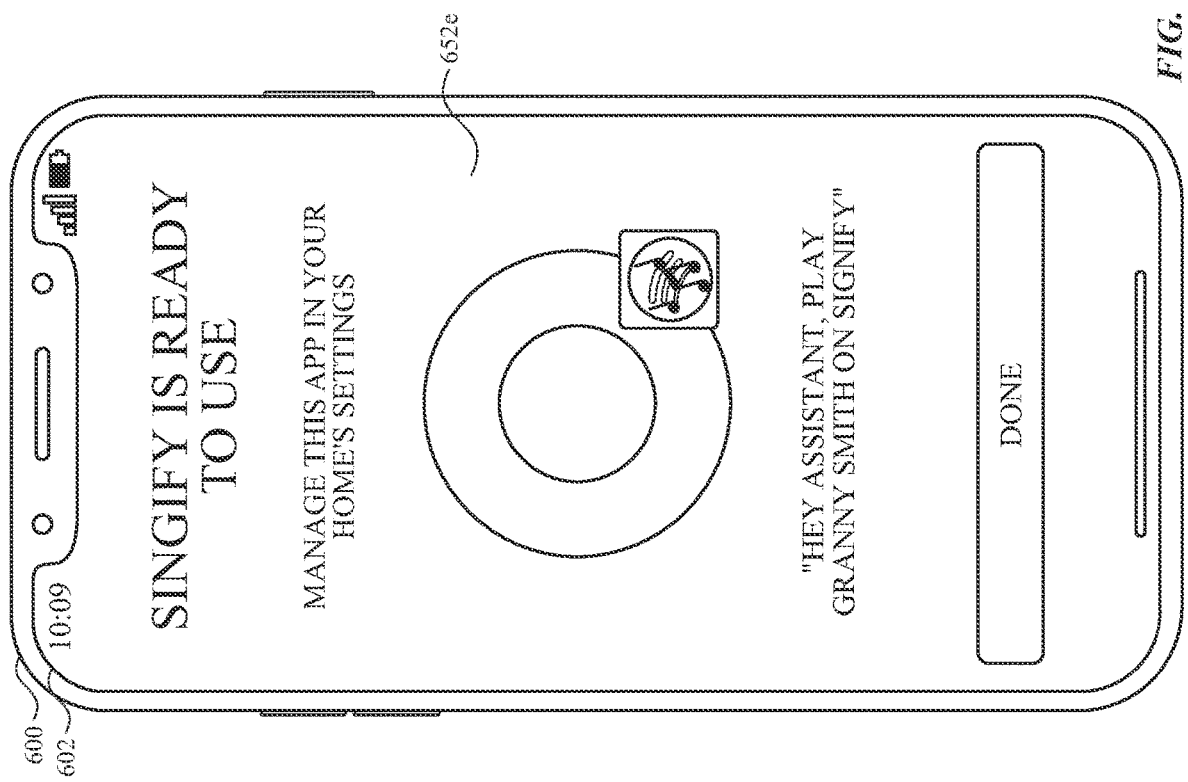

MEDIA SERVICE CONFIGURATION

CROSS-REFERENCE TO RELATED APPLICATIONS

This application claims priority to U.S. Provisional Patent Application No. 63/090,598, entitled "MEDIA SERVICE CONFIGURATION", filed Oct. 12, 2020, the entire contents of which is hereby incorporated by reference.

FIELD

The present disclosure relates generally to computer user interfaces, and more specifically to techniques for media request handling by electronic devices having multiple users.

BACKGROUND

The number of electronic devices, and particularly smart devices, in users' homes continues to increase. These devices are required to perform increasingly complex tasks, including user-specific tasks in multi-user environments.

BRIEF SUMMARY

Some techniques for media request handling by electronic devices having multiple users, however, are generally cumbersome and inefficient. For example, some existing techniques use a complex and time-consuming user interface, which may include multiple key presses, keystrokes, or verbal inputs. Existing techniques require more time than necessary (e.g., to identify a selected operation) and/or can perform the wrong operation (e.g., responding to a request with the incorrect media source or service), wasting user time and device energy. This latter consideration is particularly important in battery-operated devices.

Accordingly, the present technique provides electronic devices with faster, more efficient, and less error prone methods and interfaces for media service configuration of multiple users. Such methods and interfaces optionally complement or replace other methods for media request handling by electronic devices having multiple users. Such methods and interfaces reduce the cognitive burden on a user and produce a more efficient human-machine interface. For battery-operated computing devices, such methods and interfaces conserve power and increase the time between battery charges.

In accordance with some embodiments, a method, performed at a computer system that is in communication with one or more input devices and one or more output devices is described. The method includes: receiving, via the one or more input devices, a first request to play media; in response to receiving the first request to play media and in accordance with a determination that the first request to play media meets a first set of request type criteria: in accordance with a determination that the first request was made by a first identified user, playing, via the one or more output devices, the requested media using a first source specified by the first identified user; and in accordance with a determination that the first request to play media meets a second set of request type criteria, that includes a criterion that is met when the first request is not recognized as having been made by an identifiable user, playing, via the one or more output devices, the requested media using a second source that is selected based on a result of a set of one or more user identity determination operations.

In accordance with some embodiments, a non-transitory computer-readable storage medium storing one or more programs configured to be executed by one or more processors of a computer system that is in communication with one or more input devices and one or more output devices is described. The one or more programs include instructions for: receiving, via the one or more input devices, a first request to play media; in response to receiving the first request to play media and in accordance with a determination that the first request to play media meets a first set of request type criteria: in accordance with a determination that the first request was made by a first identified user, playing, via the one or more output devices, the requested media using a first source specified by the first identified user; and in accordance with a determination that the first request to play media meets a second set of request type criteria, that includes a criterion that is met when the first request is not recognized as having been made by an identifiable user, playing, via the one or more output devices, the requested media using a second source that is selected based on a result of a set of one or more user identity determination operations.

In accordance with some embodiments, a transitory computer-readable storage medium storing one or more programs configured to be executed by one or more processors of a computer system that is in communication with one or more input devices and one or more output devices is described. The one or more programs include instructions for: receiving, via the one or more input devices, a first request to play media; in response to receiving the first request to play media and in accordance with a determination that the first request to play media meets a first set of request type criteria: in accordance with a determination that the first request was made by a first identified user, playing, via the one or more output devices, the requested media using a first source specified by the first identified user; and in accordance with a determination that the first request to play media meets a second set of request type criteria, that includes a criterion that is met when the first request is not recognized as having been made by an identifiable user, playing, via the one or more output devices, the requested media using a second source that is selected based on a result of a set of one or more user identity determination operations.

In accordance with some embodiments, a computer system is described. The computer system includes: one or more input devices; one or more output devices; one or more processors; and memory storing one or more programs configured to be executed by the one or more processors. The one or more programs include instructions for: receiving, via the one or more input devices, a first request to play media; in response to receiving the first request to play media and in accordance with a determination that the first request to play media meets a first set of request type criteria: in accordance with a determination that the first request was made by a first identified user, playing, via the one or more output devices, the requested media using a first source specified by the first identified user; and in accordance with a determination that the first request to play media meets a second set of request type criteria, that includes a criterion that is met when the first request is not recognized as having been made by an identifiable user, playing, via the one or more output devices, the requested media using a second source that is selected based on a result of a set of one or more user identity determination operations.

In accordance with some embodiments, a computer system, including one or more input devices and one or more output devices, is described. The computer system also includes: means for receiving, via the one or more input devices, a first request to play media; means for, in response to receiving the first request to play media and in accordance with a determination that the first request to play media meets a first set of request type criteria: in accordance with a determination that the first request was made by a first identified user, playing, via the one or more output devices, the requested media using a first source specified by the first identified user; and in accordance with a determination that the first request to play media meets a second set of request type criteria, that includes a criterion that is met when the first request is not recognized as having been made by an identifiable user, playing, via the one or more output devices, the requested media using a second source that is selected based on a result of a set of one or more user identity determination operations.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for media service configuration of multiple users, thereby increasing the effectiveness, efficiency, and user satisfaction with such devices. Such methods and interfaces may complement or replace other methods for media request handling by electronic devices having multiple users.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for media request handling. Further, electronic devices in a multi-user environment preferably select the preferred media service of a particular user based on a request for media and user identification. Such techniques can reduce the cognitive burden on a user who accesses media services, thereby enhancing productivity and use of such devices. Further, such techniques can reduce processor and battery power otherwise wasted on redundant user inputs.

Figure 6A:
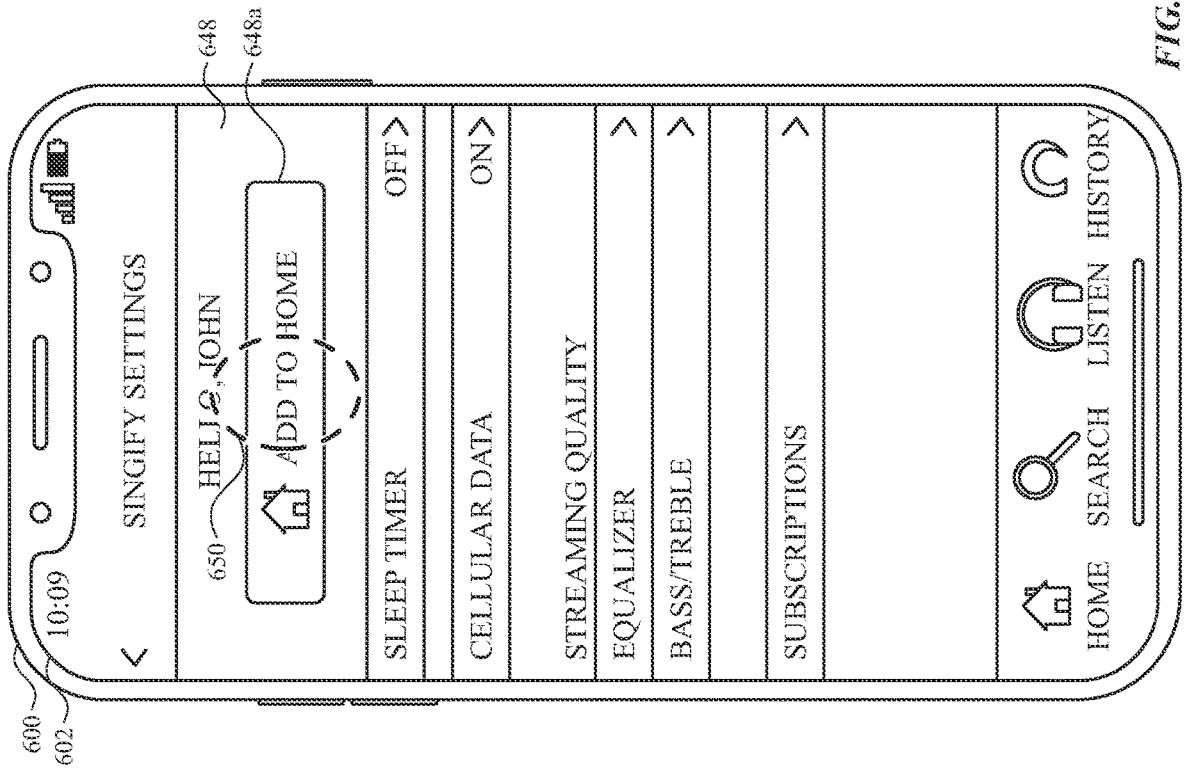
Figure 6A:
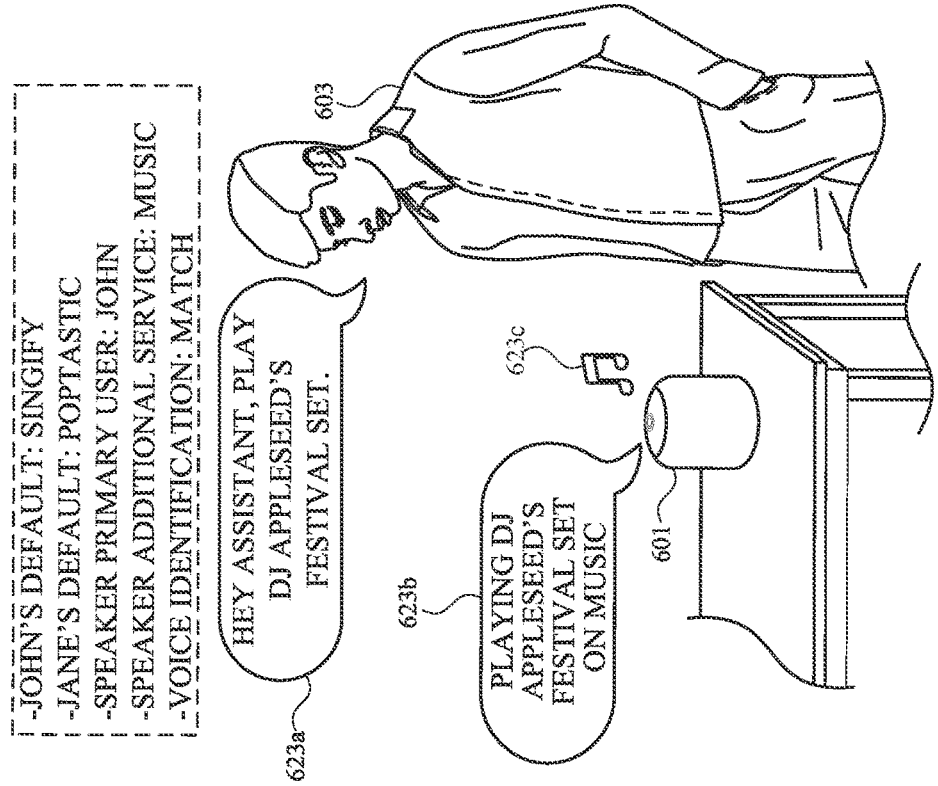
Figure 7:
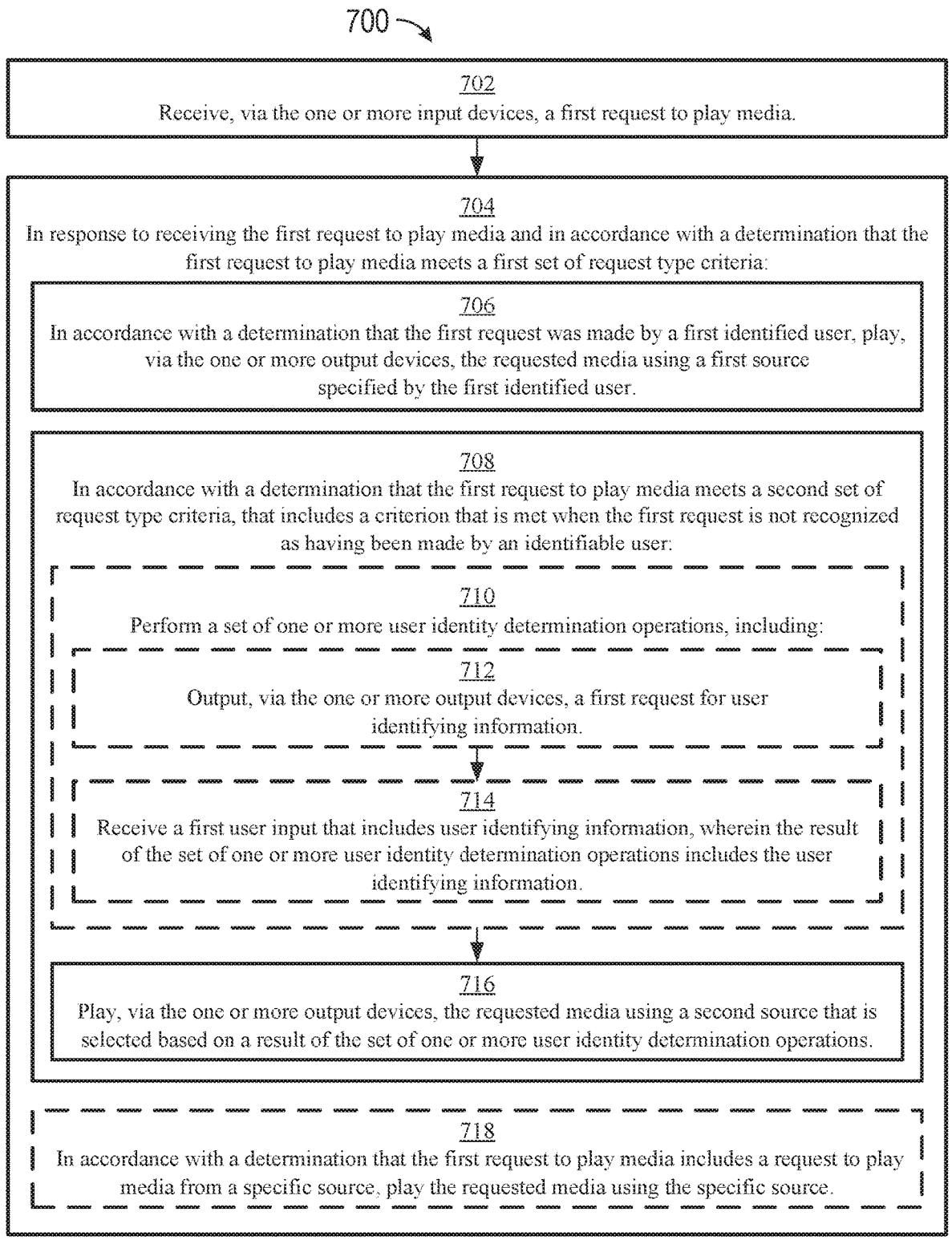
FIG. 7 is a flow diagram illustrating a method for media request handling by electronic devices having multiple users, in accordance with some embodiments.

Below, FIGS. 1A-1B, 2, 3, 4A-4B, and 5A-5D provide a description of exemplary devices for performing the techniques for media request handling by electronic devices having multiple users. FIGS. 6A-6AI illustrate exemplary user interfaces for media request handling by electronic devices having multiple users. FIG. 7 is a flow diagram illustrating methods of media request handling by electronic devices having multiple users in accordance with some embodiments. The user interfaces in FIGS. 6A-6AI are used to illustrate the processes described below, including the processes in FIG. 7.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
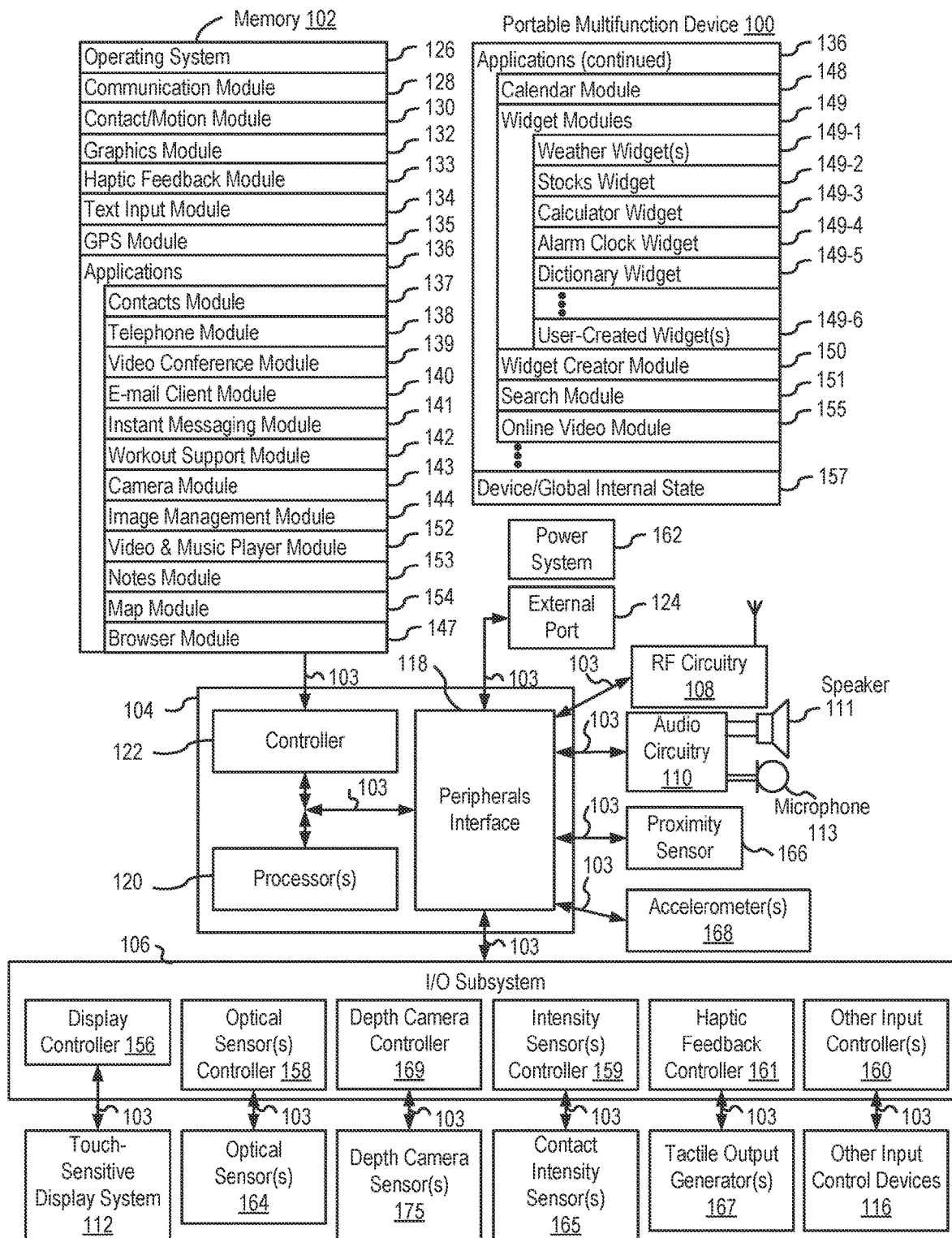
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.1 in, and/or IEEE 802.11 ac), voice over Internet Protocol (VoTP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100.

Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
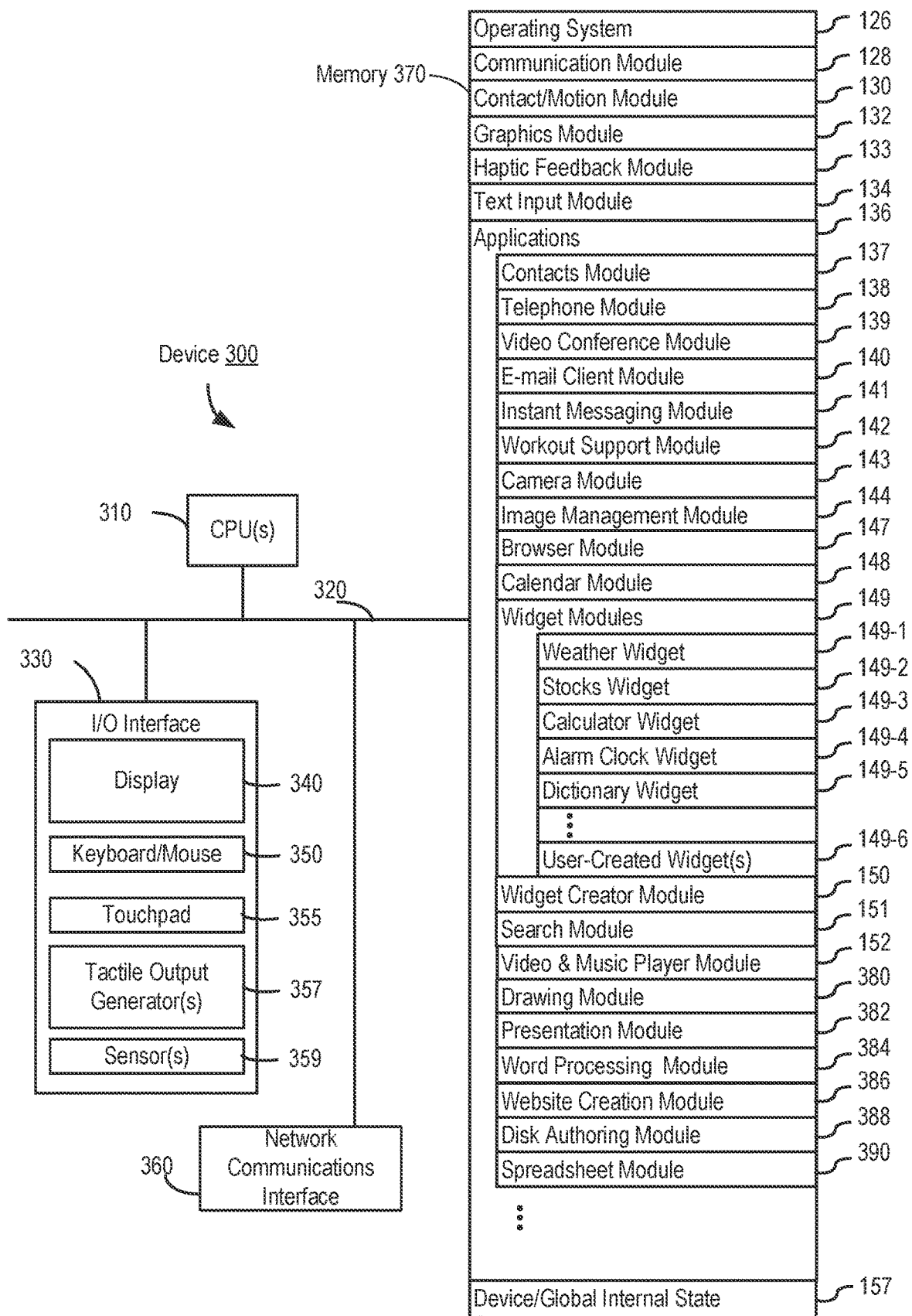
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
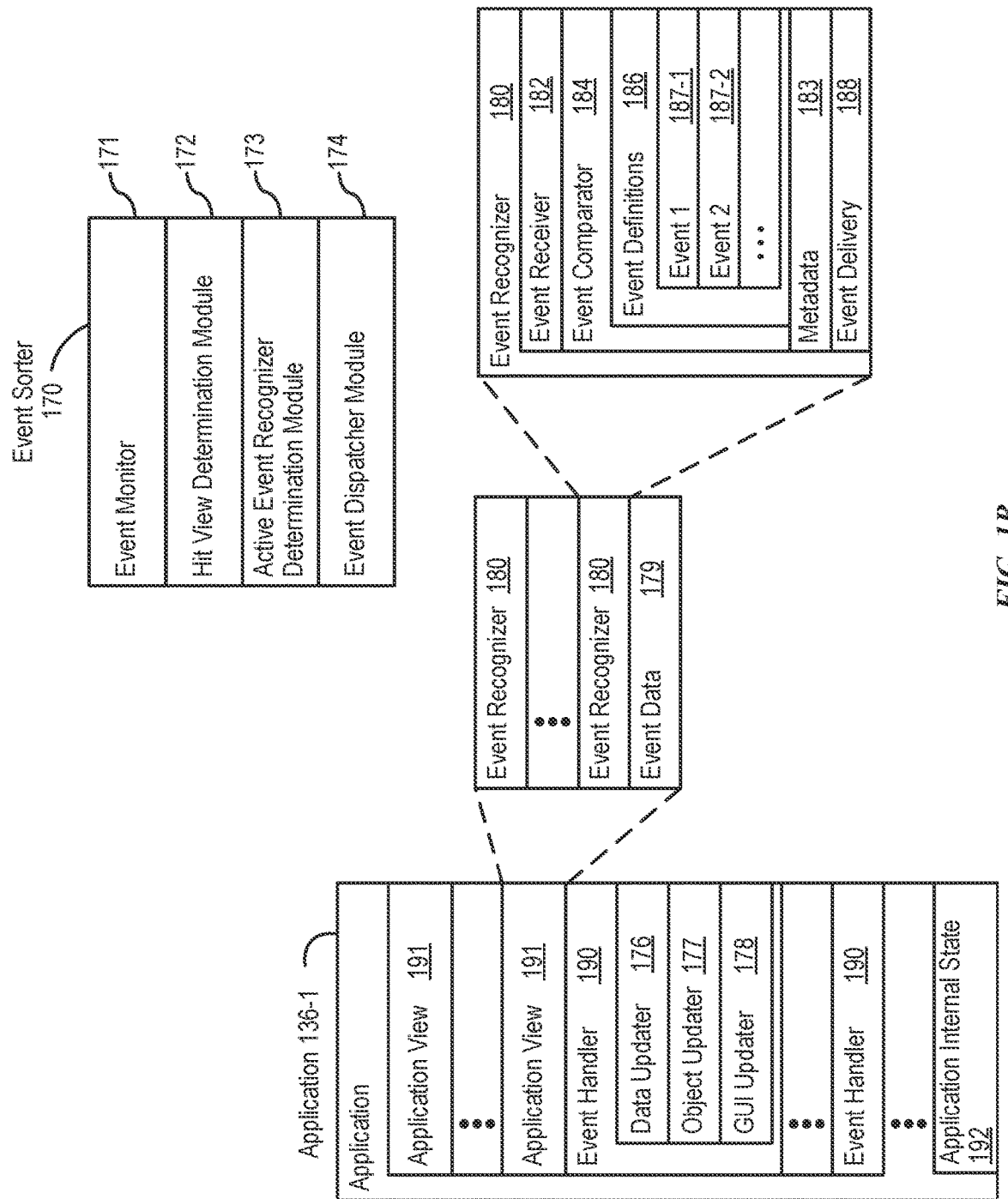
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
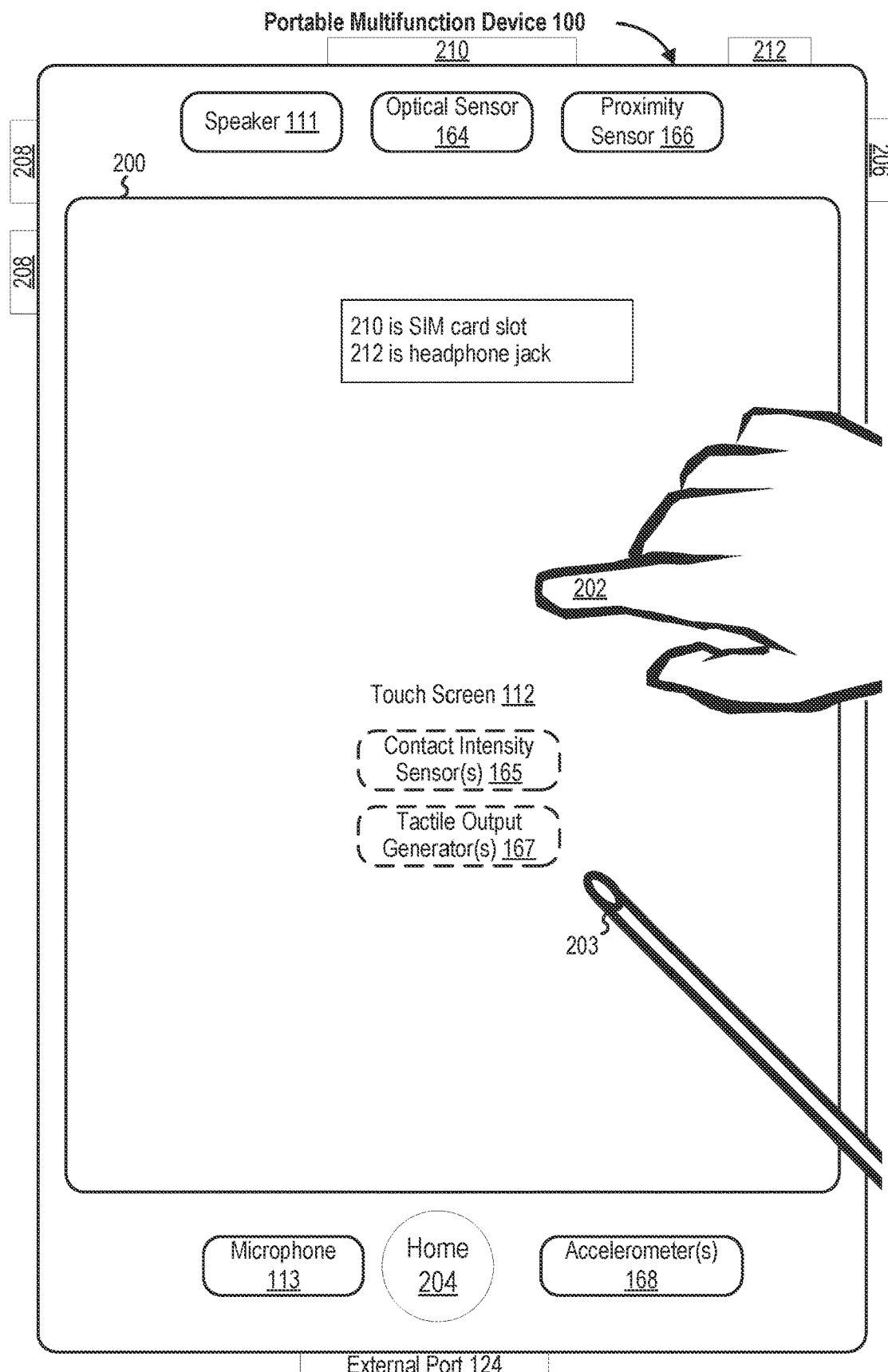
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
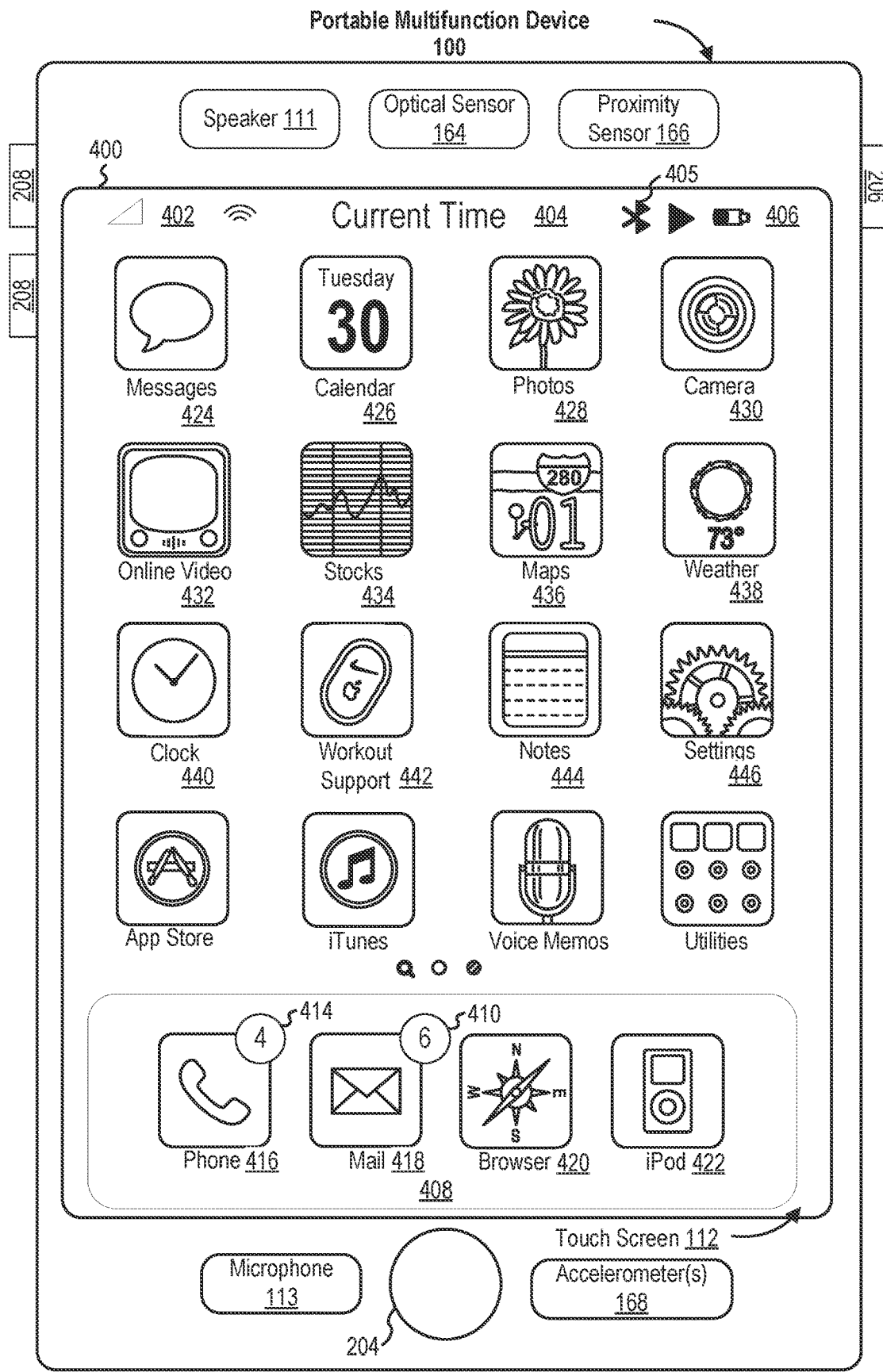
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
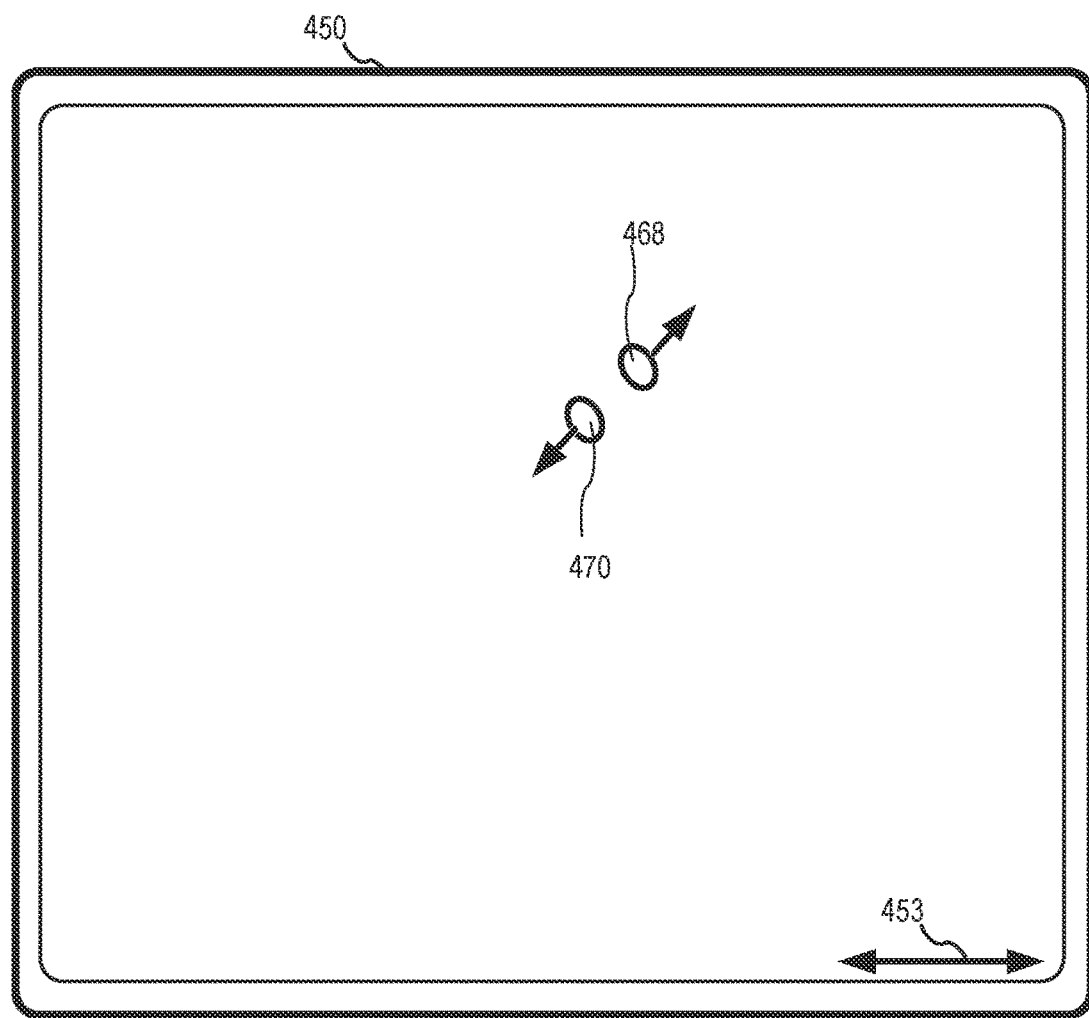
FIG. 4B illustrates an exemplary user interface for a multifunction device with a touch-sensitive surface that is separate from the display in accordance with some embodiments.
Figure 4B:
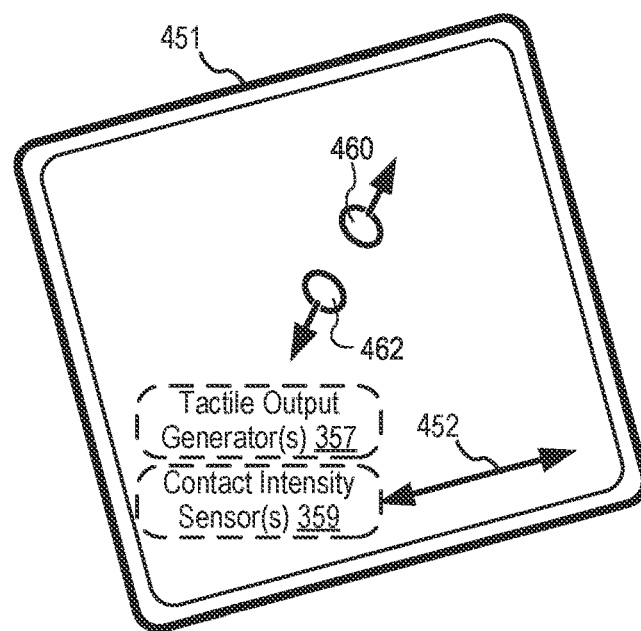

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
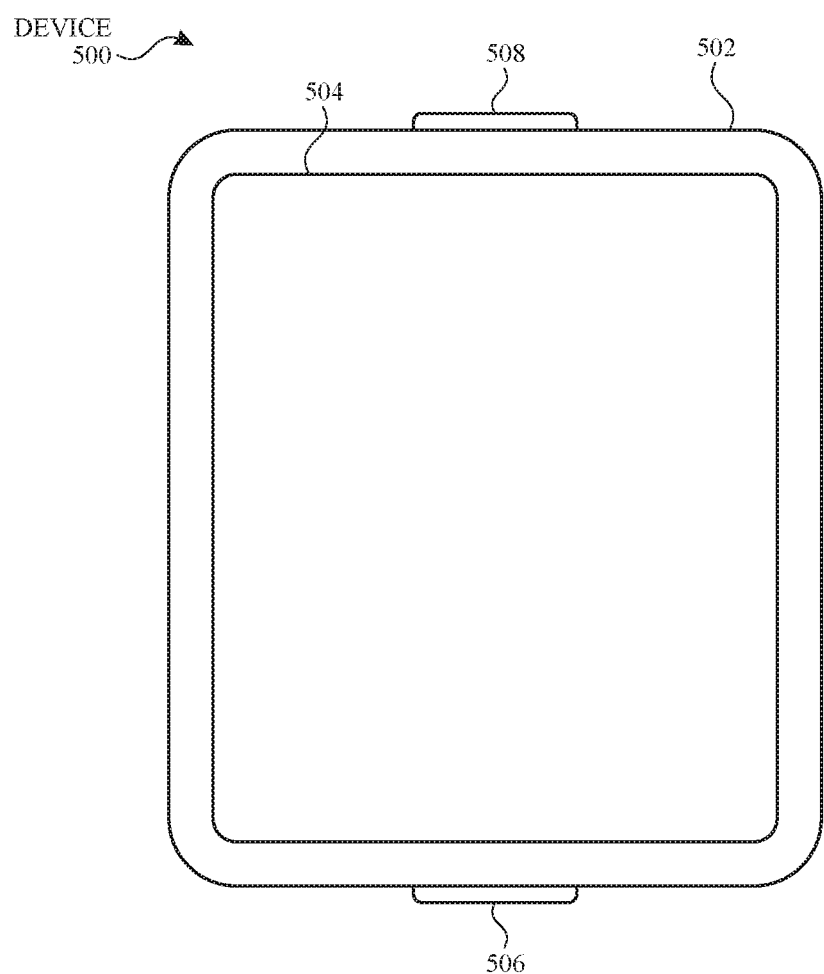
FIG. 5A illustrates a personal electronic device in accordance with some embodiments.
Figure 6J:
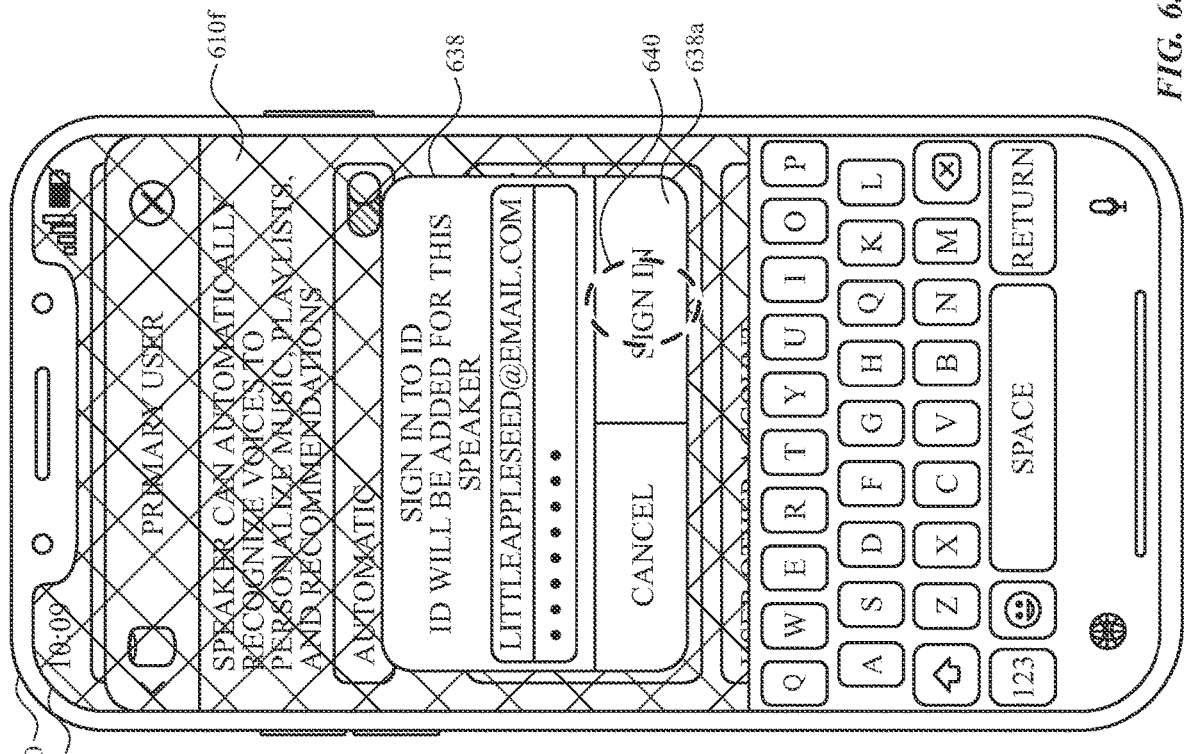
FIGS. 6A-6AI illustrate exemplary user interfaces for media request handling by electronic devices having multiple users, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
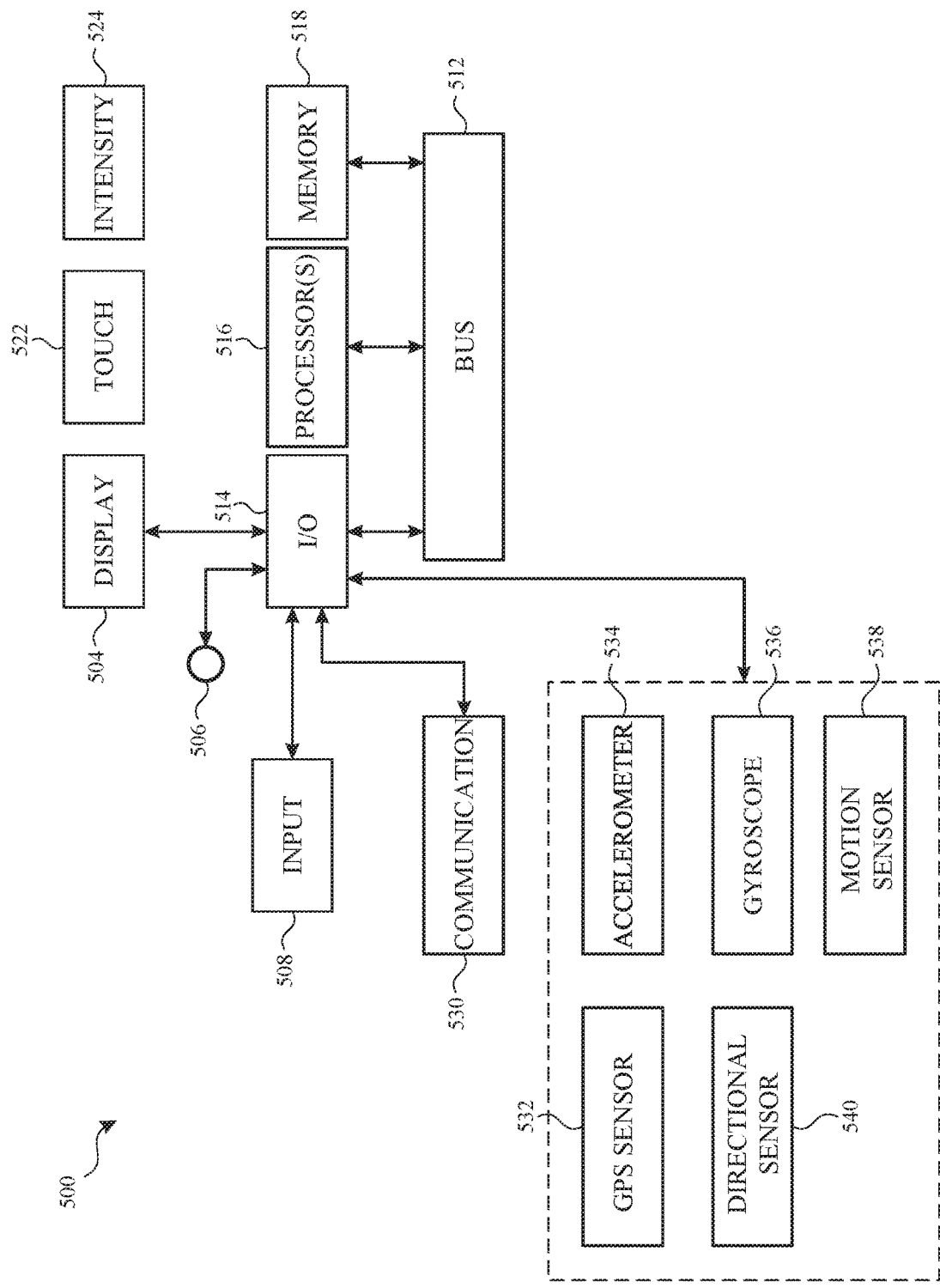
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5C:
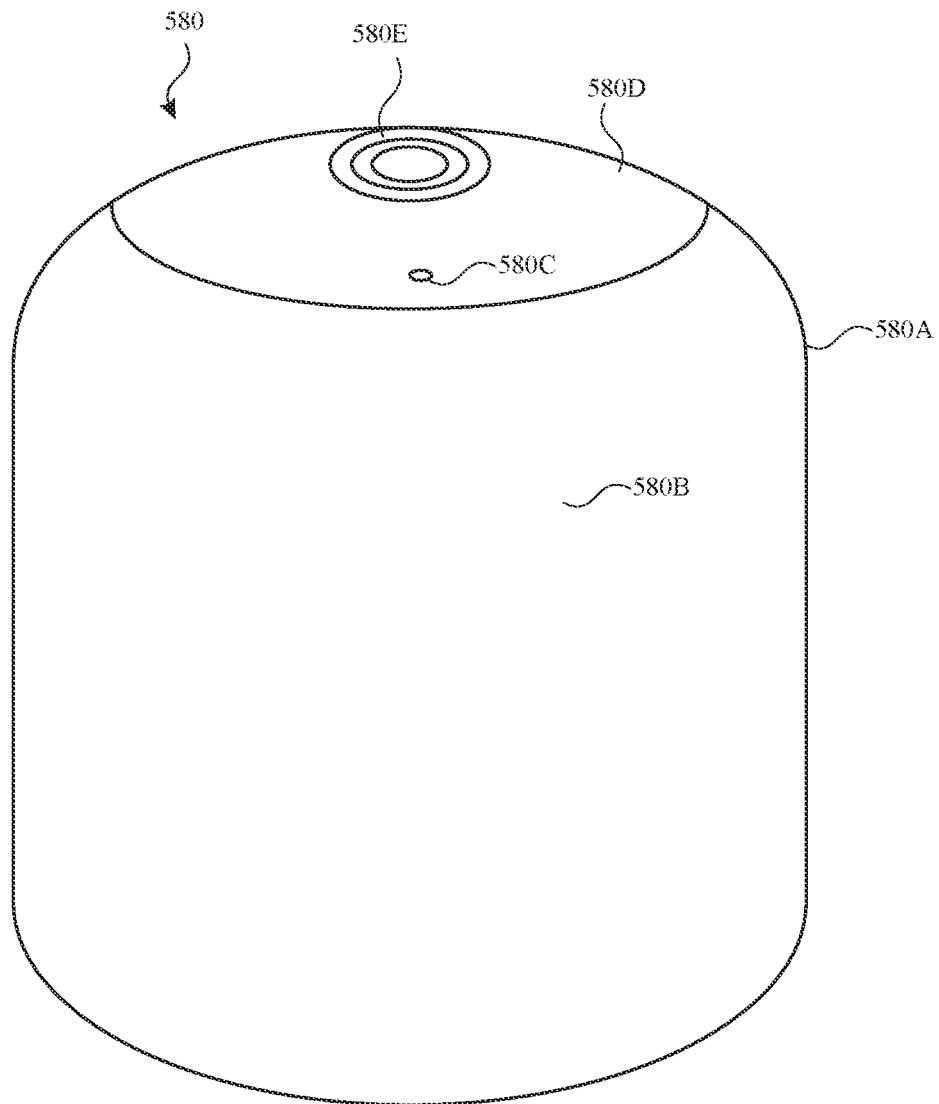
FIG. 5C illustrates an electronic device in accordance with some embodiments.

FIG. 5C illustrates exemplary electronic device 580. Device 580 includes body 580A. In some embodiments, device 580 can include some or all of the features described with respect to devices 100, 300, and 500 (e.g., FIGS. 1A-5B). In some embodiments, device 580 has one or more speakers 580B (concealed in body 580A), one or more microphones 580C, one or more touch-sensitive surfaces 580D, and one or more displays 580E. Alternatively, or in addition to a display and touch-sensitive surface 580D, the device has a touch-sensitive display (also referred to as a touchscreen). As with devices 100, 300, and 500, in some embodiments, touch-sensitive surface 580D (or the touch screen) optionally includes one or more intensity sensors for detecting intensity of contacts (e.g., touches) being applied. The one or more intensity sensors of touch-sensitive surface 580D (or the touchscreen) can provide output data that represents the intensity of touches. The user interface of device 580 can respond to touches based on their intensity, meaning that touches of different intensities can invoke different user interface operations on device 580. In some embodiments, the one or more displays 580E are one or more light-emitting diodes (LEDs). For example, a display can be a single LED, an LED cluster (e.g., a red, a green, and a blue LED), a plurality of discrete LEDs, a plurality of discrete LED clusters, or other arrangement of one or more LEDs. For example, the display 580E can be an array of nine discrete LED clusters arranged in a circular shape (e.g., a ring). In some examples, the one or more displays are comprised of one or more of another type of light-emitting elements.

Figure 5D:
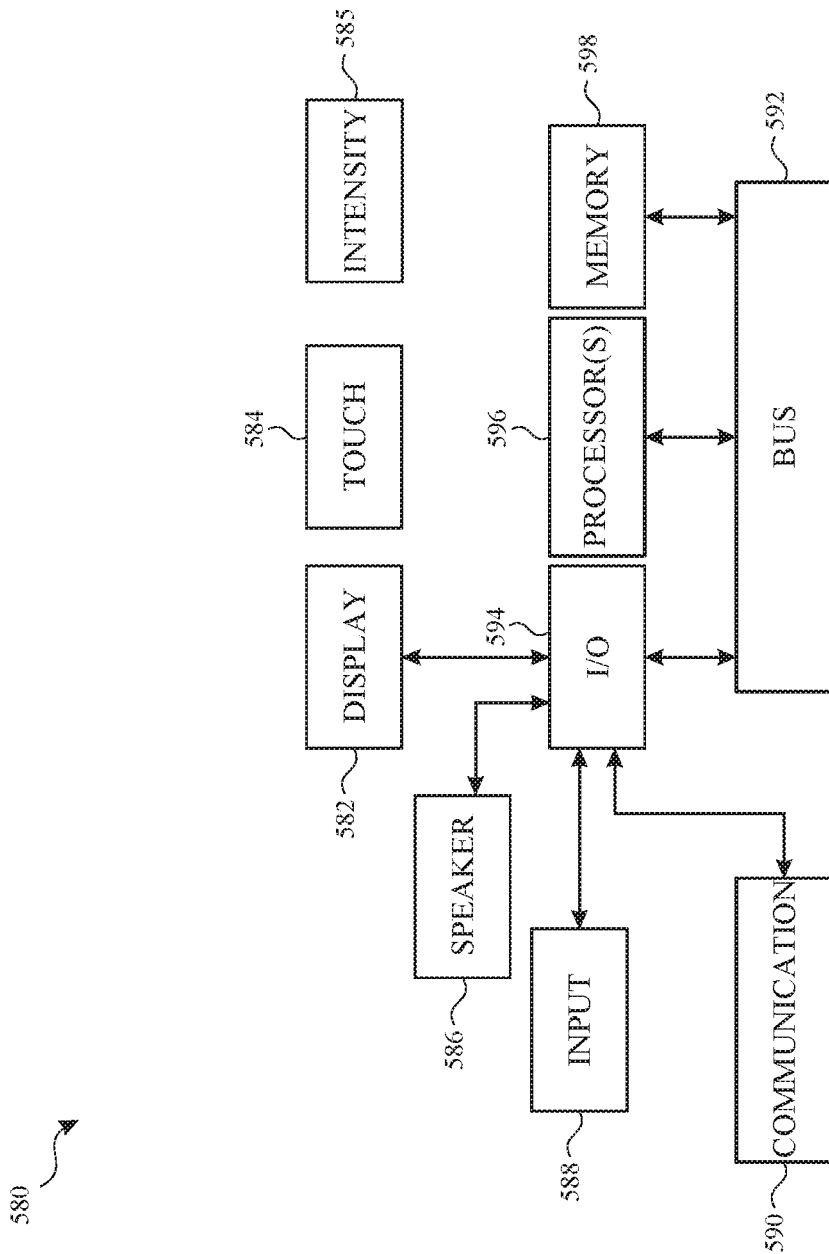
FIG. 5D is a block diagram illustrating an electronic device in accordance with some embodiments.

FIG. 5D depicts exemplary personal electronic device 580. In some embodiments, device 580 can include some or all of the components described with respect to FIGS. 1A, 1, 3, and 5A-5B. Device 580 has bus 592 that operatively couples I/O section 594 with one or more computer processors 596 and memory 598. I/O section 594 can be connected to display 582, which can have touch-sensitive component 584 and, optionally, intensity sensor 585 (e.g., contact intensity sensor). In some embodiments, touch-sensitive component 584 is a separate component than display 582. In addition, I/O section 594 can be connected with communication unit 590 for receiving application and operating system data, using Wi-Fi, Bluetooth, near field communication (NFC), cellular, and/or other wireless communication techniques. Device 580 can include input mechanisms 588. Input mechanism 588 is, optionally, a button, in some examples. Input mechanism 588 is, optionally, a microphone, in some examples. Input mechanism 588 is, optionally, a plurality of microphones (e.g., a microphone array).

Electronic device 580 includes speaker 586 for outputting audio. Device 580 can include audio circuitry (e.g., in I/O section 594) that receives audio data, converts the audio data to an electrical signal, and transmits the electrical signal to speaker 586. Speaker 586 converts the electrical signal to human-audible sound waves. The audio circuitry (e.g., in I/O section 594) also receives electrical signals converted by a microphone (e.g., input mechanism 588) from sound waves. The audio circuitry (e.g., in I/O section 594) converts the electrical signal to audio data. Audio data is, optionally, retrieved from and/or transmitted to memory 598 and/or RF circuitry (e.g., in communication unit 590) by I/O section 594.

Memory 598 of personal electronic device 580 can include one or more non-transitory computer-readable storage mediums, for storing computer-executable instructions, which, when executed by one or more computer processors 596, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 580 is not limited to the components and configuration of FIG. 5D, but can include other or additional components in multiple configurations.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, device 500, or 580.

FIGS. 6A-6AI illustrate exemplary user interfaces for media request handling by electronic devices having multiple users, in accordance with some embodiments. The user interfaces in these figures are used to illustrate the processes described below, including the process in FIG. 7.

FIGS. 6A-6M illustrate various user interfaces for configuring user-specific settings and device-specific settings relating to media services (e.g., streaming platforms, which can also referred to as "sources" (e.g., sources for media)) for media operations (e.g., media playback, saving media, identifying preferred media (e.g., by listening history, by receiving inputs for liking or disliking media)) within a home network. Each user account associated with a home network has configurable settings that are independent of other users associated with the home network. Devices associated with the home network have configurable settings that are independent of other devices and, in some embodiments, dependent on the settings of users associated with the home network. In some embodiments, device settings can supersede settings configured for each user account, under certain circumstances as discussed in more detail, below.

In FIG. 6A, electronic device 600 (e.g., a smart phone), displays, on touchscreen display 602, home user interface 604. Device 600 is part of home 604*b* (e.g., a collection of one or more networked devices (e.g., on a home network) that is associated with one or more users) called "123 MAIN ST.," which includes a variety of external devices (e.g., lights, door locks, thermostat, speaker) that can be controlled from home user interface 604. In particular, device 600 is in communication with electronic device 601 (e.g., a smart speaker; "LIVING ROOM SPEAKER"), which is represented on home user interface 604 by speaker affordance 606 having speaker icon 601*a*. In some embodiments, more than one speaker can be connected to home 604*b* and can be represented by selectable affordances on home user interface 604, similar to speaker affordance 606. In some embodiments, device 600 includes one or more features of devices 100, 300, and/or 500. In some embodiments, device 601 includes one or more features of devices 100, 300, 500, and/or 580.

Home user interface 604 of FIG. 6A further includes settings affordance 604a. Device 600 detects tap input 608 corresponding to selection of settings affordance 604a. In response to detecting tap input 608, device 600 displays settings user interface 610, as shown in FIG. 6B. In some embodiments, in response to detecting a tap input corresponding to selection of settings affordance 604a, device 600 displays a menu for navigating to either settings user interface 610a or, if device 600 is authorized to access additional homes (e.g., smart home networks), additional home user interfaces similar to home user interface 604 of home 604b. In some embodiments, device 600 receives a set of tap inputs and, in response to receiving the set of tap inputs, displays settings user interface 610a.

In FIG. 6B, device 600 displays settings user interface 610a for home 604b on touchscreen display 602. Settings user interface 610a includes people region 612 that has user affordance 612a, representing home member "JOHN APPLESEED," and user affordance 612b, representing home member "JANE APPLESEED." In this example, device 600 and home 604b are associated with John (e.g., John is the primary user of home 604b; John initially created home 604b). In some embodiments, in response to detecting a set of tap inputs starting on "INVITE PEOPLE," device 600 sends invitations to contacts (e.g., family members, friends) to become members of home 604b. In this example, Jane has previously accepted an invitation to become a member of home 604b, as indicated by Jane's user affordance 612b displayed in people region 612.

Device 600 detects tap input 614 corresponding to selection of John's user affordance 612a. In response to receiving tap input 614, device 600 displays personal settings user interface 610b on touchscreen display 602, as shown in FIG. 6C. Personal settings user interface 610b includes various user settings corresponding to John's user account, including voice recognition setting 616a, shown toggled to the "ON" position, and personal request option 616b, also "ON." Voice recognition setting 616a and personal request option 616b are settings for how an electronic device processes user interactions with a digital assistant within the home network for the given user (e.g., user account). In some embodiments, in response to selection of personal request option 616b, device 600 displays a user interface having additional settings for how personal requests (e.g., requests for data that is customized or custom-handled for a given user) are processed (e.g., handled) by a digital assistant, such as enabling or disabling processing personal requests using one or more speakers (e.g., smart speakers) that are connected to home 604b and whether or not to require user authentication prior to processing personal requests.

Personal settings user interface 610b of FIG. 6C also includes media region 618. Media region 618 lists media services 618a-618d associated with John's user account. Music service 618a and Podcast service 618b are both first-party (e.g., developed and published by the same entity that developed device 600 and/or the operating system software of device 600) streaming platforms (e.g., services) offering different types of media (e.g., music streaming (e.g., access to full-length content (e.g., songs, albums, playlists, music videos, internet radio shows) using the internet), podcast (e.g., access to an episodic series of spoken word digital audio files)). Singify service 618c and Poptastic service 618d are both third-party (e.g., developed and published by a different entity than that which developed device 600, for use on device 600) media streaming platforms (e.g., media services) that have been authorized for use via John's user account within home 604b. In some embodiments, prior to authorizing one or more third-party media streaming services, device 600 displays Music service 618a and podcast service 618b within media region 618. In some embodiments, device 600 displays more or fewer media service rows based on the number of media services authorized for use with an account within a home. Authorizing third-party media streaming platforms for use with an account within a home is discussed further with respect to FIGS. 6AB-6AI. Additionally, personal settings user interface 610b includes primary service affordance 618e, which will be discussed in greater detail with respect to FIG. 6E.

In some embodiments, in response to receiving a selection on Jane's user affordance 612b in FIG. 6B, device 600 displays a personal settings user interface associated with Jane's user account, similar to personal settings user interface 610b of FIG. 6C associated with John's user account. In some embodiments, displaying a personal settings user interface associated with Jane's user account (or another home member's user account) includes displaying one or more settings in a disabled state, indicating that a user cannot modify some settings (e.g., voice recognition settings) for another member of the home. In some embodiments, device 600 displays, on Jane's personal settings user interface, an option to remove Jane from home 604b. In some embodiments, if Jane accesses her own personal settings user interface for home 604b, her device (e.g., a device similar to device 600) displays a personal settings user interface similar to personal settings user interface 610b of FIG. 6C, with digital assistant settings, a music region listing media services authorized for use with her user account within home 604b, and an option to leave (e.g., be removed from) home 604b.

As shown in FIG. 6C, device 600 detects tap input 620a corresponding to selection of Singify service 618c. In response to detecting tap input 620a, device 600 displays Singify settings user interface 610c, as shown in FIG. 6D. Singify settings user interface 610c includes an account identifier (e.g., "JA@EMAIL.COM"), indicating that Singify has been authorized by John's user account. Singify settings user interface 610c also includes settings to "USE IN HOME" (toggled ON) (e.g., enabling home 604b to access media on Singify via John's user account), "UPDATE LISTENING HISTORY" (toggled ON) (e.g., enabling updating historical playback records for John's Singify account), and "REMOVE SINGIFY FROM HOME" (e.g., revoking authorization for use with John's user account within home 604b). In some embodiments, "USE IN HOME" must be toggled on to access options to "UPDATE LISTENING HISTORY" (e.g., the media service cannot update listening history if the media service is unavailable for use in the home). In some embodiments, device 600 displays similar settings user interfaces in response to selection of any media services 618a-618d associated with John's user account.

Turning back to FIG. 6C, device 600 detects tap input 620b corresponding to selection of primary service affordance 618e. As shown in FIG. 6E, in response to detecting tap input 620b, device 600 displays primary service settings user interface 610d on touchscreen display 602. Primary service settings user interface 610d is associated with John's user account and includes selectable rows for Music service 618a, Singify service 618c, and Poptastic service 618d. Primary service settings user interface 610d includes checkmark 622 at the row for Music service 618a to indicate that "MUSIC" is currently the primary streaming service (e.g., default streaming service) associated with John's user account. In some embodiments, primary service settings user interface 610d includes only media services that have the setting for "USE IN HOME" enabled (e.g., toggled "ON"), similar to Singify settings user interface 610c in FIG. 6D. In some embodiments, if the setting for "USE IN HOME" is disabled (e.g., toggled "OFF") in Singify settings user interface 610c of FIG. 6D, device 600 displays primary service settings user interface 610d without a selectable row corresponding to Singify service 618c (e.g., forgoes displaying a row for Singify service 618c, displays a row for Singify service 618c in an inactive (e.g., non-selectable) state).

As shown in FIG. 6E, device 600 receives tap input 624 on touchscreen display 602. In response to detecting tap input 624 corresponding to selection of Singify service 618c, device 600 ceases display of checkmark 622 at the row for Music service 618a and instead, displays checkmark 622 at the row for Singify service 618c, as shown in FIG. 6F. Device 600 displays checkmark 622 at the row for Singify service 618c to indicate that "SINGIFY" is now the primary streaming service (e.g., default streaming service) associated with John's user account. In FIG. 6F, device 600 detects, via touchscreen display 602, swipe input 626 directed to dismissing (e.g., ceasing to display) primary service settings user interface 610d.

In some embodiments, primary service settings user interface 610d includes sections for each different type of media (e.g., music, podcasts, streaming radio, audiobooks) having selectable rows for each available media service that is compatible with the respective type of media. In such embodiments, the user can designate (e.g., select) a default media service (e.g., primary streaming service) to be used for playback for each different type of media. In some embodiments, the user can designate the same default media service to be used for playback for each different type of media. In some embodiments, the user can designate different default media services to be used for playback for each different type of media. In some embodiments, the user can designate any combination of the same or different default media services to be used for playback for each different type of media.

Turning now to FIG. 6G, in response to swipe input 626, device 600 displays home user interface 604. Device 600 detects touch input 628 (e.g., a tap; a long press) corresponding to selection of speaker affordance 606. In response to detecting touch input 628, device 600 displays speaker settings user interface 610e, as shown in FIG. 6H. In some embodiments, device 600 detects a set of user inputs (e.g., a set of taps, a combination of taps and swipes) starting with selection of speaker affordance 606 before displaying speaker settings user interface 610e.

In FIG. 6H, device 600 displays, on touchscreen display 602, speaker settings user interface 610e that includes various settings for configuring the device represented by speaker icon 601a (e.g., device 601 as shown in FIG. 6N), such as location (e.g., room) within the home, media settings, and digital assistant settings. In particular, speaker settings user interface 610e includes media section 630 (e.g., "MUSIC & PODCASTS") that lists an account associated with the device represented by speaker icon 601a (e.g., device 601), playback settings, a setting for updating the associated account's listening history set to "ON," and primary user affordance 630a. Device 600 detects tap input 632 corresponding to selection of primary user affordance 630a.

Figure 6I:
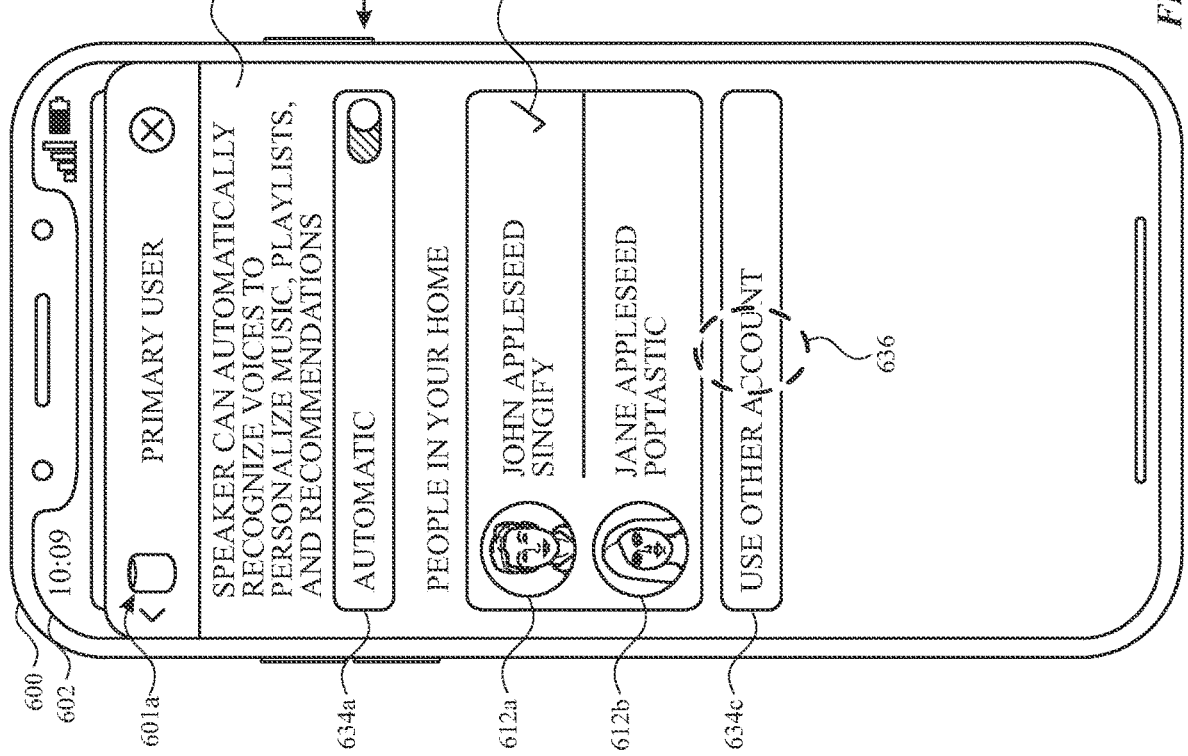

As shown in FIG. 6I, in response to receiving tap input 632, device 600 displays primary user settings user interface 610f, which is associated with the device represented by speaker icon 601a (e.g., device 601). Primary user settings user interface 610f includes voice recognition setting 634a with the toggle in the "ON" position, indicating that voice recognition is enabled for the device represented by speaker icon 601a (e.g., device 601). In some embodiments, voice recognition setting 634a must be enabled for the device (e.g., device 601) to complete personal requests (e.g., requests specific to a particular user (e.g., "what are my appointments today?"; "play my favorites mix")) for users with access to the speaker (e.g., users who are part of the home network; users who are part of the home network and enabled personal requests in their respective user account settings).

Primary user settings user interface 610f of FIG. 6I further includes John's user affordance 612a and Jane's user affordance 612b, representing each of their user accounts, respectively. In this example, John's user account and Jane's user account are both linked (e.g., connected) to this home network (e.g., part of home 604b), and therefore, both John and Jane have granted access to device 601 to stream media using the media services associated with their user accounts. John's user affordance 612a includes text "SINGIFY" to indicate that the default media service (e.g., primary media service) associated with John's user account is Singify, as discussed with respect to FIGS. 6E-6F. Similarly, Jane's user affordance 612b includes text "POPTASTIC" to indicate that the default media service (e.g., primary media service) associated with Jane's user account is Poptastic. Checkmark 634b is displayed on John's user affordance 612a, indicating that John's user account is currently the primary user account for performing media operations (e.g., playback) on the device represented by speaker icon 601a (e.g., device 601). In some embodiments, with John's user account being the primary user account associated with the device represented by speaker icon 601a (e.g., device 601), the device will play media using Singify, which is the designated default media service for John's user account. Additional embodiments will be discussed in depth with respect to FIGS. 6N-6AA.

In FIG. 6I, device 600 displays primary user settings user interface 610f, which further includes add account affordance 634c. Device 600 detects, via touchscreen display 602, tap input 636 corresponding to selection of add account affordance 634c. In response to detecting tap input 636, device 600 displays login prompt 638 overlaid on primary user settings user interface 610f, as shown in FIG. 6J. In some embodiments, device 600 receives a set of additional user inputs on touchscreen display 602 directed to the keyboard to complete the text fields requesting login credentials within login prompt 638. Once the text fields of login prompt 638 have been completed, device 600 detects tap input 640 corresponding to selection of sign in affordance 638a. In response to receiving valid credentials, device 600 completes login of a new user account, "LITTLE APPLESEED."

In FIG. 6K, device 600 displays primary user settings user interface 610f, now including another user account for "LITTLE APPLESEED," as indicated by Little's user affordance 612c. Primary user settings user interface 610f no longer includes add account affordance 634c. In some embodiments, primary user settings user interface 610f maintains display of add account affordance 634c that, when selected, initiates a process for adding another new user account. In some embodiments, adding a second new user account replaces Little's user affordance 612c with a user affordance corresponding to the new user's account. Little's user affordance 612c includes text "MUSIC" to indicate that the default media service (e.g., primary service) associated with Little's user account is Music. Checkmark 634b is displayed on Little's user affordance 612c, indicating that Little's user account is currently the primary user account for playing back media on the device represented by speaker icon 601a (e.g., device 601). In some embodiments, device 600 detects additional user inputs after receiving valid credentials to designate Little's user account as the primary user account for playing back media on the device represented by speaker icon 601a (e.g., device 601). In some embodiments, with Little's user account being the primary user account associated with the device represented by speaker icon 601a (e.g., device 601), the device will play media using Music, which is the designated default media service for Little's user account. In this example, Little's user account is connected to (e.g., authorizes access by) the device represented by speaker icon 601a (e.g., device 601) without requiring Little to join the home network (e.g., by receiving and accepting an invitation to join the home network from the home owner, John). In some embodiments, doing so can allow a user to provide access to their media service from the device associated with speaker icon 601a, without having to grant that user access rights to other devices of home 604b. For example, add account affordance 634c can be used to allow a visiting user to play their personalized playlist from a specific service, without having to grant that visiting user access to other home devices, e.g., connected locks of home 604b. In some embodiments, connecting Little's user account in this way limits the access of Little's user account granted to the device represented by speaker icon 601a (e.g., device 601) to only one or more media services (e.g., Little's default media service) associated with Little's account and no additional user data.

In some embodiments, prior to being designated as the primary user account for media operations on a device within a home network, a user is required to first join the home network (e.g., as Jane is listed as a member of the home). Device 600 receives tap input 642 corresponding to selection of John's user affordance 612a to update the primary user account associated with the device represented by speaker icon 601a (e.g., device 601).

As shown in FIG. 6L, in response to detecting tap input 642, device 600 displays confirmatory prompt 644, including confirm affordance 644a and a cancel affordance, overlaid on primary user settings user interface 610f. Confirmatory prompt 644 includes text explaining that updating the primary user account associated with the device represented by speaker icon 601a (e.g., device 601) to a different user account will remove Little's user account from the list of potential primary user accounts, thereby revoking access to playback media using Little's user account for Music. Device 600 detects tap input 646 corresponding to selection of confirm affordance 644a of confirmatory prompt 644, which provides confirmation to device 600 to proceed with revoking access to (e.g., removing) Little's user account for the device represented by speaker icon 601a (e.g., device 601).

As shown in FIG. 6M, in response to receiving tap input 646, device 600 updates display of primary user settings user interface 610f by showing checkmark 634b on John's user affordance 612a, ceasing display of Little's user affordance 612c, and redisplaying add account affordance 634c. As mentioned with respect to FIG. 6I, checkmark 634b on John's user affordance 612a indicates that John's user account is now the primary user account for media operations on device 601. In some embodiments, with John's user account being the primary user account associated with the device represented by speaker icon 601a (e.g., device 601), the device will perform media operations using Singify, which is the designated default media service for John's user account.

In some embodiments, a home network has more than one smart speaker. In such embodiments, each different speaker can have individualized settings, such as different designated primary user accounts for media operations. In some embodiments, each speaker within a home network has access to all media services associated (e.g., linked) with user accounts of members of the home network. In some embodiments, a speaker is limited to accessing media services associated with the designated primary user account of the speaker.

Turning now to FIGS. 6N-6AA, these figures explore various scenarios for multiple users interacting with device 601 (e.g., an electronic device (e.g., a smart speaker)) based on the settings configured and explained with respect to FIGS. 6A-6M. In some embodiments, device 601 includes one or more input devices, such as a microphone, and one or more output devices, such as speakers (e.g., electroacoustic speakers). In some embodiments, device 601 includes a digital assistant for receiving and processing user commands (e.g., natural language speech input, input via device 600). FIGS. 6N-6AA include a text box at the top of each figure detailing the settings relating to device 601 and the voice identification status after device 601 receives a speech input. Consistent with FIG. 6B, John's user account and Jane's user account are both connected to the same home network as device 601. Consistent with FIG. 6M and as shown in the text boxes of FIGS. 6N-6AA, the default media service associated with John's user account is Singify, the default media service associated with Jane's user account is Poptastic, and the primary user account associated with device 601 is John's user account. Consistent with FIG. 6E, the media streaming services are associated with John's user account, and therefore, are also available for use by device 601, include Singify, Poptastic, and Music. The text boxes of FIGS. 6N-6AA include text noting Music is an additional media service available to device 601. In some embodiments, if another member of the home network connects additional media services, the additional media services are available for use by device 601. In this example, the media services associated with John's user account is the superset of the media services available for user by device 601.

The text boxes of FIGS. 6N-6AA further include a "VOICE IDENTIFICATION" indication of "MATCH" or "NO MATCH" for voice recognition operations performed by device 601 after receiving speech input from a user, with MATCH indicating that the user voice input shown in the figure is a match for a voice profile known to device 601. In some embodiments, device 601 will perform different operations in response to a user request based on voice recognition. In some embodiments, in order for device 601 to perform voice recognition operations to identify user voices, voice recognition should be enabled for the device. For example, as shown in FIG. 6I, the voice recognition setting 634a corresponding to device 601 is in the "ON" position. In some embodiments, in order for device 601 to recognize a particular user's voice, the user must enable voice recognition in their personal settings. For example, as shown in FIG. 6C, voice recognition setting 616a for John's user account is enabled (e.g., as shown toggled to the "ON" position), meaning John has granted permission for devices within the home network (e.g., smart speakers, smart televisions, smart remotes), including device 601, to identify his voice after receiving a speech input. In some embodiments, a voice profile is created for each user who enables voice recognition. In some embodiments, device 601 uses the known voice profiles to confirm user identity when performing voice recognition operations (e.g., via matching a speech input to the saved voice profile). In some embodiments, when voice recognition for a user account is disabled, device 601 cannot recognize that user's voice, but will continue to recognize voices for other user's that have voice recognition enabled. In some embodiments, when voice recognition for device 601 is disabled, device 601 will forgo performance of voice recognition operations, regardless of user's voice recognition settings.

FIGS. 6N-6AA includes three different users, known user 603 (John), known user 605 (Jane), and unknown user 607 (Jerry), wherein a known user has a voice profile available to device 601 and an unknown user does not have a voice profile available to device 601. For ease of explanation, each user's name will be used (e.g., John 603, Jane 605, and Jerry 607). Voice recognition is enabled for device 601 (as shown in FIG. 6I), John 603 (as shown in FIG. 6C), and Jane 605 (via settings that are analogous to voice recognition setting 616a for John's user account in FIG. 6C). In this example, Jerry 607 is not a part of the home network, and therefore, device 601 is unable to identify Jerry's voice.

FIG. 6N illustrates a scenario in which the initial speech input is a request for personalized media, and the initial speech input matches a voice profile associated with the user account of John 603. Device 601 receives speech input 609a, "Hey assistant, play my favorites mix," from John 603. Speech input 609a is a request for media that is personalized for John (e.g., a personalized playlist (e.g., "my favorites mix")). In some embodiments, based on a user's listening history and/or media library, media services can compile personalized playlists consisting of a user's preferred (e.g., most played, saved, liked) songs. In response to receiving speech input 609a for personalized media, device 601 determines that speech input 609a matches a voice profile associated with John's user account. Device 601 provides natural-language response 609b, "Playing John's favorites mix on Singify," and outputs requested personalized media 609c (e.g., the first song of John's favorites mix) using the default media service associated with John's user account (e.g., Singify). Natural-language response 609b provides confirmation to John 603 that device 601 identified his voice based on speech input 609a and therefore, selected the default media service associated with his account (e.g., Singify), as previously configured, to playback the requested media. In some embodiments, device 601 outputs requested personalized media 609c using the default media service associated with John's user account (e.g., Singify) without providing natural-language response 609b.

FIGS. 6O-6P illustrate a scenario in which the initial speech input is a request to save media, the initial speech input does not match a voice profile associated with any user accounts, and the subsequent speech input identifies a known user account associated with John 603. In FIG. 6O, while outputting requested media 609c, device 601 receives speech input 611a, "Hey assistant, save this song," from John 603. Speech input 611a is a request to save media. In some embodiments, saving media includes determining a user library used for storing the media (e.g., associating the media with a particular user account). In response to receiving speech input 611a to save media, device 601 determines that speech input 611a does not match a voice profile associated with user accounts of the home network (e.g., John or Jane). In some embodiments, unsuccessful voice recognition (e.g., matching the received speech input to a voice profile) is caused by an unclear speech input (e.g., mumbling, speaking while eating, speaking away from the microphone, excess audio input (e.g., noise interference from being in a loud room)). In response, device 601 performs user identity determination operations by providing natural-language query 611b requesting clarification, "To whose library?"

In FIG. 6P, device 601 receives identifying speech input 611c, "John's," from John 603, and in response, device 601 provides natural-language response 611d, "Saved this song to John's library on Singify." Natural-language response 611d provides confirmation to John 603 that device 601 identified his voice based on identifying speech input 611c and, therefore, saved media to the default media service (e.g., Singify) associated with his account, as previously configured. In some embodiments, device 601 completes processing the request to save media and provides a simple natural-language response (e.g., "Saved"). In some embodiments, device 601 identifies the user from identifying speech (e.g., 611c) using voice recognition matching. In some embodiments, device 601 identifies the user from identifying speech (e.g., 611c) without using voice recognition matching (e.g., Jane 605 can respond with "John" and get the same result as John 603 providing the response). In some embodiments, for a user that does not have a voice profile associated with a user account, device 601 provides a natural-language response that the request could not be processed (e.g., "Unable to complete request").

FIGS. 6Q-6R illustrate a scenario in which the initial speech input is a request for personalized media, the initial speech input does not match a voice profile associated with any user accounts, and the subsequent speech input identifies a known user account associated with Jane 605. In FIG. 6Q, device 601 receives speech input 613a, "Hey assistant, play my favorites mix," from Jane 605. Speech input 613a is a request for media that is personalized for Jane (e.g., a personalized playlist (e.g., "my favorites mix")). In response to receiving speech input 613a to play personalized media, device 601 determines that speech input 613a does not match a voice profile associated with user accounts of the home network (e.g., John or Jane). Device 601 performs user identity determination operations by providing natural-language query 613b requesting clarification, "Alright, whose favorites mix?"

In FIG. 6R, device 601 receives identifying speech input 613c, "Jane's," from Jane 605, and in response, device 601 provides natural-language response 613d, "Playing Jane's favorites mix on Poptastic," and outputs requested personalized media 613e (e.g., the first song of Jane's favorites mix). Natural-language response 613d provides confirmation to Jane 605 that device 601 identified her voice based on identifying speech input 613c and, therefore, selected the default media service (e.g., Poptastic) associated with her account, as previously configured, to playback the requested media. In some embodiments, device 601 outputs requested personalized media 613e without providing natural-language response 613d.

FIGS. 6S-6T illustrate a scenario in which the initial speech input is a request for serialized media, the initial speech input does not match a voice profile associated with any user accounts, and the subsequent speech input does not identify a known user account. In FIG. 6S, device 601 receives speech input 615a, "Hey assistant, play Top Tech podcast," from Jerry 607. Speech input 615a is a request for media that is serialize (e.g., organized to be consumed (e.g., listened to) to in a particular order (e.g., by episode or by chapter); podcasts; audiobooks). Serialized media is a type of personalized media in that each user's listening history is different (e.g., John is on chapter 10 of an audiobook, while Jane has no listening history of the same audiobook), and therefore, playback of serialized media is individualized to the requesting user. In response to receiving speech input 615*a* to play serialized media, device 601 determines that speech input 615*a* does not match a voice profile associated with user accounts of the home network (e.g., John or Jane). Device 601 performs user identity determination operations by providing natural-language query 615*b* requesting clarification, "Alright, who's listening?"

In FIG. 6R, device 601 receives identifying speech input 615*c*, "Jerry," from Jerry 607, and in response, device 601 determines that identifying speech input 615*c* does not match a voice profile associated with user accounts of the home network (e.g., John or Jane). Device 601 provides natural-language response 615*d*, "Playing episode 1 of Top Tech podcast on Singify," and outputs requested serialized media 615*e*. In this example, since device 601 determines that speech inputs 615*a* and 615*c* were from an unknown user (e.g., a user (e.g., Jerry) that does not match a voice profile associated with user accounts of the home network (e.g., John or Jane)), device 601 plays the requested serialized media using the default media service of the primary user account associated with device 601 (e.g., Singify associated with John's user account). Since device 601 determines that speech inputs 615*a* and 615*c* were from an unknown user (e.g., Jerry), device 601 plays the requested serialized media starting at episode one (e.g., from the beginning). In some embodiments, device 601 does not update the listening history for the default media service of the primary user account associated with device 601 (e.g., Singify associated with John's user account).

In some embodiments, if the speech input 615*a* is made by John and device 601 determines the speech input matches the voice profile associated with John's user account, device 601 plays the serialized media starting at the next unheard episode (e.g., if John previously listened through episode six, start playback on episode seven) using the default media service associated with John's user account (e.g., Singify). In some embodiments, if speech input 615*a* is made by Jane and device 601 determines the speech input matches the voice profile associated with Jane's user account, device 601 plays the serialized media starting at the next unheard episode (e.g., if Jane previously listened through episode two, start playback on episode three) using the default media service associated with Jane's user account (e.g., Poptastic).

Figure 6U:
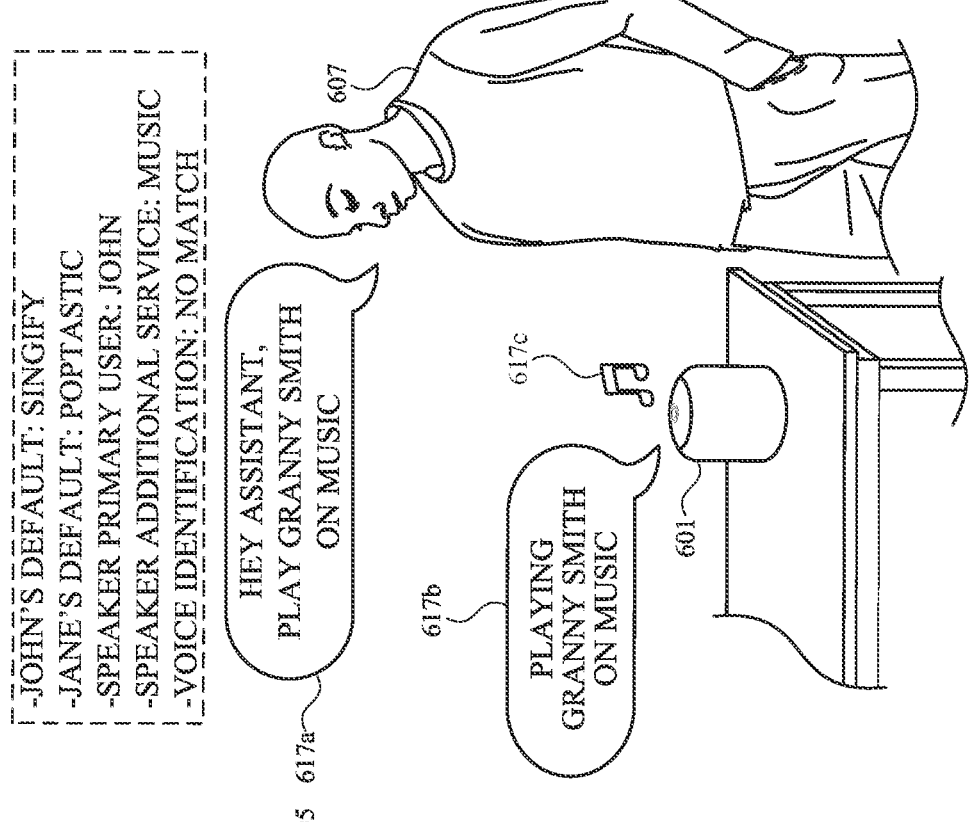

FIG. 6U illustrates a scenario in which the initial speech input is a request for non-personalized media to be played from a specified media service, and the initial speech input matches a voice profile associated with the user account of Jane 605. Device 601 receives speech input 617*a*, "Hey assistant, play Granny Smith on Music," from Jane 605. Speech input 617*a* is a request to play media that is non-personalized (e.g., a song, an artist (e.g., Granny Smith), an album, a genre (e.g., "play pop music")) on a specific media service (e.g., Music) that is available for use by device 601. In response to receiving speech input 617*a* specifying a media service for playback, device 601 provides natural-language response 617*b*, "Playing Granny Smith on Music," and outputs requested non-personalized media 617*c* (e.g., a song by Granny Smith) using the specified media service (e.g., Music). In this example, in response to receiving speech input 617*a* from Jane 605 for non-personalized media, device 601 determines that speech input 617*a* matches a voice profile associated with Jane's user account. However, instead of outputting playback using Jane's default service (e.g., Poptastic), device 601 outputs requested non-personalized media 617*c* (e.g., a song by Granny Smith) using the specified media service (e.g., Music) because speech input 617*a* contained a specified media service for playback. In some embodiments, if the request for media contains a specified media service for playback, device 601 forgoes voice recognition operations. In some embodiments, device 601 outputs requested non-personalized media 617*c* using the specified media service (e.g., Music) without providing natural-language response 617*b*.

Figure 6V:
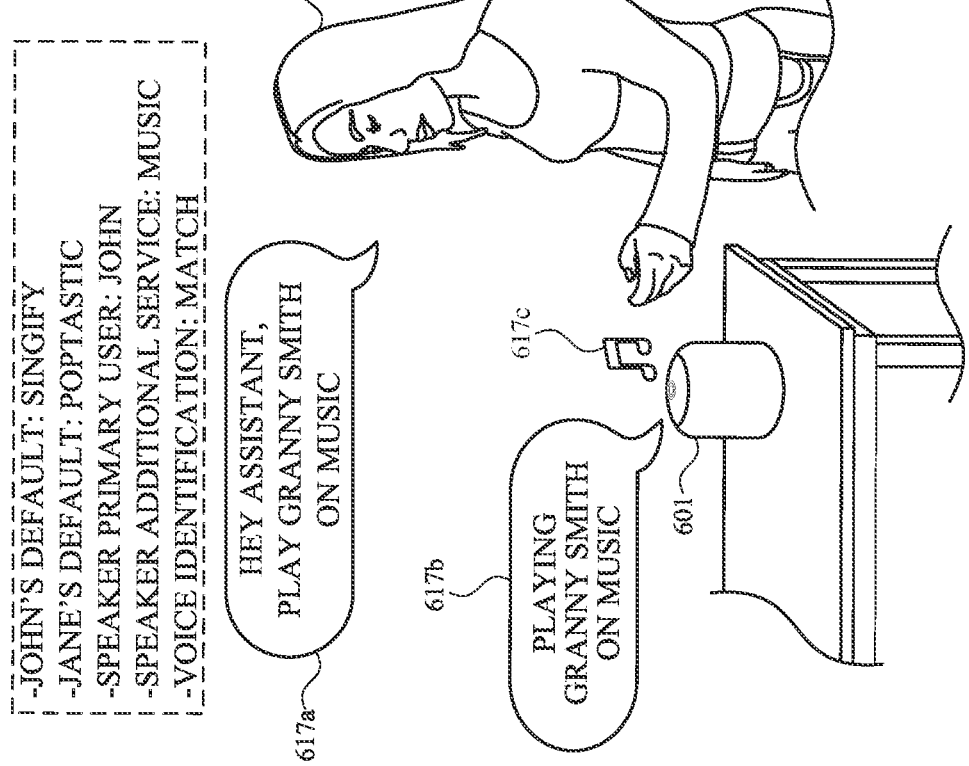

Similar to FIG. 6U, FIG. 6V illustrates a scenario in which the initial speech input is a request for non-personalized media to be played from a specified media service, except the initial speech input does not match a voice profile associated with any user accounts. Device 601 receives speech input 617*a*, "Hey assistant, play Granny Smith on Music," from Jerry 607. In response to receiving speech input 617*a* specifying a media service for playback, device 601 provides natural-language response 617*b*, "Playing Granny Smith on Music," and outputs requested non-personalized media 617*c* (e.g., a song by Granny Smith) using the specified media service (e.g., Music). In this example, in response to receiving speech input 617*a* from Jerry 607 for non-personalized media, device 601 determines that speech input 617*a* does not match a voice profile associated with user accounts of the home network (e.g., John or Jane). However, instead of performing user identity determination operations for finding a voice match to play media on a designated default service, device 601 outputs requested non-personalized media 617*c* (e.g., a song by Granny Smith) using the specified media service (e.g., Music). In some embodiments, if the specified media service is unavailable (e.g., not authorized; not connected) for use by device 601, device 601 performs user identity determination operations to playback requested media on the default media service associated with a voice-matched user or the default media service of the primary user account associated with device 601. In some embodiments, if the specified media service is unavailable (e.g., not authorized; not connected) for use by device 601, device 601 provides a natural-language response that the request could not be processed (e.g., "Unable to complete request").

FIG. 6W illustrates a scenario in which the initial speech input is a request for non-personalized media, and the initial speech input matches a voice profile associated with the user account of Jane 605. Device 601 receives speech input 619*a*, "Hey assistant, play Granny Smith," from Jane 605. Speech input 619*a* is a request to play media that is non-personalized (e.g., a song, an artist (e.g., Granny Smith), an album, a genre (e.g., "play pop music")). In response to receiving speech input 619*a* from Jane 605 for non-personalized media, device 601 determines that speech input 619*a* matches a voice profile associated with Jane's user account. Device 601 provides natural-language response 619*b*, "Playing Granny Smith on Poptastic," and outputs requested non-personalized media 619*c* (e.g., a song by Granny Smith) using the default media service associated with Jane's user account (e.g., Poptastic). Natural-language response 619*b* provides confirmation to Jane 605 that device 601 identified her voice based on speech input 619*a* and, therefore, selected the default media service (e.g., Poptastic) associated with her account, as previously configured, to playback the requested media. In some embodiments, device 601 outputs requested non-personalized media 619*c* using the default media service associated with Jane's user account (e.g., Poptastic) without providing natural-language response 619b.

Similar to FIG. 6W, FIG. 6X illustrates a scenario in which the initial speech input is a request for non-personalized media, except the initial speech input does not match a voice profile associated with any user accounts. Device 601 receives speech input 619a, "Hey assistant, play Granny Smith," from Jerry 607. In response to receiving speech input 619a from Jerry 607 for non-personalized media, device 601 determines that speech input 619a does not match a voice profile associated with user accounts of the home network (e.g., John or Jane). Since speech input 619a is a request for non-personalized media, device 601 forgoes performing user identity determination operations. Device 601 provides natural-language response 619d, "Playing Granny Smith on Singify," and outputs requested non-personalized media 619c (e.g., a song by Granny Smith) using the default media service of the primary user account associated with device 601 (e.g., Singify associated with John's user account). In some embodiments, device 601 outputs requested non-personalized media 619c using the default media service of the primary user account associated with device 601 (e.g., Singify associated with John's user account) without providing natural-language response 619b.

Figures 6Y, 6Z:
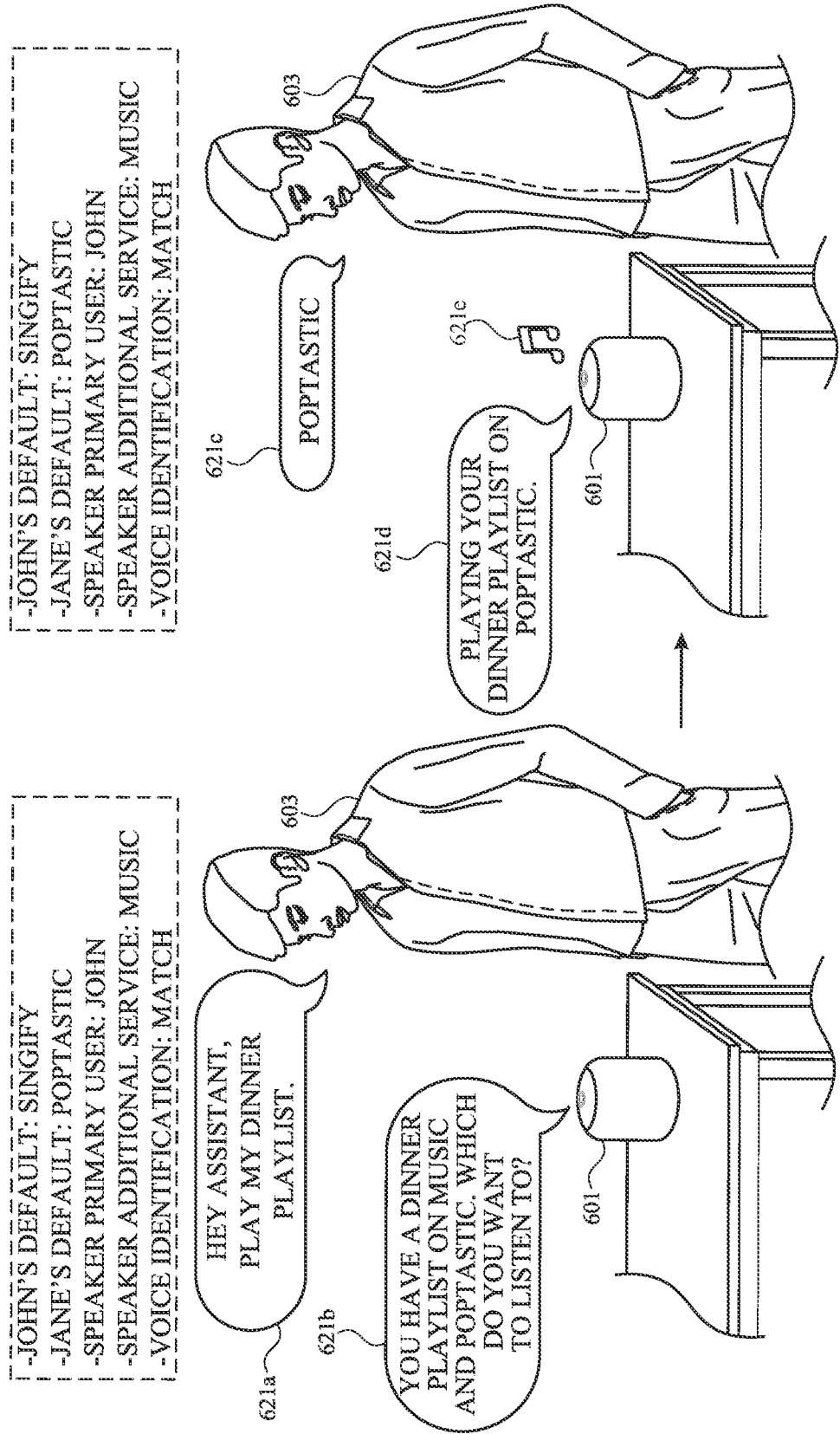

FIGS. 6Y-6Z illustrate a scenario in which the initial speech input is a request for a media that is saved to more than one media service, and the initial speech input matches a voice profile associated with the user account of John 603. In FIG. 6Y, device 601 receives speech input 621a, "Hey assistant, play my dinner playlist," from John 603. Speech input 621a is a request for custom media (e.g., a playlist created and named by John) that is available on more than one media service associated with John. Custom media is a type of personalized media in that users can have playlists of the same playlist name containing different songs based on their own preferences. In this example, John has more than one playlist named "dinner playlist" saved on different media services. In some embodiments, two different users can each have a playlist with the same title (e.g., "dinner playlist") containing different songs saved on either the same media service or on different media services.

In response to receiving speech input 621a for custom media, device 601 determines that speech input 621a matches a voice profile associated with John's user account. Similar to previously discussed scenarios, device 601 attempts to use the default media service associated with John's user account (e.g., Singify) to complete the request for custom media. In this example, device 601 determines that the requested custom media (e.g., "dinner playlist") is not found (e.g., is unavailable) on the default media service associated with John's user account (e.g., Singify) and proceeds to search (e.g., scan) additional media services available for use on device 601 (e.g., Music and Poptastic). In some embodiments, if the requested custom media is available using the default media service associated with identified user's account (e.g., Singify associated with John's user account), device 601 outputs requested custom media using the default media service (e.g., Singify), without searching additional non-default media services (e.g., Music and Poptastic). In some embodiments, if device 601 determines that speech input 621a does not match a voice profile associated with any user account, device 601 performs identity determination operations prior to searching for the requested custom media.

In FIG. 6Y, after searching additional media services for the requested custom media, device 601 determines the requested custom media (e.g., "dinner playlist") is available on two additional media services associated with John's user account (e.g., Music and Poptastic). Device 601 performs source identifying operations by providing natural-language query 621b requesting source clarification, "You have a dinner playlist on Music and Poptastic. Which do you want to listen to?"

In FIG. 6Z, device 601 receives source identifying speech input 621c, "Poptastic," from John 603, and in response, device 601 provides natural-language response 621d, "Playing your dinner playlist on Poptastic," and outputs requested custom media 621e (e.g., the first song of John's dinner playlist saved his account associated with Poptastic). In some embodiments, device 601 outputs requested custom media 621e without providing natural-language response 621d.

FIG. 6AA illustrates a scenario in which the initial speech input is a request for media that is exclusive to a particular media service, and the initial speech input matches a voice profile associated with the user account of John 603. Device 601 receives speech input 623a, "Hey assistant, play DJ Appleseed's festival set," from John 603. Speech input 623a is a request for media that is exclusive to a particular media service (e.g., unavailable on other media services). In response to receiving speech input 623a for playback of exclusive media, device 601 determines that speech input 623a matches a voice profile associated with John's user account. Similar to the scenario described with respect to FIG. 6Y, device 601 attempts to use the default media service associated with John's user account (e.g., Singify) to complete the request to playback exclusive media. Device 601 determines that the requested exclusive media (e.g., "DJ Appleseed's festival set") is not found (e.g., is unavailable) on the default media service associated with John's user account (e.g., Singify) and proceeds to search (e.g., scan) additional media services available for use on device 601 (e.g., Music and Poptastic). In some embodiments, if the requested exclusive media is available using the default media service associated with identified user's account (e.g., Singify associated with John's user account), device 601 outputs requested exclusive media using the default media service (e.g., Singify), without searching additional non-default media services (e.g., Music and Poptastic). In this example, after searching additional media services available for use on device 601 (e.g., Music and Poptastic), device 601 determines the requested exclusive content (e.g., "DJ Appleseed's festival set") is available on a particular media service (e.g., Music). Device 601 provides natural-language response 623b, "Playing DJ Appleseed's festival set on Music," and outputs requested exclusive media 623c (e.g., the first song of DJ Appleseed's festival set) using the particular media service (e.g., Music).

In some embodiments, if device 601 determines that speech input 623a does not match a voice profile associated with any user account, device 601 searches for the requested exclusive media (e.g., "DJ Appleseed's festival set") prior to performing identity determination operations; and, upon successfully finding the requested exclusive media, device 601 outputs the requested exclusive media using the particular media service (e.g., Music), without performing identity determination operations. In some embodiments, if device 601 determines that speech input 623a does not match a voice profile associated with any user account, device 601 performs identity determination operations prior to searching for the requested exclusive media.

To supplement the scenarios described above, Table 1 details the various permutations for device 601 to process a request related to media, in some embodiments. The "Request" column describes various types of media requests. The "Voice Match" column describes the output from device 601 upon determining, to a certain degree of confidence, the initial speech input matches a voice profile associated with a user account associated with the home network. The "No Voice Match (Potential Match)" column describes the output from device 601 upon determining that the initial speech input potentially, to a certain degree of confidence, matches a voice profile associated with a user account associated with the home network. The "No Voice Match (Potential Match)" column describes the output from device 601 upon determining, to a certain degree of confidence, that the initial speech input does not match any voice profiles associated with any user accounts associated with the home network.

TABLE 1

Selecting service to use for playback of requested media.

| Request | Voice Match | No Voice Match (Potential Match) | No Voice Match (Unknown Voice) |
|---|---|---|---|
| Non-personalized (e.g., song, artist, album) | Play from default service of identified user | Play from device's primary user's default service | Play from device's primary user's default service |
| User Playlist (e.g., a playlist created by the user) | Play from default service of identified user | Play from device's primary user's default service | Play from device's primary user's default service |
| Service Playlist (e.g., a curated mix based on user's listening history) | Play from default service of identified user | Perform user identity determination operations | Perform user identity determination operations |
| Save to Library | Play from default service of identified user | Perform user identity determination operations | Perform user identity determination operations |
| Like or Dislike | Play from default service of identified user | Not applicable (error) | Not applicable (error) |
| Service-Specific Request | Play from specified service | Play from specified service | Play from specified service |
| Other Media (e.g., serialized media (e.g., podcast, audiobook)) | Play from default service of identified user | Perform user identity determination operations | Play from device's primary user's default service |

To supplement the scenarios described above, Table 2 details the various permutations for device 601 to update a user's listening history after processing a request related to media when updating listening history is enabled for the media service associated with a user (e.g., as shown in Singify settings user interface 610c of FIG. 6D), in some embodiments. The "Request" column describes various types of media requests. The "Voice Match" column describes the output from device 601 upon determining, to a certain degree of confidence, the initial speech input matches a voice profile associated with a user account associated with the home network. The "No Voice Match (Potential Match)" column describes the output from device 601 upon determining that the initial speech input potentially, to a certain degree of confidence, matches a voice profile associated with a user account associated with the home network. The "No Voice Match (Potential Match)" column describes the output from device 601 upon determining, to a certain degree of confidence, that the initial speech input does not match any voice profiles associated with any user accounts associated with the home network.

TABLE 2

Updating listening history based on requested media, when updating listening history has been enabled by the user via settings.

| Request | Voice Match | No Voice Match (Potential Match) | No Voice Match (Unknown Voice) |
|---|---|---|---|
| Non-personalized (e.g., song, artist, album) | Update listening history | Don't update listening history | Don't update listening history |
| User Playlist (e.g., a playlist created by the user) | Update listening history | Don't update listening history | Don't update listening history |
| Service Playlist (e.g., a curated mix based on user's listening history) | Update listening history | Perform user identity determination operations, then update listening history | Perform user identity determination operations, then update listening history |
| Save to Library | Update listening history | Perform user identity determination operations, then update listening history | Perform user identity determination operations, then update listening history |
| Like or Dislike | Update listening history | Not applicable (error) | Not applicable (error) |

TABLE 2-continued

Updating listening history based on requested media, when updating listening history has been enabled by the user via settings.

| Request | Voice Match | No Voice Match (Potential Match) | No Voice Match (Unknown Voice) |
|---|---|---|---|
| Service-Specific Request | Update listening history | Depends on media type | Depends on media type |
| Other Media (e.g., serialized media (e.g., podcast, audiobook)) | Update listening history | Perform user identity determination operations, then update listening history | Don't update listening history |

Turning now to FIGS. 6AB-6AI, these figures illustrate various user interfaces for associating (e.g., authorizing) a media service (e.g., a streaming platform) with a user account associated with a home network having a particular electronic device (e.g., a smart speaker). In some embodiments, the media service is an application-based media streaming service available for use on an electronic device (e.g., smart phone, smart speaker) and provided (e.g., developed) by a third party (e.g., a party other than the party that provided (e.g., developed) the operating system of the electronic device). In some embodiments, the media service requires a user account and the user account can be used to login to the media service from various electronic devices. In this example, media service, Singify, is being added for use with John's user account and, chronologically, occurs prior to the settings configuration described with respect to FIGS. 6A-6M.

In FIG. 6AB, device 600 displays media service user interface 648 on touchscreen display 602. Media service user interface 648 corresponds to a third party media service application (e.g., Singify) and includes a variety of configurable user settings, affordances for navigating the media service application, as well as add affordance 648a. In some embodiments, music service user interface 648 includes an affordance for selecting an external device (e.g., a speaker (e.g., connected via Bluetooth, connected via Wi-Fi)) to use for media playback. In some embodiments, device 600 selects an external device to use for media playback via proximity detection (e.g., device 600 performs an operation to initiate playback on an external device when device 600 is within proximity of an external device). Device 600 detects tap input 650 corresponding to selection of add affordance 648a, and in response to receiving tap input 650, device 600 initiates a process for associating the media service (e.g., Singify) with a user account (e.g., John's user account) associated with one or more home networks. As previously described with respect to FIG. 6B, device 600 is associated with John's user account (e.g., device 600 belongs to John).

In FIG. 6AC, in response to receiving tap input 650, device 600 displays setup user interface 652a on touchscreen display 602. Setup user interface 652a includes introductory text and a graphical representation for connecting media service (e.g., Singify) to a device (e.g., a smart speaker) on a home network and an example speech input for initiating media playback on the device by using a digital assistant. Setup user interface 652a further includes all homes affordance 654a, customize affordance 654b, and exit setup affordance 654c. In some embodiments, if John's user account is associated with one home network, device 600 displays setup user interface 652a that includes a next affordance and does not include all homes affordance 654a and customize affordance 654b. In this example, John's user account is associated with more than one home network. Device 600 detects tap input 656 corresponding to selection of customize affordance 654b, and in response, displays home selection user interface 652b, as shown in FIG. 6AD.

In FIG. 6AD, device 600 displays home selection user interface 652b, which includes descriptive text for home network selection and home affordances 658a-658c. In some embodiments, more or fewer home affordances are displayed based on the number of home networks associated with the user of device 600 (e.g., John). Home affordance 658b (e.g., "PEARL COURT") and home affordance 658c (e.g., "ATLANTIC AVE") both include text corresponding to the status of a device (e.g., a smart speaker). Home affordance 658b (e.g., "PEARL COURT") reads, "Speaker needs update," indicating that the speaker associated with the Pearl Court home network requires an update before the media service (e.g., Singify) can be used for playback on the one or more speakers associated with the Pearl Court home network. Home affordance 658c (e.g., "ATLANTIC AVE") reads, "No speaker," indicating that the Atlantic Ave home network does not have a compatible device for the media service (e.g., Singify) to be connected to. Home affordances 658a-658c include toggles in the "ON" position, to indicate intent to authorize the media service (e.g., Singify) for use on the one or more speakers within each of these three home networks. In some embodiments, in response to selection of continue affordance 658d while home affordances 658a-658c display the toggles in the "ON" position, device 600 displays additional user interfaces corresponding to addressing any speaker statuses in each home (e.g., software update (e.g., proceed with software update; contact speaker owner), purchase speaker). In some embodiments, if only one speaker within a home network has up-to-date software, the media service (e.g., Singify) can be connected for use on the one updated speaker associated with the home network. In this example, home affordance 658a (e.g., "123 MAIN ST.") does not include additional text corresponding to the status of a speaker, indicating that there are no status issues with the speakers associated with 123 Main St., and the media service (e.g., Singify) can be readily connected to the speakers.

In FIG. 6AD, device 600 detects tap input 660a corresponding to selection of toggle shown in home affordance 658b (e.g., "PEARL COURT") and tap input 660b corresponding to selection of toggle shown in home affordance 658c (e.g., "ATLANTIC AVE"). In response to receiving tap inputs 660a and 660b, device 600 updates the toggles of home affordances 658a and 658b to the "OFF" position, as shown in FIG. 6AE. In FIG. 6AE, device 600 detects tap input 662 corresponding to selection of continue affordance 658d, and in response, device 600 proceeds with connecting (e.g., authorizing) the media service (e.g., Singify) for use on devices (e.g., smart speakers) within home network 123 Main St. via John's user account.

In FIG. 6AF, device 600 displays, on touchscreen display, setup user interface 652c. Setup user interface 652c includes text describing that the media service (e.g., Singify) will be available for use on all speakers associated with the home network and a loading animation while completing the process for connecting (e.g., authorizing) the media service (e.g., Singify) for use on devices (e.g., smart speakers) within home network 123 Main St. via John's user account.

Upon completion of connecting the media service (e.g., Singify) to John's user account, device 600 displays primary service selection user interface 652d. Primary service selection user interface 652d includes selectable rows for Music service 618a, Poptastic service 618d, Singify service 618c, with checkmark 622 at the row for Music service 618a to indicate that "MUSIC" is currently the primary streaming service (e.g., default streaming service) associated with John's user account. Device 600 detects tap input 664 corresponding to selection of Singify service 618c on touchscreen display 602, and in response, device 600 ceases display of checkmark 622 at the row for Music service 618a and instead, displays checkmark 622 at the row for Singify service 618c, as shown in FIG. 6AH.

In FIG. 6AH, device 600 displays primary service selection user interface 652d with checkmark 622 on the row for Singify service 618c to indicate that "SINGIFY" is now the primary streaming service (e.g., default streaming service) associated with John's user account. Device 600 detects tap input 668 corresponding to selection of done affordance 666. In response to detecting tap input 668, device 600 displays, on touchscreen display 602, setup complete user interface 652e. In some embodiments, in response to a tap input corresponding to selection of done affordance in setup complete user interface 652e, device 600 returns to displaying media service user interface 648 of FIG. 6AB.

In some embodiments, device 600 forgoes display of primary service selection user interface 652d and proceeds to displaying setup complete user interface 652e upon completing the process for connecting (e.g., authorizing) the media service (e.g., Singify) for use on devices (e.g., smart speakers) within home network 123 Main St. via John's user account. As described with respect to FIGS. 6C-6F, each user account can modify and configure settings for the media services (e.g., select primary media service, remove media service, updating listening history) associated with their user account via personal settings user interface 610b of FIG. 6C.

In some embodiments, prior to displaying setup complete user interface 652e, device 600 displays an error notification if the media service could not be connected (e.g., authenticated) for use on the home network. In such embodiments, errors include, but are not limited to, disconnection from the home network Wi-Fi during media service setup and media service login errors.

In some embodiments, after successful completion of connecting the media service (e.g., Singify) to John's user account, device 600 receives a tap input corresponding to selection of add affordance 648a on media service user interface 648 of FIG. 6AB. In such embodiments, device 600 displays setup complete user interface 652e of FIG. 6AI to indicate setup was previously completed. In some embodiments, if a new media account (e.g., a different email associated with John) is connected to media service (e.g., Singify), in response to detecting a tap input corresponding to selection of add affordance 648a on media service user interface 648 of FIG. 6AB, device 600 displays a user interface having a prompt to reauthorize the media service with the new media account for use on devices (e.g., smart speakers) within the home network via John's user account.

In some embodiments, after successful completion of connecting the media service (e.g., Singify) to John's user account, device 600 determines that the media service has been inadvertently disconnected and displays a notification prompting reconnection.

FIG. 7 is a flow diagram illustrating a method for configuring media service preferences for multiple users and electronic devices and selecting a media service based on user identity using an electronic device (e.g., a smart phone, a smart speaker) in accordance with some embodiments. Method 700 is performed at a device (e.g., 100, 300, 500, 580, 600, 601) with one or more input devices and one or more output devices. Some operations in method 700 are, optionally, combined, the orders of some operations are, optionally, changed, and some operations are, optionally, omitted.

In some embodiments, the electronic device (e.g., 600, 601) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 700 provides an intuitive way for configuring media service preferences for multiple users and electronic devices and selecting a media service based on user identity using. The method reduces the cognitive burden on a user when requesting media, thereby creating a more efficient human-machine interface. For battery-operated computing devices, enabling a user to request media faster and more efficiently conserves power and increases the time between battery charges.

The computer system (e.g., 100, 300, 500, 580, 600, 601) receives (702), via the one or more input devices (e.g., 112, 113, 580C, 580D, 580E, 602), a first request (e.g., 609a) (e.g., a spoken request, a natural language utterance from a user of the system) to play media (e.g., "MY FAVORITES MIX" of 609a) (e.g., music, audiobook, podcast, personalized media; auto-generated playlist of user's favorite songs). In response to receiving (704) the first request to play media and in accordance with a determination (e.g., as performed by device 601 of FIG. 6N) that the first request to play media meets a first set of request type criteria (e.g., "MY FAVORITES MIX" of 609a) (e.g., the request does not include an explicit request to use a specific source) (e.g., the request includes a request for media that is associated with one or more specific users (e.g., an auto-generated playlist of a user's most played songs; a user-generated playlist; serialized media (e.g., an audiobook, a podcast series); media that varies depending on the identity of the user, even if the request is similar (e.g., a request for "my playlist" results in the output of different media (e.g., a different set of songs) when the request is made by a first identified user than if the same request is made by a second identified user))) and in accordance with a determination (e.g., as performed by device 601 of FIG. 6N) that the first request was made by a first identified user (e.g., "MATCH" of FIG. 6N) (e.g., identified via voice recognition; a user from among a set of known users), the computer system (e.g., 601) plays (706), via the one or more output devices (e.g., 580B), the requested media (e.g., 609*c*) using a first source (e.g., "SINGIFY" of 609*b*) (e.g., a media platform, a media service provider, a streaming media service) specified (previously specified (before receiving the first requests), previously identified) by the first identified user (e.g., 618*c* of FIG. 6F) (e.g., associated with the identified user; predetermined by the identified user (e.g., a user-designated default playback service/source)). In some embodiments, prior to receiving the first request, the computer system receives a set of inputs directed to specifying the first source for media playback for the identified user. In some embodiments, in accordance with a determination that the request is made by a second identified user, different from the first identified user, playing the requested media using a second source, different from the first source, that is specified by (e.g., associated with; predetermined by) the second identified user (e.g., that is the default service for the second identified user and that is not the default service for the first identified user).

In response to receiving (704) the first request to play media (e.g., 613*a*) and in accordance with a determination (e.g., as performed by device 601 of FIG. 6Q) that the first request to play media meets a first set of request type criteria (e.g., "MY FAVORITES MIX" of 613*a*; "TOP TECH PODCAST" of 615*a*) (e.g., the request does not include an explicit request to use a specific source) (e.g., the request includes a request for media that is associated with one or more specific users (e.g., an auto-generated playlist of a user's most played songs; a user-generated playlist; serialized media (e.g., an audiobook, a podcast series); media that varies depending on the identity of the user, even if the request is similar (e.g., a request for "my playlist" results in the output of different media (e.g., a different set of songs) when the request is made by a first identified user than if the same request is made by a second identified user))) and in accordance with a determination (708) (e.g., a determination made after attempting voice recognition) that the first request to play media meets a second set of request type criteria (e.g., "MY FAVORITES MIX" of 613*a*; "TOP TECH PODCAST" of 615*a*) (e.g., a set of criteria that includes the request being for media of a certain type (e.g., personalized media); media other than a discrete item of media (e.g., a specific song)), that includes a criterion that is met when the first request is not recognized as having been made by an identifiable user (e.g., "NO MATCH" of FIG. 6Q and FIG. 6S) (e.g., the request is made by an unidentifiable user (e.g., a user explicitly recognized as not being a known user; a user that potentially matches more than one identified user)), the computer system (e.g., 601) plays (716), via the one or more output devices (e.g., 580B), the requested media (e.g., 613*e*, 615*e*) using a second source (e.g., "POPTASTIC" of 613*d*; "SINGIFY" of 615*d*) (e.g., the second source is the same as the first source) (e.g., the second source is different from the first source) (e.g., the computer system's default playback service) that is selected based on a result (e.g., "MATCH" of FIG. 6R; "NO MATCH" of FIG. 6T) of a set of one or more user identity determination operations (e.g., 613*b*, 615*b*) (e.g., requesting (e.g., by outputting a request (e.g., a displayed request; an audio request (e.g., synthesized utterance)) to the user to provide further input to identify the user (e.g., by uttering explicit identification information (e.g., a name (e.g., "Jane" or "John")); processing any additional user inputs provided in response to the request). In some embodiments, if the set of one or more user identity determination operations identifies a known/identifiable user, the second source is a default service associated with that user; if the set of one or more user identity determination operations does not identify a known/identifiable user, the second source is a default service associated with the computer system. Playing back the requested media in response to receiving a request to play media and in accordance with a determination that a set of criteria have been met assists the user with playing media using a correct source, without requiring further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first source (e.g., "SINGIFY" of 609*b*) and the second source (e.g., "POPTASTIC" of 613*d*; "SINGIFY" of 615*d*) are each a media streaming service (e.g., 618*a*-618*d*) (e.g., an internet or cloud based media (e.g., music, movie, audiobook) service (e.g., media not saved locally at the computer system)).

In some embodiments, the computer system (e.g., 601), after the second set of request type criteria (e.g., "MY FAVORITES MIX" of 613*a*; "TOP TECH PODCAST" of 615*a*) are met, performs (710), at the computer system, the set of one or more user identity determination operations (e.g., 613*b*, 615*b*), including: outputs (712), via the one or more output devices, a first request (e.g., a displayed request; an audio request (e.g., a synthesized utterance (e.g., "whose playlist?"))) for user identifying information (e.g., 613*b*, 615*b*) (e.g., a name); and receives (714) a first user input (e.g., 613*c*, 615*c*) (e.g., an utterance (e.g., "John" or "Jane"); a confirmation or an authentication via an external device) that includes user identifying information (e.g., the names "Jane" and "Jerry" of 613*c* and 615*c*), wherein the result of the set of one or more user identity determination operations includes the user identifying information (e.g., 613*d*, 615*d*). Performing identity determination operations that includes outputting a request and receiving an input that includes identifying information increases the chances of finding the correct source quickly, without requiring additional inputs, and reduces the likelihood that an incorrect source will be used to respond to the first request. Performing a requested operation with reduced likelihood for errors and without requiring additional inputs makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 601), in response to receiving the first request (e.g., 617*a* of FIGS. 6U-6V) to play media and in accordance with a determination that the first request to play media includes a request to play media from a specific source (e.g., "ON MUSIC" of 617*a*) (e.g., the request includes an explicit request to use a specific source), plays (718) the requested media using the specific source (e.g., 617b, 617c) (e.g., as specified in the request to play media regardless of whether the user is an identified user or the specific identity of the user). In some embodiments, the requested source is the same as the first or second sources. In some embodiments, the requested source is different from the first or second sources. Playing back the requested media in accordance with a determination that a set of criteria have been met (e.g., the request includes an explicit request to use a specific source) provides the user with the ability to select a specific, requested source. Providing the user with additional control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of request type criteria includes a criterion that is met when the requested media is personalized media (e.g., "MY FAVORITES MIX" of 609a and 613a; "TOP TECH PODCAST" of 615a; "MY DINNER PLAYLIST" of 621a) (e.g., media that is associated with one or more specific users (e.g., an auto-generated playlist of a user's most played songs; a user-generated playlist; serialized media (e.g., an audiobook, a podcast series); media that varies depending on the identity of the user, even if the request is similar (e.g., a request for "my playlist" results in the output of different media (e.g., a different set of songs) when the request is made by a first identified user than if the same request is made by a second identified user))). In some embodiments, the first set of request type criteria is met when media requested by the first request to play media is personalized media. Processing a request to playback media and selecting a source based on a set of criteria that includes the requested media being personalized media reduces the likelihood that an incorrect source (and therefore incorrect media) will be used to respond to requests that are for personalized media. Performing a requested operation with reduced likelihood for errors makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the result (e.g., 615c) of the set of one or more user identity determination operations (e.g., 615b) does not include a specific identified user (e.g., 615c, "NO MATCH" of FIG. 6T) (e.g., any specific identified user; the user remains unknown or is not resolved to being a single, specific identified user; a user explicitly recognized as not being a known user; a user that is not from among a set of known users). In some embodiments, the second source is a third source (e.g., "SINGIFY" of 615d) that is a default source (e.g., "SINGIFY" of 612a in FIG. 6M) associated (e.g., set at the computer system via a user configurable-setting) with the computer system (e.g., 601) (e.g., the default source of the primary user of the computer system). Playing the media using a default source when a specific identified user is not determined reduces the likelihood for errors in source selection, when a specific, user-customized source cannot be identified. Performing an operation with reduced likelihood for errors makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the result (e.g., 613c) of the set of one or more user identity determination operations (e.g., 613b) includes a second identified user (e.g., 613c, "MATCH" of FIG. 6R) (e.g., a specific identified user; a user from among a set of known users (e.g., the second user is the same as the first user; the second user is different from the first user)). In some embodiments, the second source (e.g., "POPTASTIC" of 613d) is specified by the second identified user (e.g., "POPTASTIC" of 612b in FIG. 6I) (e.g., associated with the identified user; predetermined by the identified user (e.g., a user-designated default playback service/source)). In some embodiments, prior to receiving the first request and performing the set of one or more user identity operations, the computer system receives a set of inputs directed to specifying the default source for media playback for the second identified user. Playing back the requested media using a source previously specified by the user, without requiring an explicit request of the source, assists the user with playing media using a correct source, without requiring further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 601), while playing first media (e.g., 609c of FIG. 6O), receives, via the one or more input devices (e.g., 580C), a first request (e.g., 611a) (e.g., a spoken request, a natural language utterance from a user of the system) to save (e.g., associate the media with a personalized library of a user) media (e.g., "SAVE THIS SONG" of 611a).

In some embodiments, The computer system, in response to receiving the first request to save media (e.g., 611a) and in accordance with a determination that the first request to save media was made by a third identified user (e.g., "MATCH" of FIG. 6P) (e.g., identified via voice recognition; a user from among a set of known users; a user that is the same as the first or second identified users; a user that is different from the first or second identified users), associating the first media with the third identified user (e.g., 611d) (e.g., saving the first media in a personalized library (e.g., an account) that is associated with the third identified user). In some embodiments, associating the first media with the third identified user includes associating the first media with source-specific account (e.g., an account associated with the default source for the third identified user; a playlist that is associated with the third identified user.

In some embodiments, the computer system, in response to receiving the first request to save media (e.g., 611a) and in accordance with a determination (e.g., a determination made after attempting voice recognition) that the first request to save media meets a third set of request type criteria that includes a criterion that is met when the first request to save media is not recognized as having been made by an identifiable user (e.g., "NO MATCH" of FIG. 6O) (e.g., the request is made by an unidentifiable user (e.g., a user explicitly recognized as not being a known user; a user that potentially matches more than one identified user)), associating the first media with a fourth identified user (e.g., 611d) (e.g., a user from among a set of known users) that is identified based on a result of a second set of one or more user identity determination operations (e.g., 611*b*) (e.g., requesting (e.g., by outputting a request (e.g., a displayed request; an audio request (e.g., synthesized utterance)) the user to provide further input to identify the user (e.g., by uttering explicit identification information (e.g., a name (e.g., "Jane" or "John")); processing any additional user inputs provided in response to the request). Associating the media with a user based on a set of criteria assists the user with associating the media correctly, without requiring further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 601) receives, via the one or more input devices (e.g., 580C), a second request (e.g., 619*a*) (e.g., a spoken request, a natural language utterance from a user of the system) to play media (e.g., the artist "GRANNY SMITH" of 619*a*) (e.g., music, audiobook, podcast, personalized media; auto-generated playlist of user's favorite songs) and, in response to receiving the second request to play media and in accordance with a determination that the second request to play media meets a fourth set of request type criteria (e.g., 619*a*) (e.g., the request does not include an explicit request to use a specific source) that includes a criterion that is met when the requested media is media of a first type (e.g., the artist "GRANNY SMITH" of 619*a*) (e.g., non-personalized media (e.g., a song, an album, a generic playlist for a genre)), play the requested media (e.g., 619*c* of FIG. 6X) using a fourth source (e.g., "SINGIFY" of 619*d*) that is a default source (e.g., "SINGIFY" of 612*a* in FIG. 6M) associated (e.g., set at the computer system via a user configurable-setting) with the computer system (e.g., 601) (e.g., the default source of the primary user of the computer system). In some embodiments, the fifth source is used regardless of whether the user is an identified user or the specific identity of the user. In some embodiments, the fifth source is the same as the first source. In some embodiments, the fifth source is different from the first source. Playing back media that is of first type using a default source (e.g., regardless of an identity of the requesting user) ensures that media of the first type is played with the default source, without requiring additional input requesting use of the default source. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the result (e.g., 615*c*) of the set of one or more user identity determination operations (e.g., 615*b*) is an indication that the first request to play media (e.g., 615*a*) was made by an unknown user (e.g., "NO MATCH" of FIG. 6T) (e.g., a user that does not match any identified/known user; a user that is explicitly identified as not being an identified/known user), the second source is a fifth source (e.g., "SINGIFY" of 619*d*) that is a default source (e.g., "SINGIFY" of 612*a* in FIG. 6M) associated (e.g., set at the computer system via a user configurable-setting) with the computer system (e.g., 601) (e.g., the default source of the primary user of the computer system).

In some embodiments, in accordance with a determination that the result (e.g., 613*c*) of the set of one or more user identity determination operations (e.g., 613*b*) is an indication that the first request to play media (e.g., 613*a*) was made by a user that is identified as potentially being a fifth identified user and as potentially being a sixth identified user, different from the fifth identified user (e.g., the user has not been identified as a single identified user with a sufficient degree of confidence, the user has not been clearly identified as a single identifiable user as between two potential, identifiable users), the second source is the fifth source that is a default source (e.g., "SINGIFY" of 612*a* in FIG. 6M) associated (e.g., set at the computer system via a user configurable-setting) with the computer system (e.g., 601) (e.g., the default source of the primary user of the computer system). In some embodiments, the same source (e.g., a system-default source) is used to play the media if the result of the set of one or more user identity determination operations is an unknown source or a potentially identified source that is unresolved as between two potential identified sources (e.g., that is not identified with a sufficient degree of confidence); In some embodiments, the first request to play media is a request for personalized media (e.g., media that is associated with one or more specific users (e.g., an auto-generated playlist of a user's most played songs; a user-generated playlist; serialized media (e.g., an audiobook, a podcast series); media that varies depending on the identity of the user, even if the request is similar (e.g., a request for "my playlist" results in the output of different media (e.g., a different set of songs) when the request is made by a first identified user than if the same request is made by a second identified user). Playing back media using a default source (e.g., regardless of an identity of the requesting user) for users that are unknown and user that are potentially two different known users ensures that media of the first type is played with the default source for those types of users, without requiring additional input requesting use of the default source. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the result (e.g., 615*c*) of the set of one or more user identity determination operations (e.g., 615*b*) is an indication that the first request to play media (e.g., 615*a*) was made by an unknown user (e.g., "NO MATCH" of FIG. 6T) (e.g., a user that does not match any identified/known user; a user that is explicitly identified as not being an identified/known user), the second source is a sixth source (e.g., "SINGIFY" of 615*d*) that is a default source (e.g., "SINGIFY" of 612*a* in FIG. 6M) associated (e.g., set at the computer system via a user configurable-setting) with the computer system (e.g., 601) (e.g., the default source of the primary user of the computer system).

In some embodiments, in accordance with a determination that the result (e.g., 613*c*) of the set of one or more user identity determination operations (e.g., 613*b*) is an indication that the first request to play media (e.g., 613*a*) was made by a user that is identified as potentially being a seventh identified user and as potentially being an eighth identified user, different from the seventh identified user (e.g., "NO MATCH" of FIG. 6Q) (e.g., the user has not been identified as a single identified user with a sufficient degree of confidence, the user has not been clearly identified as a single identifiable user as between two potential, identifiable users), the second source is a seventh source (e.g., "POPTASTIC" of 613*d*) that is different from the sixth source (e.g., "SINGIFY" of 615*d*) (e.g., not a system default source). In some embodiments, the seventh source is a source pre-selected by the seventh identified user or a source pre-selected by the eighth identified user. Playing back media using a default source (e.g., regardless of an identity of the requesting user) for users that are unknown and user that are potentially two different known users ensures that media of the first type is played with the default source for those types of users, without requiring additional input requesting use of the default source. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of request type criteria includes a criterion that is met when the requested media is serialized media (e.g., "PODCAST" of 615*a*) (e.g., media having a defined sequence of two or more sections and/or sub-sections (e.g., audiobooks; multi-episode podcasts)). Processing a request to playback media and selecting a source based on a set of criteria that includes the requested media being serialized media reduces the likelihood that an incorrect source (and therefore incorrect media) will be used to respond to requests that are for serialized media. Performing a requested operation with reduced likelihood for errors makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 601) receives, via the one or more input devices (e.g., 580C), a third request (e.g., 623*a*) (e.g., a spoken request, a natural language utterance from a user of the system) to play media (e.g., music, audiobook, podcast, personalized media; auto-generated playlist of user's favorite songs). In some embodiments, a request a that does not include an explicit request to play from a specific source.

In some embodiments, the computer system, in response to receiving the third request (e.g., 623*a*) to play media and in accordance with a determination (e.g., a determination that is made by searching/scanning (e.g., by the computer system or an external device in communication with the computer system) a plurality of sources) that the media requested by the third request to play media is available from an eighth source (e.g. "MUSIC" in 623*b*), and in some embodiments, is not available on at least one other source, plays, via the one or more output devices (e.g., 580B), the requested media (e.g., 623*c*) using the eighth source (e.g. "MUSIC" in 623*b*). Playing back the requested media using a particular source, in accordance with a determination that the media is available from that particular source, reduces the likelihood that an incorrect source (and therefore incorrect media) will be used to respond to the request. Performing an operation when a set of conditions has been met without requiring further user input and with reduced likelihood for errors enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 601) receives, via the one or more input devices (e.g., 580C), a fourth request (e.g., 621*a*) (e.g., a spoken request, a natural language utterance from a user of the system) to play media (e.g., "MY DINNER PLAYLIST" of 621*a*) (e.g., music, audiobook, podcast, personalized media; auto-generated playlist of user's favorite songs).

In some embodiments, the computer system (e.g., 601), in response to receiving the fourth request (e.g., 621*a*) to play media (e.g., "MY DINNER PLAYLIST" of 621*a*) and in accordance with a determination (e.g., a determination that is made by searching/scanning (e.g., by the computer system or an external device in communication with the computer system) a plurality of sources) that the media requested by the fourth request to play media is available from a plurality of sources (e.g., "MUSIC AND POPTASTIC" of 621*b*), outputs a request (e.g., 621*b*) (e.g., a displayed request; an audio request (e.g., synthesized utterance (e.g., "which platform?"))) for source identifying information (e.g., "WHICH DO YOU WANT TO LISTEN TO?" of 621*b*). In some embodiments, the request includes explicitly identifying at least one available source.

In some embodiments, the computer system (e.g., 601), in response to receiving the fourth request (e.g., 621*a*) to play media (e.g., "MY DINNER PLAYLIST" of 621*a*) and in accordance with a determination (e.g., a determination that is made by searching/scanning (e.g., by the computer system or an external device in communication with the computer system) a plurality of sources) that the media requested by the fourth request to play media is available from a plurality of sources (e.g., "MUSIC AND POPTASTIC" of 621*b*), receives user input (e.g., 621*c*) (e.g., an utterance (e.g., "Singify" or "Music"); a confirmation via an external device) that includes source identifying information (e.g., "POPTASTIC" of 621*c*) and, in response to receiving user input that includes source identifying information, plays the requested media (e.g., 621*e*) using the identified source (e.g., "POPTASTIC" of 621*d*). Requesting source identifying information, when a certain determination, then playing back the requested media using the identified source reduces the likelihood that an incorrect source will be used to respond to the request. Performing a requested operation with reduced likelihood for errors makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently In some embodiments, the computer system (e.g., 601) is associated with a plurality of identified users (e.g., 612*a* and 612*b* of FIG. 6I) (e.g., users that are associated with known/identifiable voice recognition profiles accessible to the computer system) that includes the first identified user (e.g., "JOHN" of 612*a*) and a ninth identified user (e.g., "JANE" of 612*b*). In some embodiments, the first identified user (e.g., "JOHN" of 612*a*) is associated with (e.g., the computer system is configured to use for the first identified user)

a first user-selectable default source (e.g., "SINGIFY" as shown in 612a; 618c as selected in FIG. 6F) (e.g., selectable via a configuration user interface). In some embodiments, the ninth identified user (e.g., "JANE" of 612b) is associated with a second user-selectable default source (e.g., "POP-TASTIC" as shown in 612a of FIG. 6I) that is independently selectable with respect to the first user-selectable default source (e.g., 618c as selected in FIG. 6F) (e.g., the first identified user and the fourth identifiable user can set different default sources). Providing users the option to select a preferred default source independent of other users allows the user to quickly request media and know that playback will be performed using their selected default source. Providing additional control options the enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first user-selectable default source (e.g., 618c as selected in FIG. 6F) (e.g., a streaming service that has been enabled for use by the computer system by the first identified user) is configured to operate as the default source for a first type of media (e.g., 618c ("SIN-GIFY") for "MUSIC" of 6F) (e.g., music) for the first identified user (e.g., "JOHN" of 612a). In some embodiments, the first identified user (e.g., "JOHN" of 612a) is associated with a third user-selectable default source that is configured to operate as the default source for a second type of media (e.g., 618b ("PODCASTS") for "PODCASTS" of 6C) (e.g., podcasts, audiobooks), different from the first type of media, for the first identified user. In some embodiments, the second user-selectable default source (e.g., "POPTAS-TIC" as shown in 612a of FIG. 6I) is configured to operate as the default source for the first type of media (e.g., "MUSIC" of 6F) for the ninth identified user (e.g., "JANE" of 612b). In some embodiments, the ninth identified user (e.g., "JANE" of 612b) is associated with a fourth user-selectable default source that is configured to operate as the default source for the second type of media (e.g., 618b ("PODCASTS") for "PODCASTS" of 6C) for the ninth identified user. In some embodiments, the user-selectable default sources configured to operate as the default source for different types of media are the same source, as selected by the identified user. In some embodiments, the user-selectable sources available for selection as default for various types of media for the first identified user have been enabled for use by the computer system by the first identified user. In some embodiments, the user-selectable sources available for selection as default for various types of media for any identified user have been enabled for use by the computer system by at least one identified user. Providing users the option to select a preferred default source for a particular type of media, independent of default sources selected for other types of media, allows the user to customize source-selection for different types of media, without having to specify a source when making requests. Providing additional control options and performing specific operations without requiring further inputs enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 601) is associated with (e.g., configured to use) a user-configurable primary user account (e.g., 612c) that is associated (e.g., linked to) with a ninth source (e.g., "MUSIC" of 612c) that is authorized for use using a user account (e.g., 612c) (e.g., a user identifier) that is not associated with a user of the plurality of identified users (e.g., 612c is not displayed in 612 of FIG. 6B) (e.g., the user account is not a user account that has a matching voice recognition profile). In some embodiments, the computer system uses the default source of the user-configurable primary user account to perform operations in response to media requests. Authorizing a source associated with a user account that is not an identified user provides the user with access to play media from the associated source without becoming an identified user. Providing additional control options without requiring additional user input and authorizations enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 601) receives a first instruction (e.g., 642) corresponding to a request to update the user-configurable primary user account (e.g., an instruction issued by an external device in communication with the computer system that has received a first set of one or more user inputs (e.g., user inputs (e.g., tap gestures; a spoken request)) corresponding to a request to update the primary user account (e.g., the user account that specifies the default source for use by the computer system)) and, in response to receiving the first instruction, updates the user-configurable primary user account (e.g., as shown by 634b in FIG. 6M) to be associated with a tenth source (e.g., "SINGIFY" of 612a in FIG. 6M) that is authorized for use using a user account (e.g., 612a) that is associated with a user of the plurality of identified users (e.g., 612a shown in 612 of FIG. 6B) (e.g., a user from among a set of known users associated with the computer system; a user account that has a matching voice recognition profile); and removes credentials (e.g., 612c is not displayed in FIG. 6M) (e.g., deleting, clearing) associated with the user account (e.g., 612c) that that is not associated with a user of the plurality of identified users (e.g., 612c is not displayed in 612 of FIG. 6B) from the computer system (e.g., the user account is not a user account that has a matching voice recognition profile). In response to receiving a first instruction, updating the primary user account and removing the user account that is not an identified user enhances security by removing the unused credentials. Improving security enhances the operability of the device and makes the user-device interface more secure which, additionally, reduces power usage (e.g., from unauthorized access) and improves battery life of the device by enabling the user to use the device more quickly and efficiently.

In some embodiments, the computer system (e.g., 601), prior to receiving the first request to play media (e.g., 609a) and at an external device (e.g., 600) (e.g., a smart phone having a touchscreen display) that is in communication with the computer system, initiates a process (e.g., the process shown in FIG. 6AB-6AI) for enabling (e.g., authorizing) use of the first source for playback of media by the computer system that includes displaying (e.g., on 602) a source user interface (e.g., 648) that includes a first selectable user interface object (e.g., 648a) (e.g., a button (e.g., an affordance) that, when selected, initiates a process for enabling use of the source by the computer system), wherein the source user interface is generated by an application (e.g., "SINGIFY" of FIG. 6AB) that is provided by (e.g., developed by; released by) a provider of the first source (e.g., "SINGIFY" of 609b in FIG. 6N) (e.g., by the party that controls, maintains, and/or provides the first source). In some embodiments, the source user interface is an interface of an application (e.g., a third party application) that is provided/developed by a party other than the party that provided/developed the operating system of the computer system.

In some embodiments, the computer system (e.g., 601), prior to receiving the first request to play media (e.g., 609a) and at an external device (e.g., 600) (e.g., a smart phone having a touchscreen display) that is in communication with the computer system, initiates a process (e.g., the process shown in FIGS. 6AB-6AI) for enabling (e.g., authorizing) use of the first source for playback of media by the computer system that includes receiving a first set of one or more user inputs (e.g., 650, 656, 660a, 660b, 662, 664, 668) (e.g., tap gestures), wherein the first set of one or more user inputs includes a first user input (e.g., 650) directed to the selectable user interface object (e.g., 648a). In some embodiments, the first set of one or more inputs includes at least one input on the source user interface and at least one input on a second user interface that is displayed after displaying the source interface. In some embodiments, the second user interface is an interface that is provided/developed by the party that provided/developed the operating system (e.g., the second user interface is generated by the operating system).

In some embodiments, the computer system (e.g., 601), prior to receiving the first request to play media (e.g., 609a) and at an external device (e.g., 600) (e.g., a smart phone having a touchscreen display) that is in communication with the computer system, initiates a process (e.g., the process shown in FIGS. 6AB-6AI) for enabling (e.g., authorizing) use of the first source for playback of media by the computer system that includes, in response to receiving the first set of one or more user inputs (e.g., 650, 656, 660a, 660b, 662, 664, 668), enabling use of the first source (e.g., "SINGIFY IS READY TO USE" in FIG. 6AI) for playback of media by the computer system. In some embodiments, the first source is authorized for use by the computer system using the first identified user's user account. In some embodiments, the first source becomes enabled for use by any user account associated with the computer system. Providing the capability to enable use of the first source for playback, from an application provided by the provider of the first source, provides the user with additional control options for enabling use of the first source. Providing additional control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of one or more inputs (e.g., 650, 656, 660a, 660b, 662, 664, 668) includes a second set of one or more inputs (e.g., 660a, 660b) that includes a second user input (e.g., 660a) that is received at the external device (e.g., 600) while displaying a location selection user interface (e.g., 652b) (e.g., an interface for selecting which location(s) at which to enable the first source) that includes one or more selectable location user interface objects (e.g., 658a-658c). In some embodiments, the second user input (e.g., 660a) is directed to a first location user interface object (e.g., 658b) of the one or more selectable location user interface objects (e.g., 658a-658c) that corresponds to a first location (e.g., "PEARL COURT" in 658b) (e.g., a physical location (e.g., an address, a home of a user); a virtual location that is used to group and/or identify a set of related electronic devices). In some embodiments, the computer system (e.g., 601) is associated with the first location (e.g., "PEARL COURT" in 658b). In some embodiments, the first location user interface object includes a visual indication of a status of the first location with respect to capability to playback media in response to requests. In some embodiments, the visual indication is a visual indication as to the status of the computer system. In some embodiments, enabling use of the first source (e.g., "SINGIFY" of FIG. 6AD) for playback of media by the computer system (e.g., 601) includes enabling the first source for playback of media by the computer system at the first location. In some embodiments, enabling use of the first source for playback of media includes enabling the first source for playback at a plurality of locations, including a second location that does not include the computer system (e.g., but does include a second computer system that has one or more features of the computer system). Providing a user interface to select more than one location for enabling use of the first source for playback of media provides the user with a way to complete setup for multiple locations with a single set of inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the process (e.g., the process shown in FIGS. 6AB-6AI) for enabling (e.g., authorizing) use of the first source (e.g., "SINGIFY" of 618c in FIG. 6AH) for playback of media by the computer system (e.g., 601) further includes displaying a third source user interface (e.g., 652d) including user-selectable source user interface objects (e.g., 618a, 618d, 618c of FIGS. 6AG-6AH) (e.g., rows corresponding to streaming services that have been enabled for use by the computer system by the first identified user) that, when selected, configures the default source associated with the first identified user (e.g., "JOHN" of FIG. 6AB). Displaying options to configure the default source associated with the user allows the user to quickly update their default source preference, without needing to access additional settings user interfaces. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first source is authorized for use by the computer system using the first identified user's source user account. In some embodiments, the first identified user can change (e.g., update, modify) the source user account associated with the first source via the source user interface. In some embodiments, in accordance with a determination that the first source for playback of media by the computer system has been previously enabled (e.g., authorized) by a first source user account, display a prompt (e.g., a selectable user interface object (e.g., a button, an affordance)) at the external device (e.g., smart phone) that, when selected, updates the source user account to a second source user account (e.g., a source user account different from the first source user account (e.g., an email or username associated with the first source)).

In some embodiments, initiating a process for enabling (e.g., authorizing) use of the first source for playback of media by the computer system (e.g., smart speaker) includes a determination that software of the computer system and/or external device (e.g., smart phone) in communication with the computer system meet a set of requirements. In some embodiments, in accordance with a determination software of the computer system and/or external device in communication with the computer system do not meet the set of requirements, display a prompt at the external device for updating the software of the computer system and/or external device in communication with the computer system.

In some embodiments, initiating a process for enabling (e.g., authorizing) use of the first source for playback of media by a computer system (e.g., smart speaker) includes a determination that the external device (e.g., smart phone) is in communication with a computer system. In some embodiments, in accordance with a determination that the external device is not in communication with a computer system, display a prompt at the external device for learning more about connecting the external device with a computer system (e.g., by purchasing a computer system). In some embodiments, if enabling use of the first source for playback of media by the computer system is unsuccessful, display a notification (e.g., an alert) that the process was unsuccessful.

In some embodiments, if the computer system detects that the first source for playback of media by the computer system is unintentionally disconnected (e.g., disabled (e.g., the computer system cannot access the first source for playback of media)), display, at the external device, a notification (e.g., prompt) to reconnect (e.g., reauthorize) the first source to the computer system. In some embodiments, the notification is displayed at the source user interface (e.g., in the third party application). In some embodiments, the notification is displayed at a user interface different from the source user interface (e.g., not in the third party application; in a first party application).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the selection of media services for electronic devices having multiple users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of selection of media service, the present technology can be configured to allow users to select to "opt in" or "opt out" of participation in the collection of personal information data during registration for services or anytime thereafter. In another example, users can select not to provide voice-associated data for selection of media service. In yet another example, users can select to limit the length of time voice-associated data is maintained or entirely prohibit the development of a baseline voice profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, media service can be selected and delivered to users by inferring preferences based on non-personal information data or a bare minimum amount of personal information, such as the content being requested by the device associated with a user, other non-personal information available to the media services, or publicly available information.

What is claimed is:

1. A computer system, comprising:
   one or more input devices;
   one or more output devices;
   one or more processors; and
   memory storing one or more programs configured to be executed by the one or more processors, the one or more programs including instructions for:
   receiving, via the one or more input devices, a first request to play media; wherein the first request to play media is a spoken request;
   in response to receiving the first request to play media and in accordance with a determination that the first request to play media meets a first set of request type criteria:
      in accordance with a determination, based on the first request, that the first request was made by a first identified user with a profile accessible to the computer system, playing, via the one or more output devices, the requested media using a first source media service specified by the first identified user; and
      in accordance with a determination that the first request to play media meets a second set of request type criteria, that includes a criterion that is met when the first request is determined to have been made by a user without a profile accessible to the computer system, playing, via the one or more output devices, the requested media using a second media service, different than the first media service, wherein the second media service is a default media service associated with the computer system.

2. The computer system of claim 1, the one or more programs further including instructions for:
   in response to receiving the first request to play media and in accordance with a determination that the first request to play media includes a request to play media from a specific media service, playing the requested media using the specific media service.

3. The computer system of claim 1, wherein the first set of request type criteria includes a criterion that is met when the requested media is personalized media.

4. The computer system of claim 1, the one or more programs further including instructions for:
   while playing first media, receiving, via the one or more input devices, a first request to save media;
   in response to receiving the first request to save media:
      in accordance with a determination that the first request to save media was made by a third identified user, associating the first media with the third identified user; and
      in accordance with a determination that the first request to save media meets a third set of request type criteria that includes a criterion that is met when the first request to save media is determined to have been made by the user without a profile accessible to the computer system, associating the first media with a fourth identified user that is identified based on a result of a second set of one or more user identity determination operations.

5. The computer system of claim 1, the one or more programs further including instructions for:
   receiving, via the one or more input devices, a second request to play media;
   in response to receiving the second request to play media and in accordance with a determination that the second request to play media meets a fourth set of request type criteria that includes a criterion that is met when the requested media is media of a first type, playing the requested media using the default media service associated with the computer system.

6. The computer system of claim 1, wherein the first set of request type criteria includes a criterion that is met when the requested media is serialized media.

7. The computer system of claim 1, the one or more programs further including instructions for:
   receiving, via the one or more input devices, a third request to play media; and
   in response to receiving the third request to play media and in accordance with a determination that the media requested by the third request to play media is available from a fourth media service, playing, via the one or more output devices, the requested media using the fourth media service.

8. The computer system of claim 1, the one or more programs further including instructions for:
   receiving, via the one or more input devices, a fourth request to play media;
   in response to receiving the fourth request to play media and in accordance with a determination that the media requested by the fourth request to play media is available from a plurality of media services:
      outputting a request for media service identifying information;
      receiving user input that includes media service identifying information; and in response to receiving user input that includes media service identifying information, playing the requested media using the identified media service.

9. The computer system of claim 1, wherein:
the computer system is associated with a plurality of identified users that includes the first identified user and a ninth identified user;
the first identified user is associated with a first user-selectable default media service; and
the ninth identified user is associated with a second user-selectable default media service that is independently selectable with respect to the first user-selectable default media service.

10. The computer system of claim 1, the one or more programs further including instructions for:
prior to receiving the first request to play media and at an external device that is in communication with the computer system, initiating a process for enabling use of the first media service for playback of media by the computer system that includes:
displaying a media service user interface that includes a first selectable user interface object, wherein the media service user interface is generated by an application that is provided by a provider of the first media service;
receiving a first set of one or more user inputs, wherein the first set of one or more user inputs includes a first user input directed to the selectable user interface object; and
in response to receiving the first set of one or more user inputs, enabling use of the first media service for playback of media by the computer system.

11. The computer system of claim 1, wherein the second media service is selected based on a result of a first set of one or more user identity determination operations.

12. The computer system of claim 11, the one or more programs further including instructions for:
after the second set of request type criteria are met, performing, at the computer system, the first set of one or more user identity determination operations, including:
outputting, via the one or more output devices, a first request for user identifying information; and
receiving a first user input that includes user identifying information, wherein the result of the first set of one or more user identity determination operations includes the user identifying information.

13. The computer system of claim 11, wherein:
the result of the first set of one or more user identity determination operations does not include a specific identified user.

14. The computer system of claim 11, wherein:
in accordance with a determination that the result of the first set of one or more user identity determination operations is an indication that the first request to play media was made by an unknown user, the second media service is the default media service associated with the computer system; and
in accordance with a determination that the result of the first set of one or more user identity determination operations is an indication that the first request to play media was made by a user that is identified as potentially being a fifth identified user and as potentially being a sixth identified user, different from the fifth identified user, the second media service is the default media service associated with the computer system.

15. The computer system of claim 1, the one or more programs further including instructions for:
receiving, via the one or more input devices, a second request to play media; and
in response to receiving the second request to play media, playing, via the one or more output devices, the requested media using a third media service that is selected based on a result of a second set of one or more user identity determination operations.

16. The computer system of claim 15, wherein:
the result of the second set of one or more user identity determination operations includes a second identified user; and
the third media service is specified by the second identified user.

17. The computer system of claim 15, wherein:
in accordance with a determination that the result of the second set of one or more user identity determination operations is an indication that the second request to play media was made by an unknown user, the third media service is the default media service associated with the computer system; and
in accordance with a determination that the result of the second set of one or more user identity determination operations is an indication that the second request to play media was made by a user that is identified as potentially being a seventh identified user and as potentially being an eighth identified user, different from the seventh identified user, the third media service is different from the default media service associated with the computer system.

18. A non-transitory computer-readable storage medium storing one or more programs configured to be executed by one or more processors of a computer system that is in communication with one or more input devices and one or more output devices, the one or more programs including instructions for:
receiving, via the one or more input devices, a first request to play media; wherein the first request to play media is a spoken request; and
in response to receiving the first request to play media and in accordance with a determination that the first request to play media meets a first set of request type criteria:
in accordance with a determination, based on the first request, that the first request was made by a first identified user with a profile accessible to the computer system, playing, via the one or more output devices, the requested media using a first media service specified by the first identified user; and
in accordance with a determination that the first request to play media meets a second set of request type criteria, that includes a criterion that is met when the first request is determined to have been made by a user without a profile accessible to the computer system, playing, via the one or more output devices, the requested media using a second media service, different than the first media service, wherein the second media service is a default media service associated with the computer system.

19. The non-transitory computer-readable storage medium of claim 18, wherein the second media service is selected based on a result of a first set of one or more user identity determination operations.

20. The non-transitory computer-readable storage medium of claim 19, the one or more programs further including instructions for:

after the second set of request type criteria are met, performing, at the computer system, the first set of one or more user identity determination operations, including:
- outputting, via the one or more output devices, a first request for user identifying information; and
- receiving a first user input that includes user identifying information, wherein the result of the first set of one or more user identity determination operations includes the user identifying information.

21. The non-transitory computer-readable storage medium of claim 19, wherein:
the result of the first set of one or more user identity determination operations does not include a specific identified user.

22. The non-transitory computer-readable storage medium of claim 19, wherein:
in accordance with a determination that the result of the first set of one or more user identity determination operations is an indication that the first request to play media was made by an unknown user, the second media service is the default media service associated with the computer system; and
in accordance with a determination that the result of the first set of one or more user identity determination operations is an indication that the first request to play media was made by a user that is identified as potentially being a fifth identified user and as potentially being a sixth identified user, different from the fifth identified user, the second media service is the default media service associated with the computer system.

23. The non-transitory computer-readable storage medium of claim 18, the one or more programs further including instructions for:
receiving, via the one or more input devices, a second request to play media; and
in response to receiving the second request to play media, playing, via the one or more output devices, the requested media using a third media service that is selected based on a result of a second set of one or more user identity determination operations.

24. The non-transitory computer-readable storage medium of claim 23, wherein:
the result of the second set of one or more user identity determination operations includes a second identified user; and
the third media service is specified by the second identified user.

25. The non-transitory computer-readable storage medium of claim 23, wherein:
in accordance with a determination that the result of the second set of one or more user identity determination operations is an indication that the second request to play media was made by an unknown user, the third media service is the default media service associated with the computer system; and
in accordance with a determination that the result of the second set of one or more user identity determination operations is an indication that the second request to play media was made by a user that is identified as potentially being a seventh identified user and as potentially being an eighth identified user, different from the seventh identified user, the third media service is different from the default media service associated with the computer system.

26. The non-transitory computer-readable storage medium of claim 18, the one or more programs further including instructions for:
in response to receiving the first request to play media and in accordance with a determination that the first request to play media includes a request to play media from a specific media service, playing the requested media using the specific media service.

27. The non-transitory computer-readable storage medium of claim 18, wherein the first set of request type criteria includes a criterion that is met when the requested media is personalized media.

28. The non-transitory computer-readable storage medium of claim 18, the one or more programs further including instructions for:
while playing first media, receiving, via the one or more input devices, a first request to save media;
in response to receiving the first request to save media:
in accordance with a determination that the first request to save media was made by a third identified user, associating the first media with the third identified user; and
in accordance with a determination that the first request to save media meets a third set of request type criteria that includes a criterion that is met when the first request to save media is determined to have been made by the user without a profile accessible to the computer system, associating the first media with a fourth identified user that is identified based on a result of a second set of one or more user identity determination operations.

29. The non-transitory computer-readable storage medium of claim 18, the one or more programs further including instructions for:
receiving, via the one or more input devices, a second request to play media;
in response to receiving the second request to play media and in accordance with a determination that the second request to play media meets a fourth set of request type criteria that includes a criterion that is met when the requested media is media of a first type, playing the requested media using the default media service associated with the computer system.

30. The non-transitory computer-readable storage medium of claim 18, wherein the first set of request type criteria includes a criterion that is met when the requested media is serialized media.

31. The non-transitory computer-readable storage medium of claim 18, the one or more programs further including instructions for:
receiving, via the one or more input devices, a third request to play media; and
in response to receiving the third request to play media and in accordance with a determination that the media requested by the third request to play media is available from a fourth media service, playing, via the one or more output devices, the requested media using the fourth media service.

32. The non-transitory computer-readable storage medium of claim 18, the one or more programs further including instructions for:
receiving, via the one or more input devices, a fourth request to play media;
in response to receiving the fourth request to play media and in accordance with a determination that the media requested by the fourth request to play media is available from a plurality of media services:

outputting a request for media service identifying information;
receiving user input that includes media service identifying information; and
in response to receiving user input that includes media service identifying information, playing the requested media using the identified media service.

33. The non-transitory computer-readable storage medium of claim 18, wherein:
the computer system is associated with a plurality of identified users that includes the first identified user and a ninth identified user;
the first identified user is associated with a first user-selectable default media service; and
the ninth identified user is associated with a second user-selectable default media service that is independently selectable with respect to the first user-selectable default media service.

34. The non-transitory computer-readable storage medium of claim 18, the one or more programs further including instructions for:
prior to receiving the first request to play media and at an external device that is in communication with the computer system, initiating a process for enabling use of the first media service for playback of media by the computer system that includes:
displaying a media service user interface that includes a first selectable user interface object, wherein the media service user interface is generated by an application that is provided by a provider of the first media service;
receiving a first set of one or more user inputs, wherein the first set of one or more user inputs includes a first user input directed to the selectable user interface object; and
in response to receiving the first set of one or more user inputs, enabling use of the first media service for playback of media by the computer system.

35. A method comprising:
at a computer system that is in communication with one or more input devices and one or more output devices:
receiving, via the one or more input devices, a first request to play media; wherein the first request to play media is a spoken request; and
in response to receiving the first request to play media and in accordance with a determination that the first request to play media meets a first set of request type criteria:
in accordance with a determination, based on the first request, that the first request was made by a first identified user with a profile accessible to the computer system, playing, via the one or more output devices, the requested media using a first media service specified by the first identified user; and
in accordance with a determination that the first request to play media meets a second set of request type criteria, that includes a criterion that is met when the first request is determined to have been made by a user without a profile accessible to the computer system, playing, via the one or more output devices, the requested media using a second media service, different than the first media service, wherein the second media service is a default media service associated with the computer system.

36. The method of claim 35, wherein the second media service is selected based on a result of a first set of one or more user identity determination operations.

37. The method of claim 36, further comprising:
after the second set of request type criteria are met, performing, at the computer system, the first set of one or more user identity determination operations, including:
outputting, via the one or more output devices, a first request for user identifying information; and
receiving a first user input that includes user identifying information, wherein the result of the first set of one or more user identity determination operations includes the user identifying information.

38. The method of claim 36, wherein:
the result of the first set of one or more user identity determination operations does not include a specific identified user.

39. The method of claim 36, wherein:
in accordance with a determination that the result of the first set of one or more user identity determination operations is an indication that the first request to play media was made by an unknown user, the second media service is the default media service associated with the computer system; and
in accordance with a determination that the result of the first set of one or more user identity determination operations is an indication that the first request to play media was made by a user that is identified as potentially being a fifth identified user and as potentially being a sixth identified user, different from the fifth identified user, the second media service is the default media service associated with the computer system.

40. The method of claim 35, further comprising:
receiving, via the one or more input devices, a second request to play media; and
in response to receiving the second request to play media, playing, via the one or more output devices, the requested media using a third media service that is selected based on a result of a second set of one or more user identity determination operations.

41. The method of claim 40, wherein:
the result of the second set of one or more user identity determination operations includes a second identified user; and
the third media service is specified by the second identified user.

42. The method of claim 40, wherein:
in accordance with a determination that the result of the second set of one or more user identity determination operations is an indication that the second request to play media was made by an unknown user, the third media service is the default media service associated with the computer system; and
in accordance with a determination that the result of the second set of one or more user identity determination operations is an indication that the second request to play media was made by a user that is identified as potentially being a seventh identified user and as potentially being an eighth identified user, different from the seventh identified user, the third media service is different from the default media service associated with the computer system.

43. The method of claim 35, further comprising:
in response to receiving the first request to play media and in accordance with a determination that the first request to play media includes a request to play media from a specific media service, playing the requested media using the specific media service.

44. The method of claim 35, wherein the first set of request type criteria includes a criterion that is met when the requested media is personalized media.

45. The method of claim 35, further comprising:
while playing first media, receiving, via the one or more input devices, a first request to save media;
in response to receiving the first request to save media:
in accordance with a determination that the first request to save media was made by a third identified user, associating the first media with the third identified user; and
in accordance with a determination that the first request to save media meets a third set of request type criteria that includes a criterion that is met when the first request to save media is determined to have been made by the user without a profile accessible to the computer system, associating the first media with a fourth identified user that is identified based on a result of a second set of one or more user identity determination operations.

46. The method of claim 35, further comprising:
receiving, via the one or more input devices, a second request to play media;
in response to receiving the second request to play media and in accordance with a determination that the second request to play media meets a fourth set of request type criteria that includes a criterion that is met when the requested media is media of a first type, playing the requested media using the default media service associated with the computer system.

47. The method of claim 35, wherein the first set of request type criteria includes a criterion that is met when the requested media is serialized media.

48. The method of claim 35, further comprising:
receiving, via the one or more input devices, a third request to play media; and
in response to receiving the third request to play media and in accordance with a determination that the media requested by the third request to play media is available from a fourth media service, playing, via the one or more output devices, the requested media using the fourth media service.

49. The method of claim 35, further comprising:
receiving, via the one or more input devices, a fourth request to play media;
in response to receiving the fourth request to play media and in accordance with a determination that the media requested by the fourth request to play media is available from a plurality of media services:
outputting a request for media service identifying information;
receiving user input that includes media service identifying information; and
in response to receiving user input that includes media service identifying information, playing the requested media using the identified media service.

50. The method of claim 35, wherein:
the computer system is associated with a plurality of identified users that includes the first identified user and a ninth identified user;
the first identified user is associated with a first user-selectable default media service; and
the ninth identified user is associated with a second user-selectable default media service that is independently selectable with respect to the first user-selectable default media service.

51. The method of claim 35, further comprising:
prior to receiving the first request to play media and at an external device that is in communication with the computer system, initiating a process for enabling use of the first media service for playback of media by the computer system that includes:
displaying a media service user interface that includes a first selectable user interface object, wherein the media service user interface is generated by an application that is provided by a provider of the first media service;
receiving a first set of one or more user inputs, wherein the first set of one or more user inputs includes a first user input directed to the selectable user interface object; and
in response to receiving the first set of one or more user inputs, enabling use of the first media service for playback of media by the computer system.

* * * * *

UNITED STATES PATENT AND TRADEMARK OFFICE
CERTIFICATE OF CORRECTION

PATENT NO. : 12,381,880 B2
APPLICATION NO. : 17/481030
DATED : August 5, 2025
INVENTOR(S) : Taylor G. Carrigan et al.

Page 1 of 1

It is certified that error appears in the above-identified patent and that said Letters Patent is hereby corrected as shown below:

In the Claims

In Column 65, Line 58, Claim 1, delete "source media" and insert -- media --, therefor.

Signed and Sealed this
Seventh Day of October, 2025

John A. Squires
*Director of the United States Patent and Trademark Office*